US 11,799,691 B2

(12) United States Patent
Kim et al.

(10) Patent No.: US 11,799,691 B2
(45) Date of Patent: Oct. 24, 2023

(54) METHOD FOR ESTIMATING CHANNEL BY TERMINAL IN WIRELESS COMMUNICATION SYSTEM, AND DEVICE THEREFOR

(71) Applicant: LG ELECTRONICS INC., Seoul (KR)

(72) Inventors: Jaehyung Kim, Seoul (KR); Seonwook Kim, Seoul (KR); Changhwan Park, Seoul (KR); Seokmin Shin, Seoul (KR); Joonkui Ahn, Seoul (KR); Suckchel Yang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 369 days.

(21) Appl. No.: 17/266,424

(22) PCT Filed: Aug. 9, 2019

(86) PCT No.: PCT/KR2019/010149
§ 371 (c)(1),
(2) Date: Feb. 5, 2021

(87) PCT Pub. No.: WO2020/032731
PCT Pub. Date: Feb. 13, 2020

(65) Prior Publication Data
US 2021/0336819 A1 Oct. 28, 2021

Related U.S. Application Data

(60) Provisional application No. 62/716,976, filed on Aug. 9, 2018.

(30) Foreign Application Priority Data

Sep. 28, 2018 (KR) .................. 10-2018-0116638
Nov. 2, 2018 (KR) .................. 10-2018-0133985
Feb. 15, 2019 (KR) .................. 10-2019-0018215

(51) Int. Cl.
H04L 25/02 (2006.01)
H04B 7/06 (2006.01)
(Continued)

(52) U.S. Cl.
CPC .......... H04L 25/0202 (2013.01); H04B 7/06 (2013.01); H04L 27/2613 (2013.01); H04W 72/23 (2023.01)

(58) Field of Classification Search
CPC ... H04L 5/0048; H04L 5/0023; H04L 5/0064; H04L 5/0051; H04L 5/005; H04L 1/0047
See application file for complete search history.

(56) References Cited

U.S. PATENT DOCUMENTS

2015/0358132 A1* 12/2015 Wallen .............. H04W 72/0446
370/329
2016/0127952 A1* 5/2016 You .................... H04W 72/542
370/252
2018/0049192 A1 2/2018 Beale et al.

FOREIGN PATENT DOCUMENTS

KR 10-2017-0063513 6/2017

OTHER PUBLICATIONS

PCT International Application No. PCT/KR2019/010149, International Search Report dated Dec. 10, 2019, 4 pages.
(Continued)

Primary Examiner — Dady Chery
(74) Attorney, Agent, or Firm — LEE HONG DEGERMAN KANG WAIMEY

(57) ABSTRACT

Disclosed are a method for channel estimation in a wireless communication system, and a device therefor. Particularly, the method for estimating a channel by a terminal in a wireless communication comprises the steps for: receiving, from a base station, configuration information for channel estimation, the configuration information comprising relationship information related to the relationship between a cell-specific reference signal (CRS) and a demodulation-
(Continued)

reference signal (DM-RS); receiving the CRS from the base station; receiving, from the base station, on a specific channel, the DM-RS and machine type communication (MTC) control information; estimating the specific channel by using the CRS and DM-RS, on the basis of the relationship information; and decoding the MTC control information via the estimated specific channel, wherein the relationship information comprises information about a pre-coding relationship between the CRS and DM-RS, and power ratio information of the CRS with respect to the DM-RS, and the power ratio information is information related to the power ratio between a CRS port and DM-RS port for an idle mode.

18 Claims, 37 Drawing Sheets

(51) Int. Cl.
*H04L 27/26* (2006.01)
*H04W 72/23* (2023.01)

(56) References Cited

OTHER PUBLICATIONS

Spreadtrum Communications, "Discussion on Open Issues in MTC PDSCH", R1-157333, 3GPP TSG-RAN Meeting #83, Nov. 2015, 6 pages.
Ericsson, "M-PDCCH link performance for MTC", R1-155031, 3GPP TSG RAN WG1 Meeting #82bis, Oct. 2015, 6 pages.

* cited by examiner

FIG.17
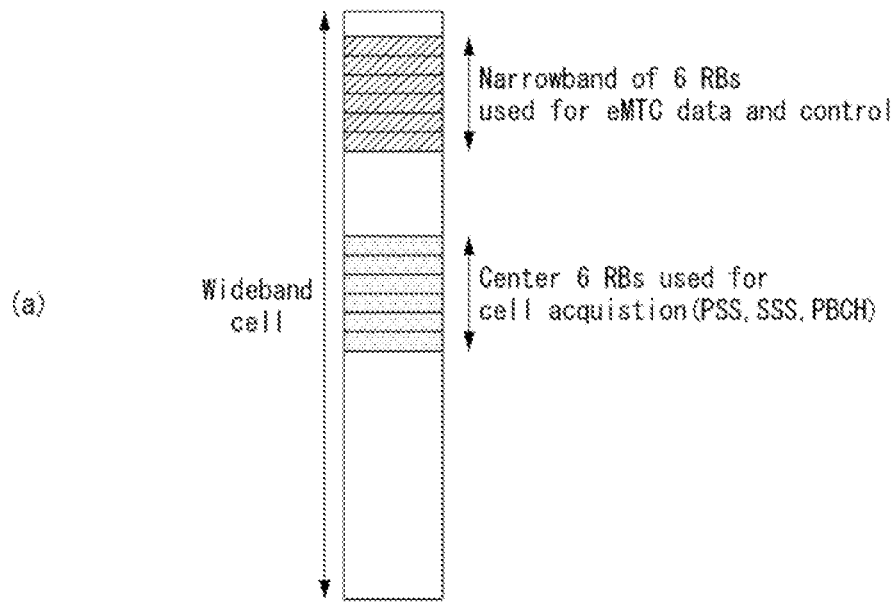
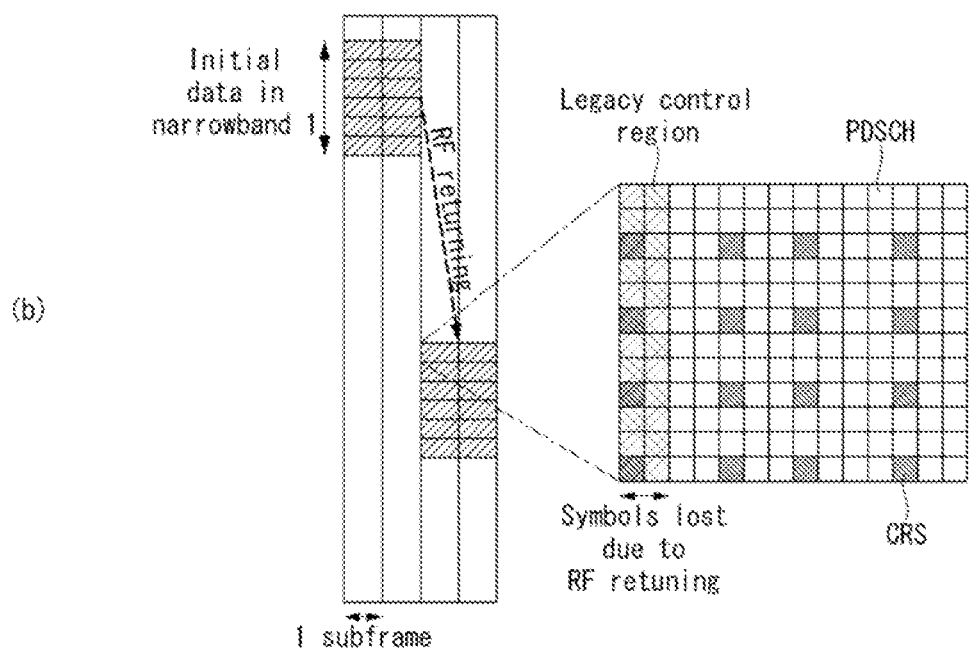

FIG. 19
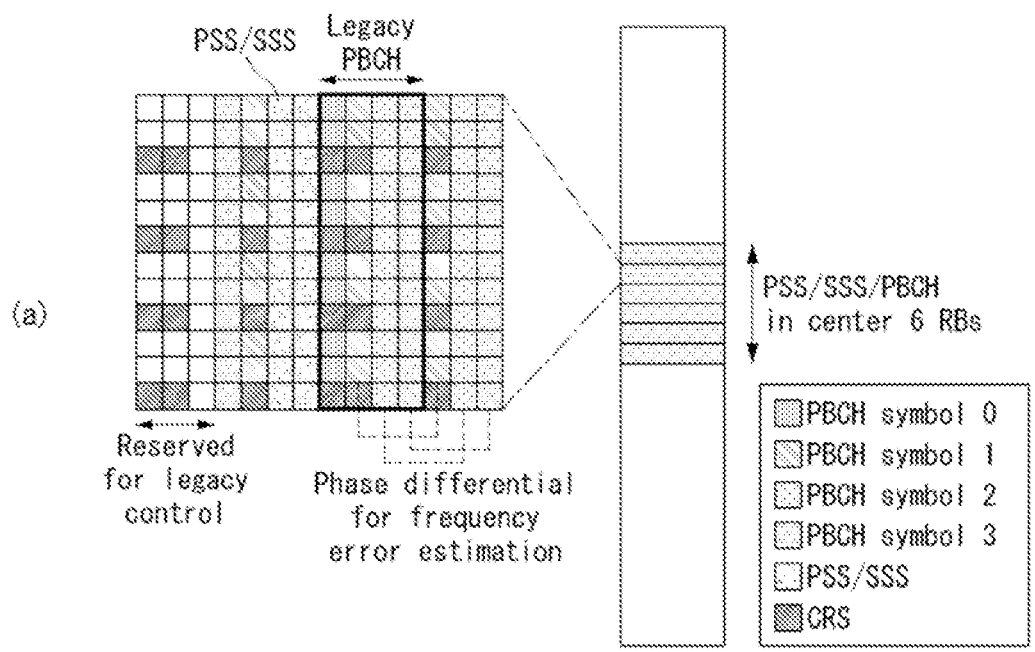
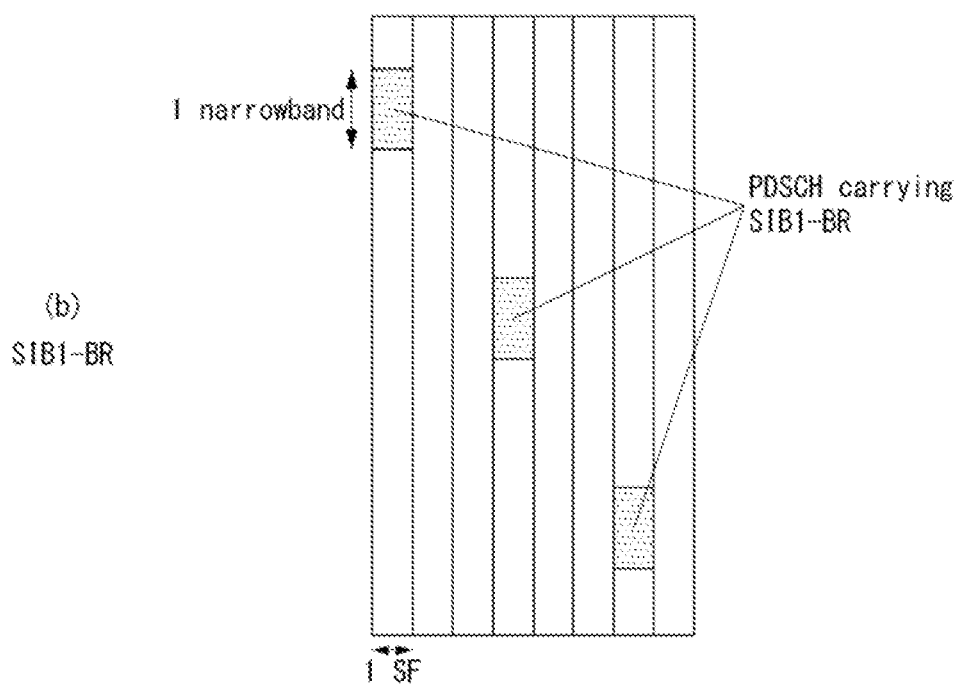

FIG.26
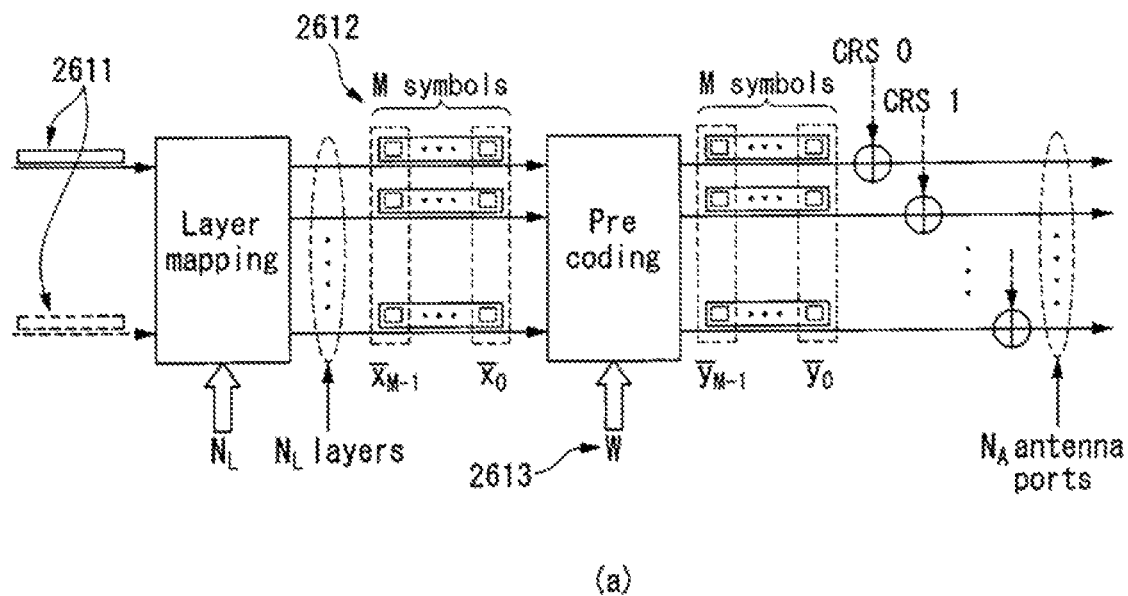
(a)
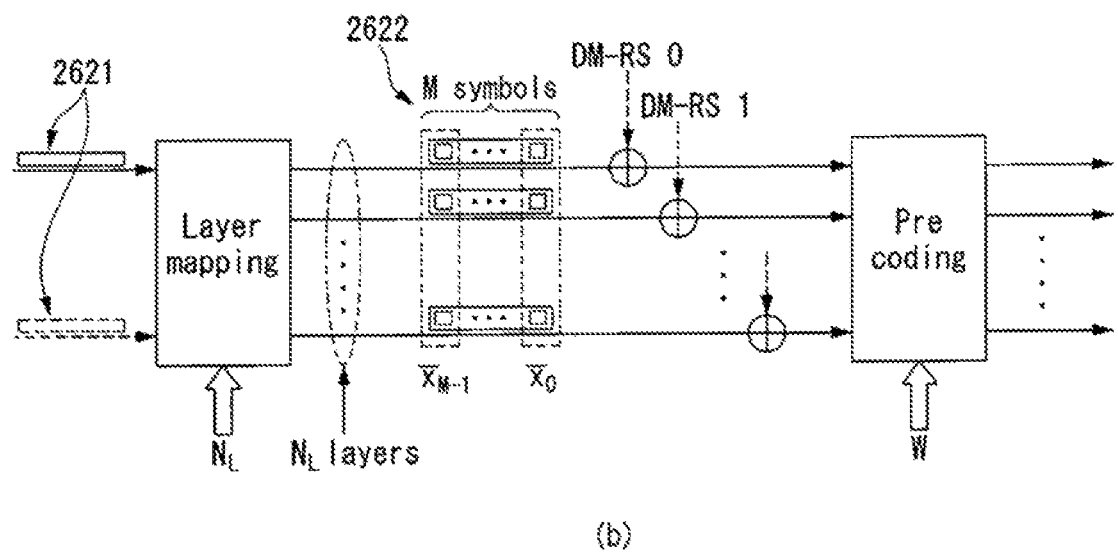
(b)

METHOD FOR ESTIMATING CHANNEL BY TERMINAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/010149, filed on Aug. 9, 2019, which claims the benefit of earlier filing date and right of priority to Korean Application Nos. 10-2018-0116638, filed on Sep. 28, 2018, 10-2018-0133985, filed on Nov. 2, 2018 and 10-2019-0018215, filed on Feb. 15, 2019 and also claims the benefit of U.S. Provisional Application No. 62/716,976, filed on Aug. 9, 2018, the contents of which are all hereby incorporated by reference herein in their entirety.

TECHNICAL FIELD

The present disclosure relates to a wireless communication system, and in more detail, a method of estimating a channel by a terminal, and an apparatus for the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a method of supporting channel estimation of a terminal in a wireless communication system.

In addition, an object of the present disclosure is to provide a method of improving the MPDCCH (MTC Physical Downlink Control Channel) reception performance of a terminal in a wireless communication system.

In addition, an object of the present disclosure is to provide a method for a terminal to use a cell-specific reference signal (CRS) and a dedicated demodulation reference signal (DM-RS) to estimate an MPDCCH (MTC Physical Downlink Control Channel) in a wireless communication system.

The technical objects to attain in the present disclosure are not limited to the above-described technical objects and other technical objects which are not described herein will become apparent to those skilled in the art from the following description.

Technical Solution

In the present disclosure, a method of estimating a channel by a terminal in a wireless communication system, and receiving reference signal from the base station, comprises: receiving, from a base station, configuration information for channel estimation, wherein the configuration information includes relationship information related to an association relationship between a cell-specific reference signal (CRS) and a dedicated demodulation-reference signal (DM-RS); receiving the CRS from the base station; receiving the DM-RS and Machine Type Communication (MTC) control information on a specific channel from the base station; estimating the specific channel using the CRS and the DM-RS based on the relationship information; and decoding the MTC control information through the estimated specific channel, wherein the relationship information includes precoding relationship information between the CRS and the DM-RS and power ratio information of the CRS with respect to the DM-RS, wherein the power ratio information is information related to a power ratio between a CRS port and a DM-RS port for an idle mode.

In addition, in the present disclosure, the DM-RS is precoded by a plurality of precoders included in a predefined codebook in a time axis domain and/or a frequency axis domain, the precoding relationship information includes rule information related to a rule in which the plurality of precoders are cycled, and the plurality of precoders are cycled in a time axis domain and/or a frequency axis domain according to the rule information and applied to the DM-RS.

In addition, in the present disclosure, the plurality of precoders are cycled in a time axis domain cycling unit and/or a frequency axis domain cycling unit, the DM-RS is precoded by a same precoder within the time axis domain cycling unit and/or the frequency axis domain cycling unit.

In addition, in the present disclosure, the time axis domain cycling unit is a same as a frequency hopping interval.

In addition, in the present disclosure, the plurality of precoders are cycled in the time axis domain and/or the frequency axis domain in which the specific channel is transmitted.

In addition, in the present disclosure, the precoding relationship information indicates that the DM-RS is precoded by a same method as the CRS.

In addition, in the present disclosure, the precoding relationship information indicates that the CRS is precoded by a same precoder as a precoder applied to the DM-RS.

In addition, in the present disclosure, the precoding relationship information indicates that a fixed precoding is applied to the DM-RS, and the fixed precoding is a precoding known in advance to the terminal.

In addition, in the present disclosure, the precoding relationship information indicates that the DM-RS is precoded based on a codebook.

In addition, in the present disclosure, the method further comprises receiving codebook information applied to the DM-RS from the base station.

In addition, in the present disclosure, the estimating the specific channel further includes: obtaining a first channel estimation result through channel estimation using the CRS; estimating the specific channel using a time interpolation method based on the DM-RS and the first channel estimation result In addition, in the present disclosure, the estimating the specific channel further includes estimating the specific channel using a frequency interpolation method, and the frequency interpolation method is applied with 2 RB which is a minimum unit of a set of Physical Resource Block (PRBs) included in the specific channel.

In addition, in the present disclosure, the configuration information is included in downlink control information (DCI).

In addition, in the present disclosure, the method further comprises receiving, from the base station, the configuration information in an idle mode state in a period of Discontinuous Reception (DRX), the configuration information is received in a listening period of the idle mode.

In addition, in the present disclosure, a method of estimating a channel by a terminal in a wireless communication system, and performed by a base station comprises: transmitting configuration information for channel estimation to the terminal, wherein the configuration information includes relationship information related to an association relationship between a cell-specific reference signal (CRS) and a dedicated demodulation-reference signal (DM-RS); transmitting the CRS to the terminal; transmitting the DM-RS and Machine Type Communication (MTC) control information on a specific channel to the terminal, wherein the terminal estimates the specific channel using the CRS and the DM-RS based on the relationship information, and decodes the MTC control information through the estimated specific channel, wherein the relationship information includes precoding relationship information between the CRS and the DM-RS and power ratio information of the CRS with respect to the DM-RS, wherein the power ratio information is information related to a power ratio between a CRS port and a DM-RS port for an idle mode.

In addition, in the present disclosure, a terminal for estimating a channel in a wireless communication system comprises: a transmitter for transmitting a radio signal; a receiver for receiving a radio signal; and a processor functionally connected to the transmitter and the receiver, and the processor is configured to: receive configuration information for channel estimation from a base station, wherein the configuration information includes relationship information related to an association relationship between a cell-specific reference signal (CRS) and a dedicated demodulation-reference signal (DM-RS), receive the CRS from the base station, receive the DM-RS and Machine Type Communication (MTC) control information on a specific channel from the base station, estimate the specific channel using the CRS and the DM-RS based on the relationship information, decode the MTC control information through the estimated specific channel, wherein the relationship information includes precoding relationship information between the CRS and the DM-RS and power ratio information of the CRS with respect to the DM-RS, wherein the power ratio information is information related to a power ratio between a CRS port and a DM-RS port for an idle mode.

Technical Effects

The present disclosure has an effect of supporting channel estimation of a terminal in a wireless communication system.

In addition, the present disclosure has an effect of improving the MPDCCH (MTC Physical Downlink Control Channel) reception performance of the terminal in a wireless communication system.

In addition, the present disclosure has an effect that the terminal is allowed to use a cell-specific reference signal (CRS) and a dedicated demodulation reference signal (DM-RS) to estimate an MPDCCH (MTC Physical Downlink Control Channel) in a wireless communication system.

The technical effects of the present disclosure are not limited to the technical effects described above, and other technical effects not mentioned herein may be understood to those skilled in the art from the description below.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 17(a) is a diagram showing an example of a narrowband operation, and FIG. 17(b) is a diagram showing an example of repetition with RF retuning.

FIG. 19(a) is a diagram showing an example of a frequency error estimation method for a repetition pattern for subframe #0, a normal CP, and repeated symbols in FDD, and FIG. 19(b) shows an example of transmission of SIB-BR in wideband LTE channel.

FIG. 26 is a diagram illustrating an example in which precoding is performed according to an embodiment of the present disclosure.

BEST MODE FOR INVENTION

Figure 1:
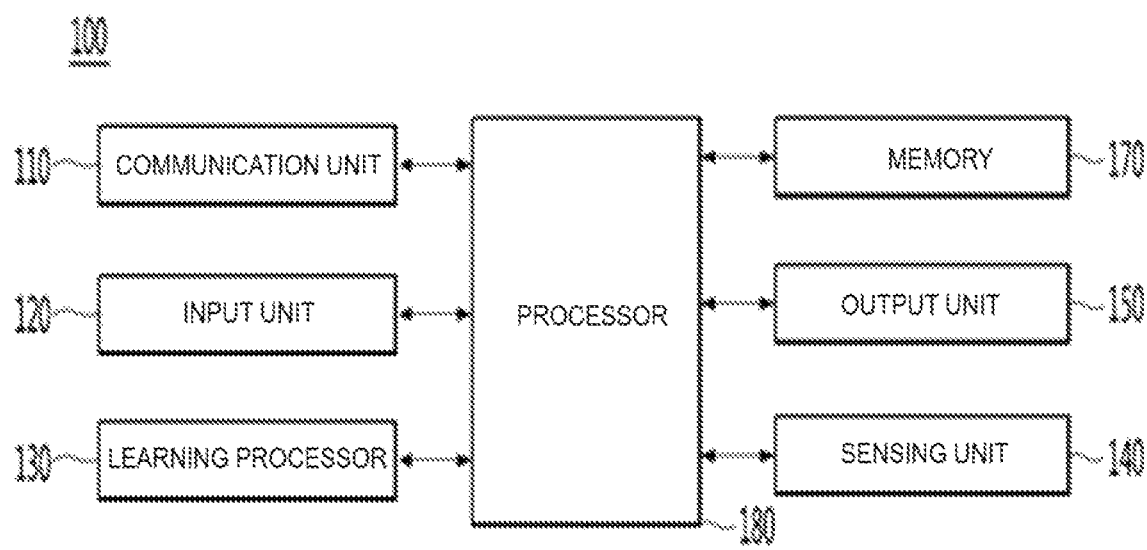
FIG. 1 shows an AI device 100 according to an embodiment of the present disclosure.

Some embodiments of the present disclosure are described in detail with reference to the accompanying drawings. A detailed description to be disclosed along with the accompanying drawings are intended to describe some exemplary embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

<5G scenario>

The three main requirements areas of 5G include (1) Enhanced Mobile Broadband (eMBB) area, (2) Massive Machine Type Communication (mMTC) area, and (3) Ultra-reliable and Low Latency Communications (URLLC) area.

In some use cases, multiple areas may be required for optimization, and other use cases may be focused on only one key performance indicator (KPI). 5G supports these various use cases in a flexible and reliable way.

eMBB goes far beyond basic mobile Internet access, covering rich interactive work, media and entertainment applications in the cloud or augmented reality. Data is one of the key drivers of 5G, and it may not be possible to see dedicated voice services for the first time in the 5G era. In 5G, voice is expected to be processed as an application program simply using the data connection provided by the communication system. The main reasons for the increased traffic volume are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to the user. Cloud storage and applications are rapidly increasing in mobile communication platforms, which can be applied to both work and entertainment. And, cloud storage is a special use case that drives the growth of the uplink data rate. 5G is also used for remote work in the cloud and requires much lower end-to-end latency to maintain a good user experience when tactile interfaces are used. Entertainment, for example, cloud gaming and video streaming is another key factor that is increasing the demand for mobile broadband capabilities. Entertainment is essential on smartphones and tablets anywhere, including high mobility environments such as trains, cars and airplanes. Another use case is augmented reality and information retrieval for entertainment. Here, augmented reality requires very low latency and an instantaneous amount of data.

In addition, one of the most anticipated 5G use cases concerns the ability to seamlessly connect embedded sensors in all fields, i.e. mMTC. By 2020, potential IoT devices are expected to reach 20.4 billion. Industrial IoT is one of the areas where 5G plays a major role in enabling smart cities, asset tracking, smart utilities, agriculture and security infrastructure.

URLLC includes new services that will transform the industry with ultra-reliable/low-latency links such as self-driving vehicles and remote control of critical infrastructure. The level of reliability and delay is essential for smart grid control, industrial automation, robotics, drone control and coordination.

Next, look at a number of examples in more detail.

5G can complement fiber-to-the-home (FTTH) and cable-based broadband (or DOC SIS) as a means of providing streams rated at hundreds of megabits per second to gigabits per second. These high speeds are required to deliver TVs in 4K or higher (6K, 8K and higher) resolutions as well as virtual and augmented reality. Virtual Reality (VR) and Augmented Reality (AR) applications involve almost immersive sports events. Certain application programs may require special network settings. For example, for VR games, game companies may need to integrate the core server with the network operator's edge network server to minimize latency.

Automotive is expected to be an important new driving force in 5G, with many use cases for mobile communication to vehicles. For example, entertainment for passengers demands simultaneous high capacity and high mobility mobile broadband. The reason is that future users will continue to expect high-quality connections, regardless of their location and speed. Another application example in the automotive field is an augmented reality dashboard. It identifies an object in the dark on top of what the driver sees through the front window and displays information that tells the driver about the distance and movement of the object. In the future, wireless modules enable communication between vehicles, exchange of information between the vehicle and supporting infrastructure, and exchange of information between the vehicle and other connected devices (e.g., devices carried by pedestrians). The safety system can lower the risk of an accident by guiding the driver through alternative courses of action to make driving safer. The next step will be a remote controlled or self-driven vehicle. It is very reliable and requires very fast communication between different self-driving vehicles and between the vehicle and the infrastructure. In the future, self-driving vehicles will perform all driving activities, and drivers will be forced to focus only on traffic anomalies that the vehicle itself cannot identify. The technical requirements of self-driving vehicles call for ultra-low latency and ultra-fast reliability to increase traffic safety to levels unachievable by humans.

Smart cities and smart homes, referred to as smart society, will be embedded with high-density wireless sensor networks. A distributed network of intelligent sensors will identify the conditions for cost and energy-efficient maintenance of a city or home. A similar setup can be done for each household. Temperature sensors, window and heating controllers, burglar alarms and appliances are all wirelessly connected. Many of these sensors are typically low data rates, low power and low cost. However, for example, real-time HD video may be required in certain types of devices for surveillance.

The consumption and distribution of energy including heat or gas is highly decentralized, requiring automated control of distributed sensor networks. The smart grid interconnects these sensors using digital information and communication technologies to gather information and act accordingly. This information can include the behavior of suppliers and consumers, allowing smart grids to improve efficiency, reliability, economics, sustainability of production and the distribution of fuels such as electricity in an automated manner. The smart grid can also be viewed as another low-latency sensor network.

The health sector has many applications that can benefit from mobile communications. The communication system can support telemedicine providing clinical care from remote locations. This can help reduce barriers to distance and improve access to medical services that are not consistently available in remote rural areas. It is also used to save lives in critical care and emergencies. A wireless sensor network based on mobile communication may provide sensors and remote monitoring of parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. However, achieving this requires that the wireless connection operates with a delay, reliability and capacity similar to that of the cable, and its management is simplified. Low latency and very low error probability are new requirements that need to be connected to 5G.

Logistics and freight tracking are important examples of use for mobile communications that enable tracking of inventory and packages from anywhere using location-based information systems. Logistics and freight tracking use cases typically require low data rates, but require a wide range and reliable location information.

<Artificial Intelligence (AI)>

Artificial intelligence refers to the field of researching artificial intelligence or the methodology to create it, and machine learning refers to the field of researching methodologies to define and solve various problems dealt with in the field of artificial intelligence. do. Machine learning is also defined as an algorithm that improves the performance of a task through continuous experience.

An Artificial neural network (ANN) is a model used in machine learning, and may refer to an overall model with problem-solving ability, which is composed of artificial neurons (nodes) that form a network by combining synapses. The artificial neural network may be defined by a connection pattern between neurons of different layers, a learning process for updating model parameters, and an activation function for generating an output value.

The artificial neural network may include input layer, output layer, and optionally one or more hidden layers. Each layer includes one or more neurons, and the artificial neural network may include neurons and synapses connecting neurons. In an artificial neural network, each neuron can output a function value of an activation function for input signals, weights, and biases input through synapses.

Model parameters refer to parameters that are determined through learning, and include weights of synaptic connections and biases of neurons. In addition, the hyperparameter refers to a parameter that must be set before learning in a machine learning algorithm, and includes a learning rate, iteration count, mini-batch size, and initialization function.

The purpose of learning artificial neural networks can be as determining model parameters that minimize the loss function. The loss function can be used as an index for determining an optimal model parameter in the learning process of the artificial neural network.

Machine learning can be classified into supervised learning, unsupervised learning, and reinforcement learning according to the learning method.

Supervised learning refers to a method of training an artificial neural network when a label for training data is given, and a label may mean the correct answer (or result value) that the artificial neural network must infer when training data is input to the artificial neural network. Unsupervised learning may mean a method of training an artificial neural network in a state where a label for training data is not given. Reinforcement learning may mean a learning method in which an agent defined in a certain environment learns to select an action or action sequence that maximizes the cumulative reward in each state.

Among artificial neural networks, machine learning implemented as a deep neural network (DNN) including a plurality of Hidden Layers is sometimes referred to as deep learning, and deep learning is a part of machine learning. Hereinafter, machine learning is used in the sense including deep learning.

<Robot>

A robot may refer to a machine that automatically processes or operates a task given by its own capabilities. In particular, a robot having a function of recognizing the environment and performing an operation by self-determining may be referred to as an intelligent robot.

Robots can be classified into industrial, medical, household, military, etc. depending on the purpose or field of use.

The robot may be provided with a driving unit including an actuator or a motor to perform various physical operations such as moving a robot joint. In addition, the movable robot includes a wheel, a brake, a propeller, and the like in a driving unit, and can travel on the ground or fly in the air through the driving unit.

<Self-Driving, Autonomous-Driving>

Autonomous driving refers to self-driving technology, and autonomous driving vehicle refers to a vehicle that is driven without a user's manipulation or with a user's minimal manipulation.

For example, in autonomous driving, a technology that maintains a driving lane, a technology that automatically adjusts the speed such as adaptive cruise control, a technology that automatically drives along a specified route, and a technology that automatically sets a route when a destination is set, etc. All of these can be included.

The vehicle includes all vehicles including only an internal combustion engine, a hybrid vehicle including an internal combustion engine and an electric motor, and an electric vehicle including only an electric motor, and may include not only automobiles, but also trains and motorcycles.

In this case, the autonomous vehicle can be viewed as a robot having an autonomous driving function.

<Extended Reality (XR)>

The extended reality collectively refers to virtual reality (VR), augmented reality (AR), and mixed reality (MR). VR technology provides only CG images of real world objects or backgrounds, AR technology provides virtually created CG images on top of real object images, and MR technology is a computer graphic technology that mixes and combines virtual objects in the real world.

MR technology is similar to AR technology in that it shows real and virtual objects together. However, in AR technology, virtual objects are used in a form that complements real objects, whereas in MR technology, virtual objects and real objects are used with equal characteristics.

XR technology can be applied to HMD (Head-Mount Display), HUD (Head-Up Display), mobile phones, tablet PCs, laptops, desktops, TVs, digital signage, etc., and devices applied with XR technology may be called as XR devices.

FIG. 1 illustrates an AI device 100 according to an embodiment of the present disclosure.

The AI device 100 may be implemented as a fixed device or a movable device such as a TV, a projector, a mobile phone, a smartphone, a desktop computer, a laptop computer, a digital broadcasting terminal, a personal digital assistants (PDA), a portable multimedia player (PMP), a navigation, a tablet PC, a wearable device, a set-top box (STB), a DMB receiver, a radio, a washing machine, a refrigerator, a desktop computer, a digital signage, a robot, a vehicle, and the like.

Referring to FIG. 1, the terminal 100 may include a communication unit 110, an input unit 120, a learning processor 130, a sensing unit 140, an output unit 150, a memory 170, and a processor 180.

The communication unit 110 may transmit and receive data with external devices such as other AI devices 100a to 100e or the AI server 200 using wired/wireless communication technology. For example, the communication unit 110 may transmit and receive sensor information, a user input, a learning model, and a control signal with external devices.

Here, the communication technologies used by the communication unit 110 include Global System for Mobile communication (GSM), Code Division Multi Access (CDMA), Long Term Evolution (LTE), 5G, Wireless LAN (WLAN), and Wireless-Fidelity (Wi-Fi), Bluetooth™, Radio Frequency Identification (RFID), Infrared Data Association (IrDA), ZigBee, and Near Field Communication (NFC) and the like.

The input unit 120 may acquire various types of data.

Here, the input unit 120 may include a camera for inputting an image signal, a microphone for receiving an audio signal, and a user input unit for receiving information from a user. Here, by treating a camera or microphone as a sensor, a signal acquired from the camera or microphone may be referred to as sensing data or sensor information.

The input unit 120 may acquire input data to be used when acquiring an output by using training data for model training and the training model. The input unit 120 may obtain unprocessed input data, and in this case, the processor 180 or the learning processor 130 may extract an input feature as a pre-process for the input data.

The learning processor 130 may train a model composed of an artificial neural network using the training data. Here, the learned artificial neural network may be referred to as a learning model. The learning model can be used to infer a result value for new input data other than the training data, and the inferred value can be used as a basis for a decision to perform a certain operation.

In this case, the learning processor 130 may perform AI processing together with the learning processor 240 of the AI server 200.

Here, the learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 may acquire at least one of internal information of the AI device 100, information on the surrounding environment of the AI device 100, and user information by using various sensors.

Here, the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and a lidar, a radar, etc.

The output unit 150 may generate output related to visual, auditory or tactile sense.

Here, the output unit 150 may include a display unit that outputs visual information, a speaker that outputs auditory information, and a haptic module that outputs tactile information.

The memory 170 may store data supporting various functions of the AI device 100. For example, the memory 170 may store input data, training data, a learning model, and a learning history acquired from the input unit 120.

The processor 180 may determine at least one executable operation of the AI device 100 based on information determined or generated using a data analysis algorithm or a machine learning algorithm. Further, the processor 180 may perform a determined operation by controlling the components of the AI device 100.

To this end, the processor 180 may request, search, receive, or utilize data from the learning processor 130 or the memory 170, and may control the components of the AI device 100 to perform a predicted or desirable operation among the at least one executable operation.

Here, if connection of an external device is required to perform the determined operation, the processor 180 may generate a control signal for controlling the corresponding external device and transmit the generated control signal to the corresponding external device.

The processor 180 may obtain intention information for a user input, and determine a user's requirement based on the obtained intention information.

Here, the processor 180 may obtain intention information corresponding to the user input by using at least one of a Speech To Text (STT) engine for converting a speech input into a character string or a Natural Language Processing (NLP) engine for obtaining intention information of a natural language.

Here, at least one or more of the STT engine and the NLP engine may be composed of an artificial neural network at least partially trained according to a machine learning algorithm. In addition, at least one of the STT engine or the NLP engine may be learned by the learning processor 130, learned by the learning processor 240 of the AI server 200, or learned by distributed processing thereof.

The processor 180 may collect history information including user feedback on the operation content or operation of the AI device 100, and store it in the memory 170 or the learning processor 130, or transfer to an external device such as the AI server 200. The collected historical information can be used to update the learning model.

The processor 180 may control at least some of the components of the AI device 100 to drive an application program stored in the memory 170. Further, the processor 180 may operate by combining two or more of the components included in the AI device 100 to drive the application program.

Figure 2:
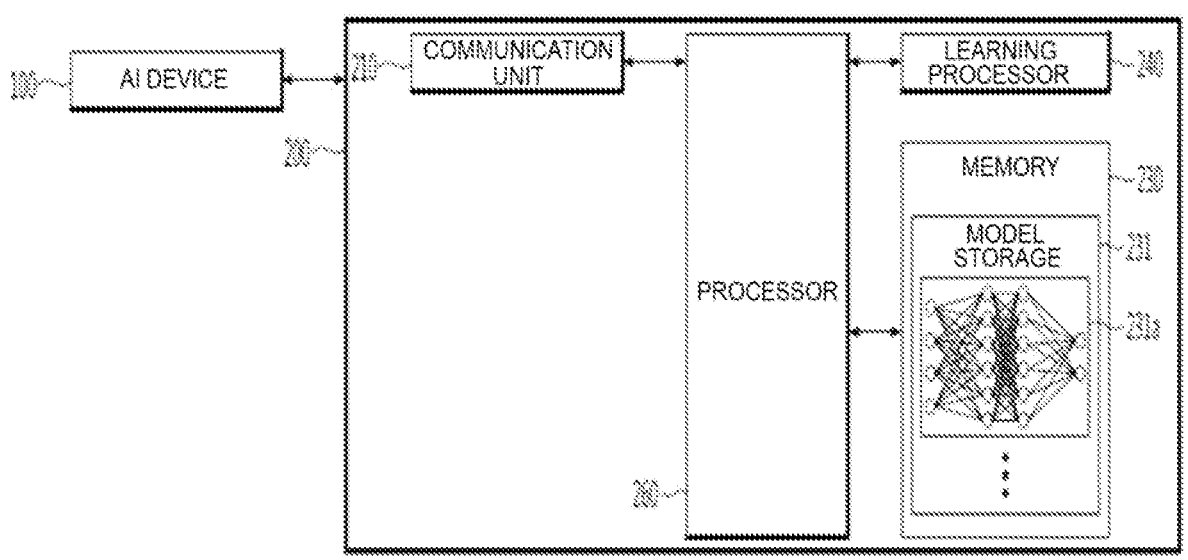
FIG. 2 shows an AI server 200 according to an embodiment of the present disclosure.

FIG. 2 illustrates an AI server 200 according to an embodiment of the present disclosure.

Referring to FIG. 2, the AI server 200 may refer to a device that trains an artificial neural network using a machine learning algorithm or uses the learned artificial neural network. Here, the AI server 200 may be composed of a plurality of servers to perform distributed processing, or may be defined as a 5G network. In this case, the AI server 200 may be included as a part of the AI device 100 to perform at least part of AI processing together.

The AI server 200 may include a communication unit 210, a memory 230, a learning processor 240, and a processor 260.

The communication unit 210 may transmit and receive data with an external device such as the AI device 100.

The memory 230 may include a model storage 231. The model storage 231 may store a model (or artificial neural network, 231a) being trained or trained through the learning processor 240.

The learning processor 240 may train the artificial neural network 231a using the training data. The learning model may be used while being mounted on the AI server 200 of an artificial neural network, or may be mounted on an external device such as the AI device 100 and used.

The learning model can be implemented in hardware, software, or a combination of hardware and software. When part or all of the learning model is implemented in software, one or more instructions constituting the learning model may be stored in the memory 230.

The processor 260 may infer a result value for new input data using the learning model, and generate a response or a control command based on the inferred result value.

Figure 3:
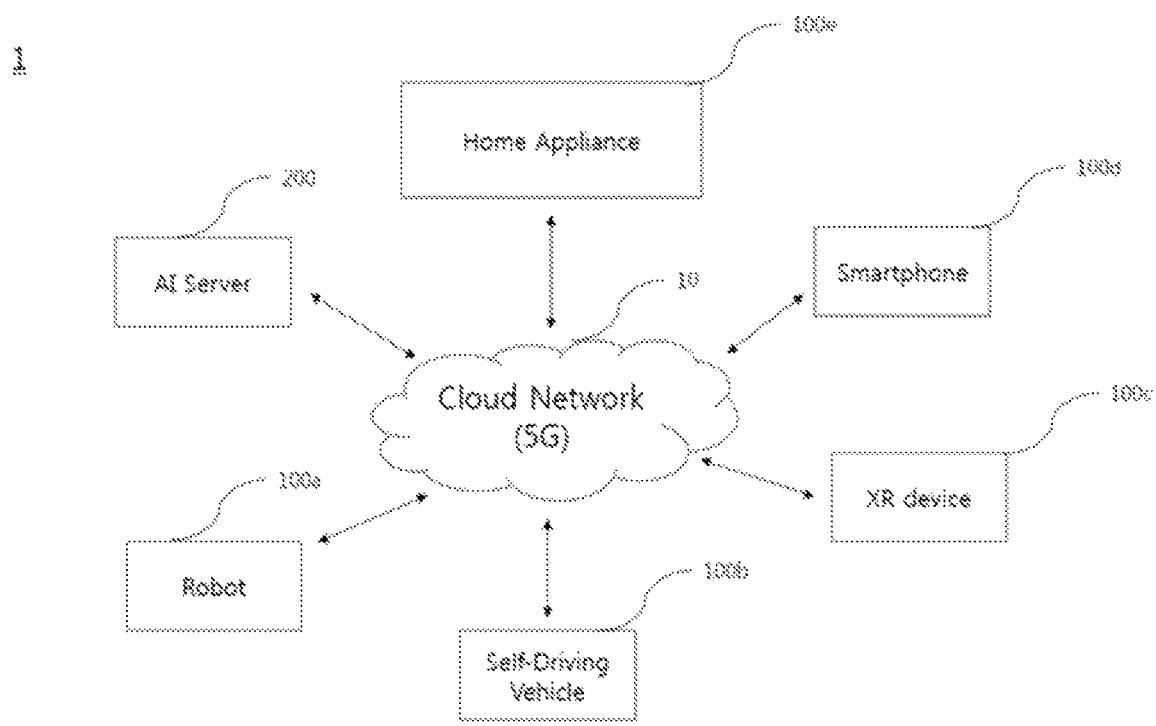
FIG. 3 shows an AI system 1 according to an embodiment of the present disclosure.

FIG. 3 illustrates an AI system 1 according to an embodiment of the present disclosure.

Referring to FIG. 3, the AI system 1 includes at least one of an AI server 200, a robot 100a, a self-driving (autonomous) vehicle 100b, an XR device 100c, a smartphone 100d, or a home appliance 100e. connected with the cloud network 10. Here, the robot 100a to which the AI technology is applied, the self-driving vehicle 100b, the XR device 100c, the smart phone 100d, or the home appliance 100e may be referred to as the AI devices 100a to 100e.

The cloud network 10 may constitute a part of the cloud computing infrastructure or may mean a network that exists in the cloud computing infrastructure. Here, the cloud network 10 may be configured using a 3G network, a 4G or long term evolution (LTE) network, or a 5G network.

That is, the devices 100a to 100e and 200 constituting the AI system 1 may be connected to each other through the cloud network 10. In particular, the devices 100a to 100e and 200 may communicate with each other through a base station, but may communicate with each other directly without through a base station.

The AI server 200 may include a server that performs AI processing and a server that performs an operation on big data.

The AI server 200 is connected through the cloud network 10 with at least one of the robot 100a, the self-driving vehicle 100b, the XR device 100c, the smartphone 100d, or a the home appliance 100e, which are AI devices constituting the AI system 1 and may help at least part of the AI processing of the connected AI devices 100a to 100e.

In this case, the AI server 200 may train an artificial neural network according to a machine learning algorithm in place of the AI devices 100a to 100e, and may directly store the learning model or transmit it to the AI devices 100a to 100e.

At this time, the AI server 200 may receive input data from the AI devices 100a to 100e, infer a result value for the received input data using a learning model, and generate a response or a control command based on the inferred result value, and transmit it to the AI devices 100a to 100e.

Alternatively, the AI devices 100a to 100e may infer a result value for input data using a direct learning model and generate a response or a control command based on the inferred result value.

Hereinafter, various embodiments of the AI devices 100a to 100e to which the above-described technology is applied will be described. Here, the AI devices 100a to 100e shown in FIG. 3 may be as a specific example of the AI device 100 shown in FIG. 1.

<AI+Robot>

The robot 100a is applied with AI technology and may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implementing the same as hardware.

The robot 100a may acquire status information of the robot 100a using sensor information obtained from various types of sensors, detect (recognizes) surrounding environments and objects, generate map data, decide a moving route and a driving plan, decide a response to user interaction, or decide an action.

Here, the robot 100a may use sensor information obtained from at least one sensor among a lidar, a radar, and a camera in order to determine the moving route and the driving plan.

The robot 100a may perform the above operations using a learning model composed of at least one artificial neural network. For example, the robot 100a may recognize a surrounding environment and an object using a learning model, and may determine an operation using the recognized surrounding environment information or object information. Here, the learning model may be directly learned by the robot 100a or learned by an external device such as the AI server 200.

Here, the robot 100a may perform an operation by generating a result using a direct learning model, but it may transmit sensor information to an external device such as the AI server 200 and perform the operation by receiving the result generated accordingly.

The robot 100a may determine the moving route and the driving plan using at least one of map data, object information detected from sensor information, or object information obtained from an external device, and may control the driving unit to drive the robot 100a according to the determined moving route and driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, type, distance, and location.

In addition, the robot 100a may perform an operation or run by controlling a driving unit based on a user's control/interaction. In this case, the robot 100a may acquire interaction intention information according to a user's motion or voice speech, and determine a response based on the obtained intention information to perform the operation.

<AI+Autonomous Driving>

The self-driving (autonomous) vehicle 100b may be implemented as a mobile robot, vehicle, or unmanned aerial vehicle by applying AI technology.

The self-driving vehicle 100b may include an autonomous driving control module for controlling an autonomous driving function, and the autonomous driving control module may refer to a software module or a chip implementing the same as hardware. The autonomous driving control module may be included inside as a configuration of the self-driving vehicle 100b, but may be configured as separate hardware and connected to the exterior of the self-driving vehicle 100b.

The self-driving vehicle 100b may acquire status information of the self-driving vehicle 100b using sensor information obtained from various types of sensors, detect (recognizes) surrounding environments and objects, generate map data, decide a moving route and a driving plan, decide a response to user interaction, or decide an action.

Here, the self-driving vehicle 100b may use sensor information obtained from at least one sensor among a lidar, a radar, and a camera, similar to the robot 100a, in order to determine the moving route and the driving plan.

In particular, the self-driving vehicle 100b may recognize an environment or object in an area where the field of view is obscured or an area greater than a certain distance by receiving sensor information from external devices or directly recognized information from external devices.

The self-driving vehicle 100b may perform the above operations using a learning model composed of at least one artificial neural network. For example, the self-driving vehicle 100b may recognize a surrounding environment and an object using a learning model, and may determine a driving path using the recognized surrounding environment information or object information. Here, the learning model may be directly learned by the self-driving vehicle 100b or learned by an external device such as the AI server 200.

Here, the self-driving vehicle 100b may perform an operation by generating a result using a direct learning model, but it may transmit sensor information to an external device such as the AI server 200 and perform the operation by receiving the result generated accordingly.

The self-driving vehicle 100*b* may determine the moving route and the driving plan using at least one of map data, object information detected from sensor information, or object information obtained from an external device, and may control the driving unit to drive the self-driving vehicle 100*b* according to the determined moving route and driving plan.

The map data may include object identification information on various objects arranged in a space (e.g., road) in which the self-driving (autonomous) vehicle 100*b* moves. For example, the map data may include object identification information on fixed objects such as street lights, rocks, and buildings and movable objects such as vehicles and pedestrians. In addition, the object identification information may include a name, type, distance, and location.

In addition, the self-driving vehicle 100*b* may perform an operation or drive by controlling a driving unit based on a user's control/interaction. In this case, the self-driving vehicle 100*b* may acquire interaction intention information according to a user's motion or voice speech, and determine a response based on the obtained intention information to perform the operation.

<AI+XR>

The XR device 100*c* is applied with AI technology, and may be implemented as HMD (Head-Mount Display), HUD (Head-Up Display) provided in the vehicle, a TV, a mobile phone, a smart phone, a computer, a wearable device, a home appliance, a digital signage, a vehicle, a fixed robot or a mobile robot.

The XR device 100*c* may acquire information on a surrounding space or a real object by analyzing 3D point cloud data or image data acquired through various sensors or from an external device to generate location data and attribute data for 3D points, and may render the XR object to be displayed to output. For example, the XR apparatus 100*c* may output an XR object including additional information on the recognized object corresponding to the recognized object.

The XR apparatus 100*c* may perform the above operations using a learning model composed of at least one artificial neural network. For example, the XR device 100*c* may recognize a real object from 3D point cloud data or image data using a learning model, and may provide information corresponding to the recognized real object. Here, the learning model may be directly learned by the XR device 100*c* or learned by an external device such as the AI server 200.

At this time, the XR device 100*c* may directly generate a result using a learning model to perform an operation, but may also transmit sensor information to an external device such as the AI server 200 and receive the generated result to perform the operation.

<AFrobot+Autonomous Driving>

The robot 100*a* may be implemented as a guide robot, a transport robot, a cleaning robot, a wearable robot, an entertainment robot, a pet robot, an unmanned flying robot, etc. by applying AI technology and autonomous driving technology.

The robot 100*a* to which AI technology and autonomous driving technology are applied may refer to a robot having an autonomous driving function or a robot 100*a* interacting with the self-driving vehicle 100*b*.

The robot 100*a* having an autonomous driving function may collectively refer to devices that move by themselves according to a given movement line without the user's control or by determining the movement line by themselves.

The robot 100*a* having an autonomous driving function and the self-driving vehicle 100*b* may use a common sensing method to determine one or more of a moving route or a driving plan. For example, the robot 100*a* having an autonomous driving function and the self-driving vehicle 100*b* may determine one or more of a movement route or a driving plan using information sensed through a lidar, a radar, and a camera.

The robot 100*a* interacting with the self-driving vehicle 100*b* exists separately from the self-driving vehicle 100*b* and may be linked to an autonomous driving function inside or outside the autonomous driving vehicle 100*b*, or may perform an operation associated with the user on board in the self-driving vehicle 100*b*.

Here, the robot 100*a* interacting with the self-driving vehicle 100*b* may control or assist the autonomous driving function of the self-driving vehicle 100*b* by acquiring sensor information on behalf of the self-driving (autonomous) vehicle 100*b* to provide it to the self-driving vehicle 100*b*, or acquiring sensor information and generating object information on the surrounding environment to provide it to the self-driving vehicle 100*b*.

Alternatively, the robot 100*a* interacting with the self-driving vehicle 100*b* may monitor a user in the self-driving vehicle 100*b* or control functions of the self-driving vehicle 100*b* through interaction with the user. For example, when it is determined that the driver is in a drowsy state, the robot 100*a* may activate an autonomous driving function of the self-driving vehicle 100*b* or assist in controlling the driving unit of the self-driving vehicle 100*b*. Here, the functions of the self-driving vehicle 100*b* controlled by the robot 100*a* may include not only an autonomous driving function, but also functions provided by a navigation system or an audio system provided inside the self-driving vehicle 100*b*.

Alternatively, the robot 100*a* interacting with the self-driving vehicle 100*b* may provide information or assist a function to the self-driving vehicle 100*b* from outside of the self-driving vehicle 100*b*. For example, the robot 100*a* may provide traffic information including signal information to the self-driving vehicle 100*b*, such as a smart traffic light, or automatically connect an electric charger to the charging port by interacting with the self-driving vehicle 100*b*, such as an automatic electric charger for an electric vehicle.

<AI+Robot+XR>

The robot 100*a* may be implemented as a guide robot, a transport robot, a cleaning robot, a wearable robot, an entertainment robot, a pet robot, an unmanned flying robot, a drone, etc. by applying AI technology and XR technology.

The robot 100*a* to which the XR technology is applied may refer to a robot to be controlled/interacted within an XR image. In this case, the robot 100*a* is distinguished from the XR device 100*c* and may be interacted with each other.

When the robot 100*a*, which is the object of control/interaction in the XR image, acquires sensor information from sensors including a camera, the robot 100*a* or the XR device 100*c* may generate an XR image based on the sensor information, and XR device 100*c* may output the generated XR image. In addition, the robot 100*a* may operate based on a control signal input through the XR device 100*c* or a user's interaction.

For example, the user may check the XR image corresponding to the viewpoint of the robot 100*a* linked remotely through an external device such as the XR device 100*c*, and may adjust the autonomous driving path of the robot 100*a* through the interaction, or control motion or driving, or check information on surrounding objects.

<AI+Autonomous Driving+XR>

The self-driving (autonomous) vehicle 100b may be implemented as a mobile robot, a vehicle, or an unmanned aerial vehicle by applying AI technology and XR technology.

The self-driving vehicle 100b to which the XR technology is applied may mean an autonomous driving vehicle including a means for providing an XR image, or an autonomous driving vehicle that is an object of control/interaction within the XR image. In particular, the self-driving vehicle 100b, which is an object of control/interaction in the XR image, is distinguished from the XR device 100c and may be interacted with each other.

The self-driving vehicle 100b having a means for providing an XR image may acquire sensor information from sensors including a camera, and may output an XR image generated based on the acquired sensor information. For example, the self-driving vehicle 100b may provide an XR object corresponding to a real object or an object in a screen to the occupant by outputting an XR image with a HUD.

In this case, when the XR object is output to the HUD, at least a part of the XR object may be output to overlap the actual object facing the occupant's gaze. On the other hand, when the XR object is output on a display provided inside the self-driving vehicle 100b, at least a part of the XR object may be output to overlap an object in the screen. For example, the self-driving vehicle 100b may output XR objects corresponding to objects such as lanes, other vehicles, traffic lights, traffic signs, motorcycles, pedestrians, and buildings.

When the self-driving vehicle 100b, which is an object of control/interaction in the XR image, acquires sensor information from sensors including a camera, the self-driving vehicle 100b or the XR device 100c may generate an XR image based on the sensor information, and output the generated XR image. In addition, the self-driving vehicle 100b may operate based on a control signal input through an external device such as the XR device 100c or a user's interaction.

<General LTE System>

Figure 4:
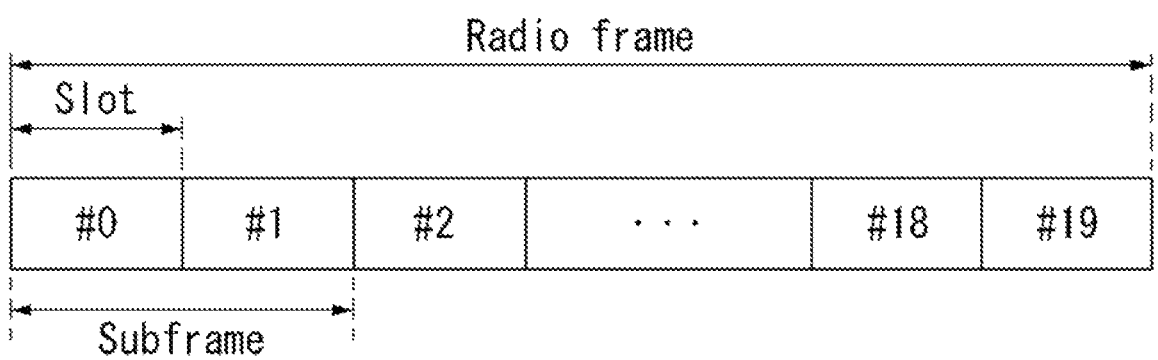
FIG. 4 is a diagram showing an example of an LTE radio frame structure.

FIG. 4 is a diagram illustrating an example of the structure of a radio frame of LTE.

In FIG. 4, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 5:
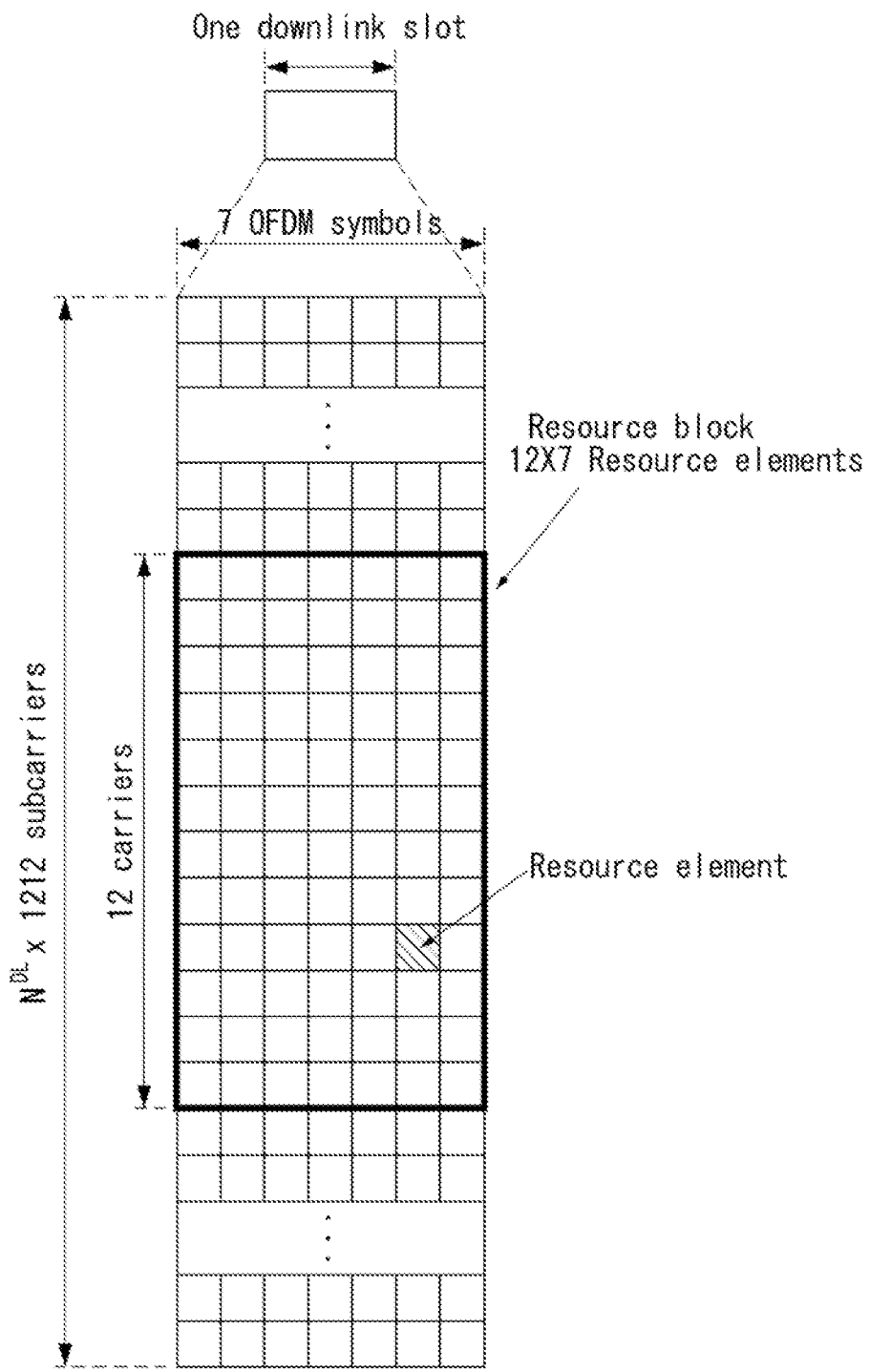
FIG. 5 is a diagram illustrating an example of a resource grid for a downlink slot.

FIG. 5 is a diagram illustrating an example of a resource grid for downlink slot.

In FIG. 5, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 6:
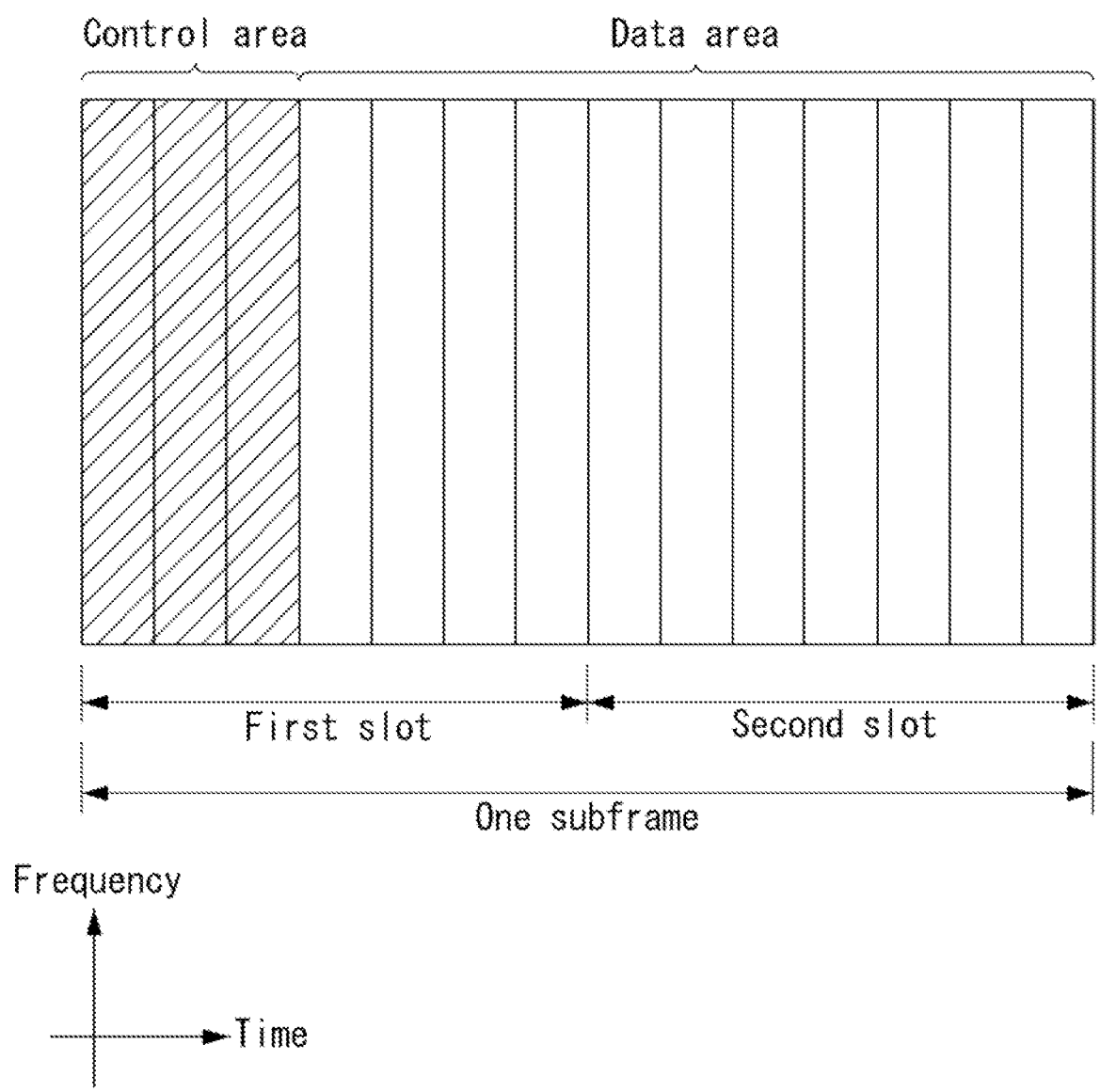
FIG. 6 shows an example of a downlink subframe structure.

FIG. 6 is a diagram illustrating an example of the structure of downlink subframe.

In FIG. 6, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 7:
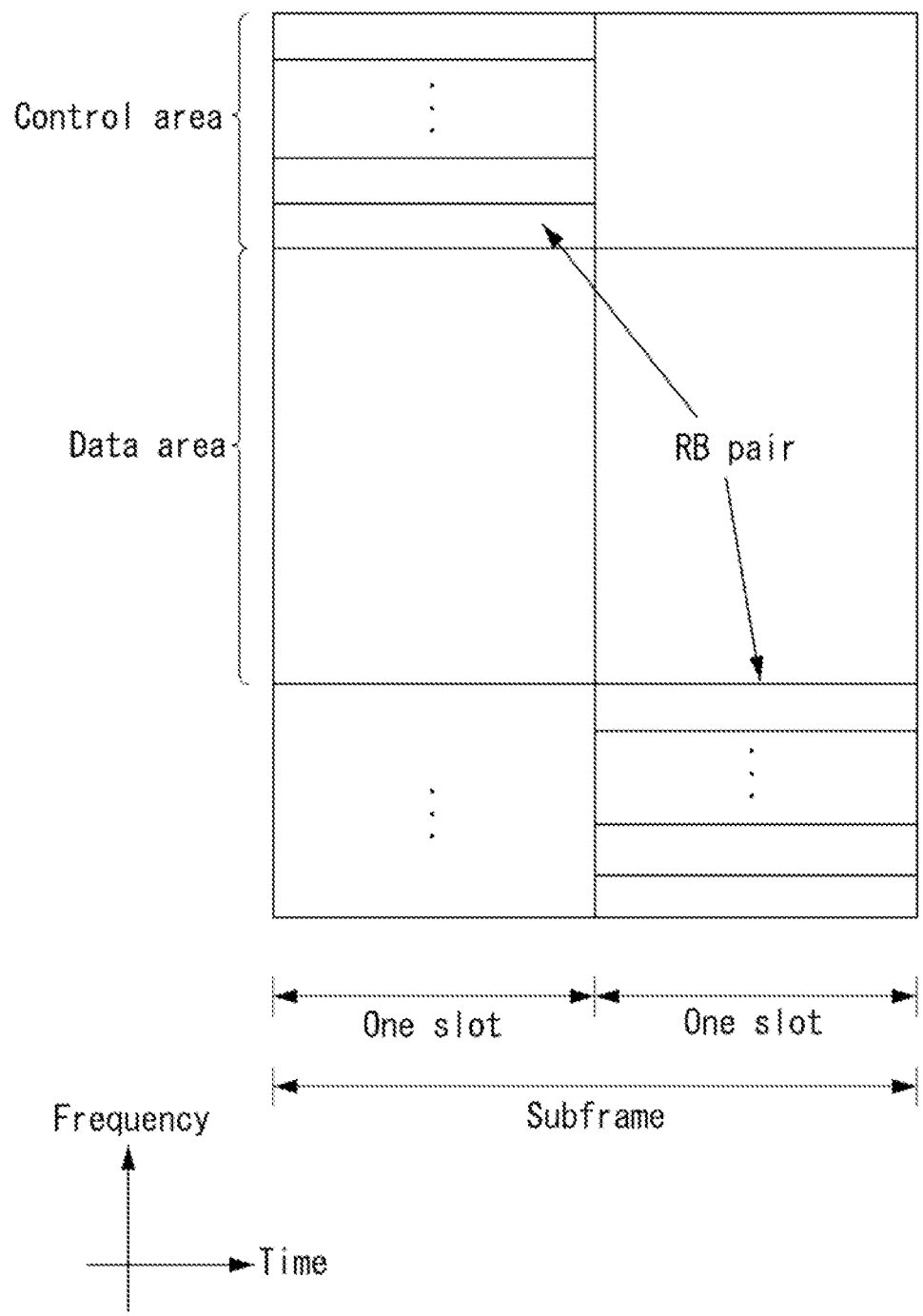
FIG. 7 shows an example of an uplink subframe structure.

FIG. 7 is a diagram illustrating an example of the structure of uplink subframe.

In FIG. 7, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, the LTE frame structure will be described in more detail.

Throughout LTE specification, unless otherwise noted, the size of various fields in the time domain is expressed as a number of time units $T_s=1/(15000\times2048)$ seconds.

Downlink and uplink transmissions are organized into radio frames with $T_f=307200\times T_s=10$ ms duration. Two radio frame structures are supported:

Type 1, applicable to FDD
Type 2, applicable to TDD
Frame Structure Type 1

Frame structure type 1 is applicable to both full duplex and half duplex FDD. Each radio frame is $T_f=307200\cdot T_s=10$ ms long and consists of 20 slots of length $T_{slot}=15360\cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Figure 8:
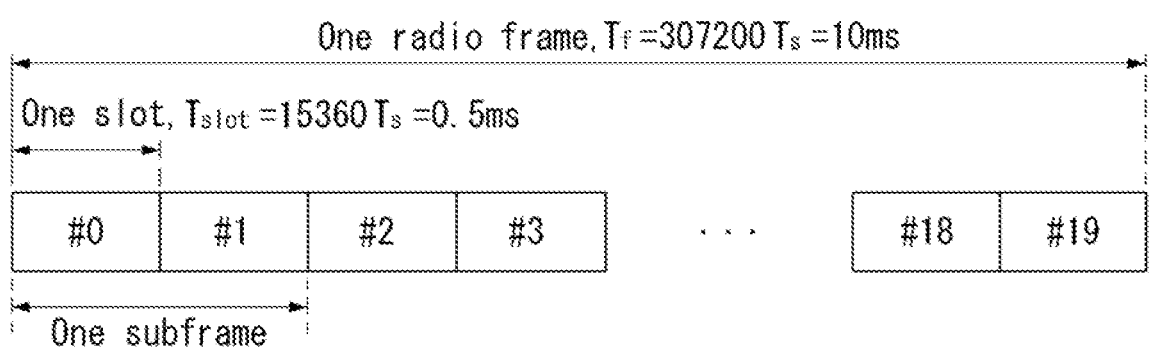
FIG. 8 shows an example of frame structure type 1.

FIG. 8 illustrates an example of the frame structure type 1.

Frame Structure Type 2

Frame structure type 2 is applicable to FDD. Each radio frame of length $T_f=307200\times T_s=10$ ms consists of two half-frames of length $15360\cdot T_s=0.5$ ms each. Each half-frame consists of five subframes of length $30720\cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720\cdot T_s=1$ ms. Each subframe i is defined as two slots, 2i and 2i+1 of length $T_{slot}=15360\cdot T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

Figure 9:
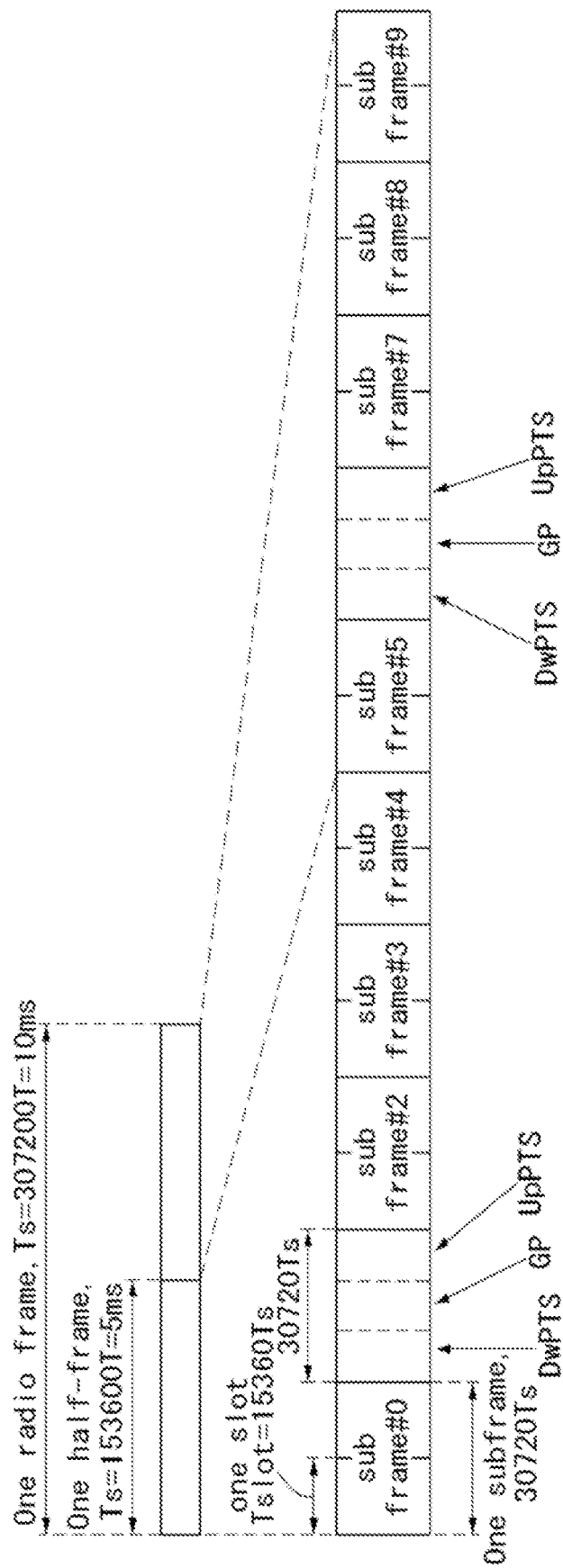
FIG. 9 is a view showing another example of the frame structure type 2.

FIG. 9 is a diagram illustrating another example of the frame structure type 2.

Table 1 shows an example of a configuration of a special subframe.

TABLE 1

| Special subframe configuration | normal cyclic prefix in downlink | | | extended cyclic prefix in downlink | | |
|---|---|---|---|---|---|---|
| | | UpPTS | | | UpPTS | |
| | DwPTS | normal cyclic prefix in uplink | extended cyclic prefix in uplink | DwPTS | normal cyclic prefix in uplink | extended cyclic prefix in uplink |
| 0 | $6592\cdot T_s$ | $2192\cdot T_s$ | $2560\cdot T_s$ | $7680\cdot T_s$ | $2192\cdot T_s$ | $2560\cdot T_s$ |
| 1 | $19760\cdot T_s$ | | | $20480\cdot T_s$ | | |
| 2 | $21952\cdot T_s$ | | | $23040\cdot T_s$ | | |
| 3 | $24144\cdot T_s$ | | | $25600\cdot T_s$ | | |
| 4 | $26336\cdot T_s$ | | | $7680\cdot T_s$ | $4384\cdot T_s$ | $5120\cdot T_s$ |
| 5 | $6592\cdot T_s$ | | $5120\cdot T_s$ | $20480\cdot T_s$ | | |
| 6 | $19760\cdot T_s$ | $4384\cdot T_s$ | | $23040\cdot T_s$ | | |
| 7 | $21952\cdot T_s$ | | | — | — | — |
| 8 | $24144\cdot T_s$ | | | — | — | — |

Table 2 shows an example of an uplink-downlink configuration.

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

<NB-IoT>

NB-IoT (narrowband-internet of things) is a standard for supporting low complexity and low cost devices and is defined to perform only relatively simple operations compared to existing LTE devices. NB-IoT follows the basic structure of LTE, but operates based on the contents defined below. If the NB-IoT reuses an LTE channel or signal, it may follow the standard defined in the existing LTE.

Uplink

The following narrowband physical channels are defined:

NPUSCH (Narrowband Physical Uplink Shared Channel)

NPRACH (Narrowband Physical Random Access Channel)

The following uplink narrowband physical signals are defined:

Narrowband demodulation reference signal

The uplink bandwidth in terms of subcarriers $N_{sc}^{UL}$, and the slot duration $T_{slot}$ are given in Table 3.

Table 3 shows an example of NB-IoT parameters.

TABLE 3

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

A single antenna port p=0 is used for all uplink transmissions.

Resource Unit

Resource units are used to describe the mapping of the NPUSCH to resource elements. A resource unit is defined as $N_{symb}^{UL} N_{slots}^{UL}$ consecutive SC-FDMA symbols in the time domain and $N_{sc}^{RU}$ consecutive subcarriers in the frequency domain, where $N_{sc}^{RU}$ and $N_{symb}^{UL}$ are given by Table 4.

Table 4 shows an example of supported combinations of $N_{sc}^{RU}$, $N_{slots}^{UL}$ and $N_{symb}^{UL}$.

TABLE 4

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

Narrowband Uplink Shared Channel (NPUSCH)

The narrowband physical uplink shared channel supports two formats:

NPUSCH format 1, used to carry the UL-SCH

NPUSCH format 2, used to carry uplink control information

Scrambling shall be done according to clause 5.3.1 of TS36.211. The scrambling sequence generator shall be initialized with $c_{init} = n_{RNTI} \cdot 2^{14} + n_f \mod 2 \cdot 2^{13} + \lfloor n_s/2 \rfloor + N_{ID}^{Ncell}$ where $n_s$ is the first slot of the transmission of the codeword. In case of NPUSCH repetitions, the scrambling sequence shall be reinitialized according to the above formula after every $M_{identical}^{NPUSCH}$ transmission of the codeword with $n_s$ and $n_f$ set to the first slot and the frame, respectively, used for the transmission of the repetition. The quantity $n_{identical}^{NPUSCH}$ is given by clause 10.1.3.6 in TS36.211.

Table 5 specifies the modulation mappings applicable for the narrowband physical uplink shared channel.

TABLE 5

| NPUSCH format | $N_{sc}^{RU}$ | Modulation scheme |
|---|---|---|
| 1 | 1 | BPSK, QPSK |
|   | >1 | QPSK |
| 2 | 1 | BPSK |

NPUSCH can be mapped to one or more than one resource units, $N_{RU}$, as given by clause 16.5.1.2 of 3GPP TS 36.213, each of which shall be transmitted $M_{rep}^{NPUSCH}$ times.

The block of complex-valued symbols z(0), . . . , $z(M_{rep}^{NPUSCH}-1)$ shall be multiplied with the amplitude scaling factor $\beta_{NPUSCH}$ in order to conform to the transmit power $P_{NPUSCH}$ specified in 3GPP TS 36.213, and mapped in sequence starting with z(0) to subcarriers assigned for transmission of NPUSCH. The mapping to resource elements (k, l) corresponding to the subcarriers assigned for transmission and not used for transmission of reference signals, shall be in increasing order of first the index k, then the index l, starting with the first slot in the assigned resource unit.

After mapping to $N_{slots}$ slots, the $N_{slots}$ slots shall be repeated $M_{identical}^{NPUSCH}-1$ additional times, before continuing the mapping of z(•) to the following slot, where Equation 1, $$M_{idendical}^{NPUSCH} = \begin{cases} \min(\lceil M_{rep}^{NPUSCH}/2 \rceil, 4) & N_{sc}^{RU} > 1 \\ 1 & N_{sc}^{RU} = 1 \end{cases} \quad \text{[Equation 1]}$$

$$N_{slots} = \begin{cases} 1 & \Delta f = 3.75 \text{ kHz} \\ 2 & \Delta f = 15 \text{ kHz} \end{cases}$$

If a mapping to $N_{slots}$ slots or a repetition of the mapping contains a resource element which overlaps with any configured NPRACH resource according to NPRACH-ConfigSIB-NB, the NPUSCH transmission in overlapped $N_{slots}$ slots is postponed until the next $N_{slots}$ slots not overlapping with any configured NPRACH resource.

The mapping of z(0), . . . , $z(M_{rep}^{NPUSCH}-1)$ is then repeated until $M_{rep}^{NPUSCH} N_{RU} N_{slots}^{UL}$ slots have been transmitted. After transmissions and/or postponements due to NPRACH of 256·30720$T_s$ time units, a gap of 40·30720$T_s$ time units shall be inserted where the NPUSCH transmission is postponed. The portion of a postponement due to NPRACH which coincides with a gap is counted as part of the gap.

When higher layer parameter npusch-AllSymbols is set to false, resource elements in SC-FDMA symbols overlapping with a symbol configured with SRS according to srs-SubframeConfig shall be counted in the NPUSCH mapping but not used for transmission of the NPUSCH. When higher layer parameter npusch-All Symbols is set to true, all symbols are transmitted.

Uplink control information on NPUSCH without UL-SCH data

The one bit information of HARQ-ACK $o_0^{ACK}$ is coded according to Table 6, where for a positive acknowledgement $o_0^{ACK}=1$ and for a negative acknowledgement $o_0^{ACK}=0$.

Table 6 shows an example of HARQ-ACK code words.

TABLE 6

| HARQ-ACK $<o_0^{ACK}>$ | HARQ-ACK $<b_0, b_1, b_2, \ldots, b_{15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

The UE transmit power for NPUSCH transmission in NB-IoT UL slot i for the serving cell is given by Equation 2 and 3 below.

If the number of repetitions of the allocated NPUSCH RUs is greater than 2, $$P_{NPUSCH,c}(i) = P_{CMAX,c}(i) [\text{dBm}] \quad \text{[Equation 2]}$$

Otherwise, $$P_{NPUSCH,c}(i) = \min \begin{cases} P_{CMAX,c}(i), \\ 10\log_{10}(M_{NPUSCH,c}(i)) + P_{O\_NPUSCH,c}(j) + \alpha_c(j) \cdot PL_c \end{cases}$$
$$[\text{dBm}] \quad \text{[Equation 3]}$$

where, $P_{CMAX,c}(i)$ is the configured UE transmit power defined in 3GPP TS36.101 in NB-IoT UL slot i for serving cell c.

$M_{NPUSCH,c}$ is $\{1/4\}$ for 3.75 kHz subcarrier spacing and $\{1, 3, 6, 12\}$ for 15 kHz subcarrier spacing $P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c where $j \in \{1,2\}$. For NPUSCH (re)transmissions corresponding to a dynamic scheduled grant then j=1 and for NPUSCH (re)transmissions corresponding to the random access response grant then j=2.

$P_{O\_Ue\_NPUSCH,c}(2)=0$ and $P_{O\_NORMINAL\_NPUSCH,c}(2) = P_{O\_PRE} + \Delta_{PREAMBLE\_Msg3}$, where the parameter preamble-InitialReceivedTargetPower $P_{O\_PRE}$ and $\Delta_{PREAMBLE\_Msg3}$ are signalled from higher layers for serving cell c.

For j=1, for NPUSCH format 2, $a_c(j)=1$; for NPUSCH format 1, $a_c(j)$ is provided by higher layers for serving cell c. For j=2, $a_c(j)=1$.

$PL_c$ is the downlink path loss estimate calculated in the UE for serving cell c in dB and $PL_c$=nrs-Power+nrs-PowerOffsetNonAnchor−higher layer filtered NRSRP, where nrs-Power is provided by higher layers and Subclause 16.2.2 in 3GPP 36.213, and nrs-powerOffsetNonAnchor is set to zero if it is not provided by higher layers and NRSRP is defined in 3GPP TS 36.214 for serving cell c and the higher layer filter configuration is defined in 3GPP TS 36.331 for serving cell c.

If the UE transmits NPUSCH in NB-IoT UL slot i for serving cell c, power headroom is computed using Equation 4 below.

$$PH_c(i) = P_{CMAX,c}(i) - \{P_{O\_NPUSCH,c}(1) + a_c(1) \cdot PL_c\}[\text{dB}] \quad \text{[Equation 4]}$$

UE Procedure for Transmitting Format 1 NPUSCH

A UE shall upon detection on a given serving cell of a NPDCCH with DCI format N0 ending in NB-IoT DL subframe n intended for the UE, perform, at the end of n+$k_0$ DL subframe, a corresponding NPUSCH transmission using NPUSCH format 1 in N consecutive NB-IoT UL slots $n_i$ with i=0, 1, . . . , N−1 according to the NPDCCH information where subframe n is the last subframe in which the NPDCCH is transmitted and is determined from the starting subframe of NPDCCH transmission and the DCI subframe repetition number field in the corresponding DCI; and $N=N_{Rep}N_{RU}N_{slots}^{UL}$, where the value of $N_{Rep}$ is determined by the repetition number field in the corresponding DCI, the value of $N_{RU}$ is determined by the resource assignment field in the corresponding DCI, and the value of $N_{slots}^{UL}$ is the number of NB-IoT UL slots of the resource unit corresponding to the allocated number of subcarriers in the corresponding DCI, $n_0$ is the first NB-IoT UL slot starting after the end of subframe n+$k_0$ value of $k_0$ is determined by the scheduling delay field ($I_{Delay}$) in the corresponding DCI according to Table 7.

Table 7 shows an example of k0 for DCI format N0.

TABLE 7

| $I_{Delay}$ | $k_0$ |
|---|---|
| 0 | 8 |
| 1 | 16 |
| 2 | 32 |
| 3 | 64 |

The resource allocation information in uplink DCI format N0 for NPUSCH transmission indicates to a scheduled UE a set of contiguously allocated subcarriers ($n_{sc}$) of a resource unit determined by the Subcarrier indication field in the corresponding DCI, a number of resource units ($N_{RU}$) determined by the resource assignment field in the corresponding DCI according to Table 9, a repetition number ($N_{Rep}$) determined by the repetition number field in the corresponding DCI according to Table 10.

The subcarrier spacing $\Delta f$ of NPUSCH transmission is determined by the uplink subcarrier spacing field in the Narrowband Random Access Response Grant according to Subclause 16.3.3 in 3GPP TS36.213.

For NPUSCH transmission with subcarrier spacing $\Delta f$=3.75 kHz, $n_{sc}=I_{sc}$ where $I_{sc}$ is the subcarrier indication field in the DCI.

For NPUSCH transmission with subcarrier spacing $\Delta f$=15 kHz, the subcarrier indication field ($I_{sc}$) in the DCI determines the set of contiguously allocated subcarriers ($n_{sc}$) according to Table 8.

Table 8 shows an example of subcarriers allocated to the NPUSCH having $\Delta f$=15 kHz.

TABLE 8

| Subcarrier indication field ($I_{sc}$) | Set of Allocated subcarriers ($n_{sc}$) |
|---|---|
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |
| 18 | $\{0, 1, 2, 3, 4, 5, 6, 7, 8, 9, 10, 11\}$ |
| 19-63 | Reserved |

Table 9 shows an example of the number of resource units for NPUSCH.

TABLE 9

| $I_{RU}$ | $N_{RU}$ |
|---|---|
| 0 | 1 |
| 1 | 2 |
| 2 | 3 |

TABLE 9-continued

| $I_{RU}$ | $N_{RU}$ |
|---|---|
| 3 | 4 |
| 4 | 5 |
| 5 | 6 |
| 6 | 8 |
| 7 | 10 |

Table 10 shows an example of the number of repetitions for NPUSCH.

TABLE 10

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

The reference signal sequence $\bar{r}_u(n)$ for $N_{sc}^{RU}=1$ is defined by Equation 5 below.

$$r_u(n) = \frac{1}{\sqrt{2}}(1+j)(1-2c(n))w(n \bmod 16), \quad [\text{Equation 5}]$$
$$0 \leq n < M_{rep}^{NPUSCH} N_{RU} N_{slots}^{UL}$$

where the binary sequence $c(n)$ is defined by clause 7.2 of TS36.211 and shall be initialized with $c_{init}=35$ at the start of the NPUSCH transmission. The quantity $w(n)$ is given by Table 1-11 where $u=N_{ID}^{Ncell} \bmod 16$ for NPUSCH format 2, and for NPUSCH format 1 if group hopping is not enabled, and by clause 10.1.4.1.3 of 3GPP TS36.211 if group hopping is enabled for NPUSCH format 1.

Table 11 shows an example of $w(n)$.

TABLE 11

| u | w(0), . . . , w(15) |
|---|---|
| 0  | 1  1  1  1  1  1  1  1  1  1  1  1  1  1  1  1 |
| 1  | 1 −1  1 −1  1 −1  1 −1  1 −1  1 −1  1 −1  1 −1 |
| 2  | 1  1 −1 −1  1  1 −1 −1  1  1 −1 −1  1  1 −1 −1 |
| 3  | 1 −1 −1  1  1 −1 −1  1  1 −1 −1  1  1 −1 −1  1 |
| 4  | 1  1  1  1 −1 −1 −1 −1  1  1  1  1 −1 −1 −1 −1 |
| 5  | 1 −1  1 −1 −1  1 −1  1  1 −1  1 −1 −1  1 −1  1 |
| 6  | 1  1 −1 −1 −1 −1  1  1  1  1 −1 −1 −1 −1  1  1 |
| 7  | 1 −1 −1  1 −1  1  1 −1  1 −1 −1  1 −1  1  1 −1 |
| 8  | 1  1  1  1  1  1  1  1 −1 −1 −1 −1 −1 −1 −1 −1 |
| 9  | 1 −1  1 −1  1 −1  1 −1 −1  1 −1  1 −1  1 −1  1 |
| 10 | 1  1 −1 −1  1  1 −1 −1 −1 −1  1  1 −1 −1  1  1 |
| 11 | 1 −1 −1  1  1 −1 −1  1 −1  1  1 −1 −1  1  1 −1 |
| 12 | 1  1  1  1 −1 −1 −1 −1 −1 −1 −1 −1  1  1  1  1 |
| 13 | 1 −1  1 −1 −1  1 −1  1 −1  1 −1  1  1 −1  1 −1 |
| 14 | 1  1 −1 −1 −1 −1  1  1 −1 −1  1  1  1  1 −1 −1 |
| 15 | 1 −1 −1  1 −1  1  1 −1 −1  1  1 −1  1 −1 −1  1 |

The reference signal sequence for NPUSCH format 1 is given by Equation 6 below.

$$r_u(n) = \bar{r}_u(n) \quad [\text{Equation 6}]$$

The reference signal sequence for NPUSCH format 2 is given by Equation 7 below.

$$r_u(3n+m) = \bar{w}(m)\bar{r}_u(n), m=0,1,2 \quad [\text{Equation 7}]$$

where $\bar{w}(m)$ is defined in Table 5.5.2.2.1-2 of 3GPP TS36.211 with the sequence index chosen according to $$\left(\sum_{i=0}^{7} c(8n_s + i)2^i\right) \bmod 3$$

with $c_{init} = N_{ID}^{Ncell}$.

The reference signal sequences $r_u(n)$ for $N_{sc}^{RU} > 1$ is defined by a cyclic shift $\alpha$ of a base sequence according to Equation 8 below.

$$r_u(n) = e^{j\alpha n} e^{j\phi(n)\pi/4}, \quad 0 \leq n < N_{sc}^{RU} \quad [\text{Equation 8}]$$

where $\varphi(n)$ is given by Table 10.1.4.1.2-1 for $N_{sc}^{RU}=3$, Table 12 for $N_{sc}^{RU}=6$ and Table 13 for $N_{sc}^{RU}=12$.

If group hopping is not enabled, the base sequence index u is given by higher layer parameters threeTone-BaseSequence, sixTone-BaseSequence, and twelveTone-BaseSequence for $N_{sc}^{RU}=3$, $N_{sc}^{RU}=6$, and $N_{sc}^{RU}=12$ respectively. If not signalled by higher layers, the base sequence is given by Equation 9 below.

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases} \quad [\text{Equation 9}]$$

If group hopping is enabled, the base sequence index u is given by clause 10.1.4.1.3 of 3GPP TS36.211.

The cyclic shift $\alpha$ for $N_{sc}^{RU}=3$ and $N_{sc}^{RU}=6$ is derived from higher layer parameters threeTone-CyclicShift and sixTone-CyclicShift, respectively, as defined in Table 14. For $N_{sc}^{RU}=12$, $\alpha=0$.

Table 12 shows an example of $\varphi(n)$ for $N_{sc}^{RU}=3$

TABLE 12

| u | $\varphi(0), \varphi(1), \varphi(2)$ |
|---|---|
| 0 | 1  −3  −3 |
| 1 | 1  −3  −1 |
| 2 | 1  −3   3 |

TABLE 12-continued

| u | φ(0), φ(1), φ(2) | | |
|---|---|---|---|
| 3 | 1 | −1 | −1 |
| 4 | 1 | −1 | 1 |
| 5 | 1 | −1 | 3 |
| 6 | 1 | 1 | −3 |
| 7 | 1 | 1 | −1 |
| 8 | 1 | 1 | 3 |
| 9 | 1 | 3 | −1 |
| 10 | 1 | 3 | 1 |
| 11 | 1 | 3 | 3 |

Table 13 shows another example of φ(n) for $N_{sc}^{RU}=6$

TABLE 13

| u | φ(0), ..., φ(5) | | | | | |
|---|---|---|---|---|---|---|
| 0 | 1 | 1 | 1 | 1 | 3 | −3 |
| 1 | 1 | 1 | 3 | 1 | −3 | 3 |
| 2 | 1 | −1 | −1 | −1 | 1 | −3 |
| 3 | 1 | −1 | 3 | −3 | −1 | −1 |
| 4 | 1 | 3 | 1 | −1 | −1 | 3 |
| 5 | 1 | −3 | −3 | 1 | 3 | 1 |
| 6 | −1 | −1 | 1 | −3 | −3 | −1 |
| 7 | −1 | −1 | −1 | 3 | −3 | −1 |
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

Table 14 shows an example of α

TABLE 14

| $N_{sc}^{RU}=3$ | | $N_{sc}^{RU}=6$ | |
|---|---|---|---|
| threeTone-CyclicShift | α | sixTone-CyclicShift | α |
| 0 | 0 | 0 | 0 |
| 1 | 2π/3 | 1 | 2π/6 |
| 2 | 4π/3 | 2 | 4π/6 |
|  |  | 3 | 8π/6 |

For the reference signal for NPUSCH format 1, sequence-group hopping can be enabled where the sequence-group number u in slot $n_s$ is defined by a group hopping pattern $f_{gh}(n_s)$ and a sequence-shift pattern $f_{ss}$ according to Equation 10 below.

$$u=(f_{gh}(n_s)+f_{ss}) \bmod N_{seq}^{RU} \quad \text{[Equation 10]}$$

where the number of reference signal sequences available for each resource unit size, $N_{seq}^{RU}$ is given by Table 15.

Table 15 shows an example of $N_{seq}^{RU}$

TABLE 15

| $N_{sc}^{RU}$ | $N_{seq}^{RU}$ |
|---|---|
| 1 | 16 |
| 3 | 12 |
| 6 | 14 |
| 12 | 30 |

Sequence-group hopping can be enabled or disabled by means of the cell-specific parameter groupHoppingEnabled provided by higher layers. Sequence-group hopping for NPUSCH can be disabled for a certain UE through the higher-layer parameter groupHoppingDisabled despite being enabled on a cell basis unless the NPUSCH transmission corresponds to a Random Access Response Grant or a retransmission of the same transport block as part of the contention based random access procedure.

The group hopping pattern $f_{gh}(n_s)$ is given by Equation 11 below.

$$f_{gh}(n_s)=(\Sigma_{i=0}^{7} c(8n'_s+i) \cdot 2^i) \bmod N_{seq}^{RU} \quad \text{[Equation 11]}$$

where $n'_s=n_s$ for $N_{sc}^{RU}>1$ and $n'_s$ is the slot number of the first slot of the resource unit for $N_{sc}^{RU}=1$. The pseudo-random sequence c(i) is defined by clause 7.2. The pseudo-random sequence generator shall be initialized with $c_{init}=\lfloor N_{ID}^{Ncell}/N_{seq}^{RU} \rfloor$ at the beginning of the resource unit for $N_{sc}^{RU}=1$ and in every even slot for $N_{sc}^{RU}>1$.

The sequence-shift pattern $f_{ss}$ is given by Equation 12 below.

$$f_{ss}=(N_{ID}^{Ncell}+\Delta_{ss}) \bmod N_{seq}^{RU} \quad \text{[Equation 12]}$$

where $\Delta_{ss} \in \{0, 1, \ldots, 29\}$ given by higher-layer parameter groupAssignmentNPUSCH. If no value is signalled, $\Delta_{ss}=0$.

The sequence r(•) shall be multiplied with the amplitude scaling factor $\beta_{NPUSCH}$ and mapped in sequence starting with r(0) to the sub-carriers.

The set of sub-carriers used in the mapping process shall be identical to the corresponding NPUSCH transmission as defined in clause 10.1.3.6 in 3GPP 36.211.

The mapping to resource elements (k, l) shall be in increasing order of first k, then l, and finally the slot number. The values of the symbol index l in a slot are given in Table 16.

Table 16 shows an example of demodulation reference signal location for NPUSCH

TABLE 16

| NPUSCH format | Values for l | |
|---|---|---|
|  | Δf = 3.75 kHz | Δf = 15 kHz |
| 1 | 4 | 3 |
| 2 | 0, 1, 2 | 2, 3, 4 |

SF-FDMA Baseband Signal Generation

For $N_{sc}^{RU}>1$, the time-continuous signal $s_l(t)$ in SC-FDMA symbol l in a slot is defined by clause 5.6 with the quantity $N_{RB}^{UL}N_{sc}^{RB}$ replaced by $N_{sc}^{UL}$.

For $N_{sc}^{RU}=1$, the time-continuous signal $s_{k,l}(t)$ for sub-carrier index k in SC-FDMA symbol l in an uplink slot is defined by Equation 13 below $$s_{k,l}(t)=a_{k^{(-)},l} \cdot e^{j\varphi_{k,l}} \cdot e^{j2\pi(k+1/2)\Delta f(t-N_{CP,l}T_s)}$$

$$k^{(-)}=k+\lfloor N_{sc}^{UL}/2 \rfloor \quad \text{[Equation 13]}$$

For $0 \leq t < (N_{CP,l}+N)T_s$ where parameters for Δf=15 kHz and Δf=3.75 kHz are given in Table 17, $a_{k^{(-)},l}$ is the modulation value of symbol l and the phase rotation $\varphi_{k,l}$ is defined by Equation 14 below.

$$\varphi_{k,l}=\rho(\tilde{l} \bmod 2)+\hat{\varphi}_k(\tilde{l}) \quad \text{[Equation 14]}$$

$$\rho = \begin{cases} \frac{\pi}{2} & \text{for } BPSK \\ \frac{\pi}{4} & \text{for } QPSK \end{cases}$$

-continued $$\varphi_k(\tilde{l}) = \begin{cases} 0 & \tilde{l} = 0 \\ \varphi_k(\tilde{l}-1) + 2\pi\Delta f(k+1/2)(N+N_{CP,l})T_s & \tilde{l} > 0 \end{cases}$$

$$\tilde{l} = 0, 1, \ldots, M_{rep}^{NPUSCH} N_{RU} N_{slots}^{UL} N_{symb}^{UL} - 1$$

$$l = \tilde{l} \bmod N_{symb}^{UL}$$

where $\tilde{l}$ is a symbol counter that is reset at the start of a transmission and incremented for each symbol during the transmission.

Table 17 shows an example of SC-FDMA parameters for $N_{sc}^{RU}=1$.

TABLE 17

| Parameter | Δf = 3.15 kHz | Δf = 15 kHz |
|---|---|---|
| N | 8192 | 2048 |
| Cyclic prefix length $N_{CP, l}$ | 256 | 160 for l = 0<br>144 for l = 1, 2, . . . , 6 |
| Set of values for k | −24, −23, . . . , 23 | −6, −5, . . . , 5 |

The SC-FDMA symbols in a slot shall be transmitted in increasing order of l, starting with l=0, where SC-FDMA symbol l>0 starts at time $\Sigma_{l'=0}^{l-1}(N_{CP,l'}+N)T_s$ within the slot. For Δf=3.75 kHz, the remaining $2304T_s$ in $T_{slot}$ are not transmitted and used for guard period.

Narrowband physical random access channel (NPRACH)

The physical layer random access preamble is based on single-subcarrier frequency-hopping symbol groups. A symbol group is illustrated in FIG. 1-8 Random acess symbol group, consisting of a cyclic prefix of length $T_{CP}$ and a sequence of 5 identical symbols with total length $T_{SEQ}$. The parameter values are listed in Table 18.

Figure 10:
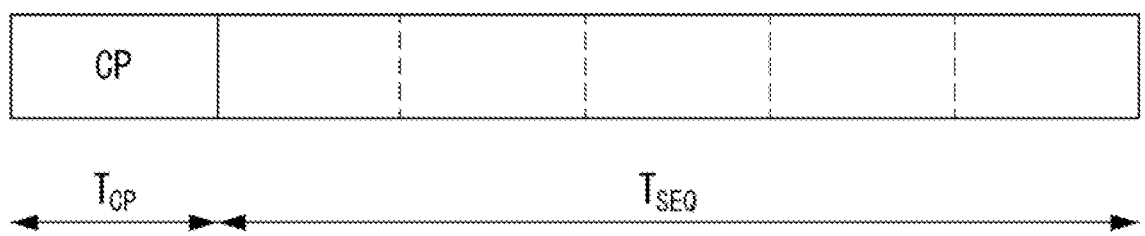
FIG. 10 shows an example of a random access symbol group.

FIG. 10 illustrates an example of the random access symbol group.

Table 18 shows an example of Random access preamble parameters.

TABLE 18

| Preamble format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

The preamble consisting of 4 symbol groups transmitted without gaps shall be transmitted $N_{rep}^{NPRACH}$ times.

The transmission of a random access preamble, if triggered by the MAC layer, is restricted to certain time and frequency resources.

A NPRACH configuration provided by higher layers contains the following:

NPRACH resource periodicity $N_{period}^{NPRACH}$ (nprach-Periodicity), frequency location of the first subcarrier allocated to NPRACH $N_{scoffset}^{NPRACH}$ (nprach-SubcarrierOffset), number of subcarriers allocated to NPRACH $N_{sc}^{NPRACH}$ (nprach-NumSubcarriers), number of starting sub-carriers allocated to contention based NPRACH random access $N_{sc\_cont}^{NPRAH}$ (nprach-NumCBRA-StartSubcarriers), number of NPRACH repetitions per attempt $N_{rep}^{NPRACH}$ (numRepetitionsPerPreambleAttempt), NPRACH starting time $N_{start}^{NPRACH}$ (nprach-StartTime), Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart).

NPRACH transmission can start only $N_{start}^{NPRACH} \cdot 30720T_s$ time units after the start of a radio frame fulfilling $f_f \bmod(N_{period}^{NPRACH}/10)=0$. After transmissions of $4 \cdot 64(T_{CP}+T_{SEQ})$ time units, a gap of $40 \cdot 30720T_s$ time units shall be inserted.

NPRACH configurations where $N_{scoffset}^{NPRACH}+N_{sc}^{NPRACH}>N_{sc}^{UL}$ are invalid.

The NPRACH starting subcarriers allocated to contention based random access are split in two sets of subcarriers, $\{0, 1, \ldots, N_{sc_{cont}}^{NPRACH} N_{MSG3}^{NPRACH}-1\}$ and $\{N_{sc\_cont}^{NPPRACH} N_{MSG3}^{NPRACH}, \ldots, N_{sc_{cont}}^{NPRACH}-1\}$, where the second set, if present, indicate UE support for multi-tone msg3 transmission.

The frequency location of the NPRACH transmission is constrained within $N_{sc}^{RA}=12$ sub-carriers. Frequency hopping shall be used within the 12 subcarriers, where the frequency location of the $i^{th}$ symbol group is given by $n_{sc}^{RA}(i)=n_{start}+\tilde{n}_{sc}^{RA}(i)$ where $n_{start}=N_{scoffset}^{NPRACH}+\lfloor n_{init}/N_{sc}^{RA} \rfloor \cdot N_{sc}^{RA}$ and Equation 15, $$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$ {Equation 15]

$$f(t) = \left( f(t-1) + \sum_{n=10t+1}^{10t+9} c(n)2^{n-(10t+1)} \right) \bmod(N_{sc}^{RA} - 1) + 1 \bmod N_{sc}^{RA}$$

$$f(-1) = 0$$

where $\tilde{n}_{SC}^{RA}(0)=n_{init} \bmod N_{sc}^{RA}$ with $n_{init}$ being the subcarrier selected by the MAC layer from $\{0, 1, \ldots, N_{sc}^{NPRACH}-1\}$, and the pseudo random sequence c(n) is given by clause 7.2 of 3GPP TS36.211. The pseudo random sequence generator shall be initialised with $c_{init}=N_{ID}^{Ncell}$.

The time-continuous random access signal $s_i(t)$ for symbol group i is defined by Equation 16 below.

$$s_i(t) = \beta_{NPRACH} e^{j2\pi(n_{SCRA}(i)+K k_0+1/2)\Delta f_{RA}(t-T_{CP})}$$ [Equation 16]

Where $0 \leq t < T_{SEQ}+T_{CP}$, $\beta_{NPRACH}$ is an amplitude scaling factor in order to conform to the transmit power $P_{NPRACH}$ specified in clause 16.3.1 in 3GPP TS 36.213, $k_0=-N_{sc}^{UL}/2$, $K=\Delta f/\Delta f_{RA}$ accounts for the difference in subcarrier spacing between the random access preamble and uplink data transmission, and the location in the frequency domain controlled by the parameter $n_{sc}^{RA}(i)$ is derived from clause 10.1.6.1 of 3GPP TS36.211. The variable $\Delta f_{RA}$ is given by Table 19 below.

Table 19 shows an example of random access baseband parameters.

TABLE 19

| Preamble format | $\Delta f_{RA}$ |
|---|---|
| 0, 1 | 3.75 kHz |

Downlink

A downlink narrowband physical channel corresponds to a set of resource elements carrying information originating from higher layers and is the interface defined between 3GPP TS 36.212 and 3GPP TS 36.211.

The following downlink physical channels are defined:
NPDSCH (Narrowband Physical Downlink Shared Channel)
NPBCH (Narrowband Physical Broadcast Channel)
NPDCCH (Narrowband Physical Downlink Control Channel)

A downlink narrowband physical signal corresponds to a set of resource elements used by the physical layer but does not carry information originating from higher layers. The following downlink physical signals are defined:
NRS (Narrowband reference signal)
Narrowband synchronization signal
Narrowband physical downlink shared channel (NPDSCH)

The scrambling sequence generator shall be initialized with $c_{init}=n_{RNTI} \cdot 2^{14}+n_f \mod 2 \cdot 2^{13}+\lfloor n_s/2 \rfloor+N_{ID}^{Ncell}$ where $n_s$ is the first slot of the transmission of the codeword. In case of NPDSCH repetitions and the NPDSCH carrying the BCCH, the scrambling sequence generator shall be reinitialized according to the expression above for each repetition. In case of NPDSCH repetitions and the NPDSCH is not carrying the BCCH, the scrambling sequence generator shall be reinitialized according to the expression above after every min ($M_{rep}^{NPDSCH}$, 4) transmission of the codeword with $n_s$ and $n_f$ set to the first slot and the frame, respectively, used for the transmission of the repetition.

Modulation should be done using QPSK modulation scheme.

NPDSCH can be mapped to one or more than one subframes, $N_{SF}$, as given by clause 16.4.1.5 of 3GPP TS 36.213, each of which shall be transmitted NPDSCH $M_{rep}^{NPDSCH}$ times.

For each of the antenna ports used for transmission of the physical channel, the block of complex-valued symbols $y^{(p)}(0), \ldots, y^{(p)}(M_{symb}^{ap}-1)$ shall be mapped to resource elements (k, l) which meet all of the following criteria in the current subframe:
the subframe is not used for transmission of NPBCH, NPSS, or NSSS, and
they are assumed by the UE not to be used for NRS, and
they are not overlapping with resource elements used for CRS (if any), and
the index l in the first slot in a subframe fulfils $l \geq l_{DataStart}$ where $l_{DataStart}$ is given by clause 16.4.1.4 of 3GPP TS 36.213.

The mapping of $y^{(p)}(0), \ldots, y^{(p)}(M_{symb}^{ap}-1)$ in sequence starting with $y^{(p)}(0)$ to resource elements (k, l) on antenna port p meeting the criteria above shall be increasing order of the first the index k and the index l, starting with the first slot and ending with the second slot in a subframe. For NPDSCH not carrying BCCH, after mapping to a subframe, the subframe shall be repeated for $M_{rep}^{NPDSCH}-1$ additional subframes, before continuing the mapping of $y^{(p)}(\cdot)$ to the following subframe. The mapping of $y^{(p)}(0), \ldots, y^{(p)}(M_{symb}^{ap}-1)$ is then repeated until $M_{rep}^{NPDSCH}N_{SF}$ subframes have been transmitted. For NPDSCH carrying BCCH, the $y^{(p)}(0), \ldots, y^{(p)}(M_{symb}^{ap}-1)$ is mapped to $N_{SF}$ subframes in sequence and then repeated until $M_{rep}^{NPDSCH}N_{SF}$ subframes have been transmitted.

The NPDSCH transmission can be configured by higher layers with transmission gaps where the NPSDCH transmission is postponed. There are no gaps in the NPDSCH transmission if $R_{max} < N_{gap,threshold}$ where $N_{gap,threshold}$ is given by the higher layer parameter dl-GapThreshold and $R_{max}$ is given by 3GPP TS 36.213. The gap starting frame and subframe is given by $(10n_f + \lfloor n_s/2 \rfloor) \mod N_{gap,period} = 0$ where the gap periodicity, $N_{gap,period}$, is given by the higher layer parameter dl-GapPeriodicity. The gap duration in number of subframes is given by $N_{gap,duration} = N_{gap,coeff} N_{gap,period}$, where $N_{gap,coeff}$ is given by the higher layer parameter dl-GapDurationCoeff. For NPDSCH carrying the BCCH there are no gaps in the transmission.

The UE shall not expect NPDSCH in subframe i if it is not a NB-IoT downlink subframe, except for transmissions of NPDSCH carrying SystemInformationBlockType1-NB in subframe 4. In case of NPDSCH transmissions, in subframes that are not NB-IoT downlink subframes, the NPDSCH transmission is postponed until the next NB-IoT downlink subframe.

UE procedure for receiving the NPDSCH

A NB-IoT UE shall assume a subframe as a NB-IoT DL subframe if
the UE determines that the subframe does not contain NPSS/NSSS/NPBCH/NB-SIB1 transmission, and
for a NB-IoT carrier that a UE receives higher layer parameter operationModeInfo, the subframe is configured as NB-IoT DL subframe after the UE has obtained SystemInformationBlockType1-NB.
for a NB-IoT carrier that DL-CarrierConfigCommon-NB is present, the subframe is configured as NB-IoT DL subframe by the higher layer parameter downlinkBitmapNonAnchor.

For a NB-IoT UE that supports twoHARQ-Processes-r14, there shall be a maximum of 2 downlink HARQ processes.

A UE shall upon detection on a given serving cell of a NPDCCH with DCI format N1, N2 ending in subframe n intended for the UE, decode, starting in n+5 DL subframe, the corresponding NPDSCH transmission in N consecutive NB-IoT DL subframe(s) $n_i$ with i=0, 1, ..., N−1 according to the NPDCCH information, where subframe n is the last subframe in which the NPDCCH is transmitted and is determined from the starting subframe of NPDCCH transmission and the DCI subframe repetition number field in the corresponding DCI;
subframe(s) ni with i=0, 1, ..., N−1 are N consecutive NB-IoT DL subframe(s) excluding subframes used for SI messages where, n0<n1< ..., nN−1,
N=$N_{Rep}N_{SF}$, where the value of $N_{Rep}$ is determined by the repetition number field in the corresponding DCI, and the value of $N_{SF}$ is determined by the resource assignment field in the corresponding DCI, and
$k_0$ is the number of NB-IoT DL subframe(s) starting in DL subframe n+5 until DL subframe $n_0$, where $k_0$ is determined by the scheduling delay field ($I_{Delay}$) for DCI format N1, and $k_0=0$ for DCI format N2. For DCI CRC scrambled by G-RNTI, $k_0$ is determined by the scheduling delay field ($I_{Delay}$) according to Table 21, otherwise $k_0$ is determined by the scheduling delay field ($I_{Delay}$) according to Table 20. The value of $R_{max}$ is according to Subclause 16.6 in 3GPP 36.213 for the corresponding DCI format N1.

Table 20 shows an example of k0 for DCI format N1.

TABLE 20

| $I_{Delay}$ | $k_0$ | |
| --- | --- | --- |
| | $R_{max} < 125$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 21 shows an example of k_0 for DCI format N1 with DCI CRC scrambled by G-RNTI.

TABLE 21

| $I_{Delay}$ | $k_0$ |
| --- | --- |
| 0 | 0 |
| 1 | 4 |
| 2 | 8 |
| 3 | 12 |
| 4 | 16 |
| 5 | 32 |
| 6 | 64 |
| 7 | 128 |

A UE is not expected to receive transmissions in 3 DL subframes following the end of a NPUSCH transmission by the UE.

The resource allocation information in DCI format N1, N2 (paging) for NPDSCH indicates to a scheduled UE Table 22 shows an example of the number of subframes for NPDSCH. A number of subframes ($N_{SF}$) determined by the resource assignment field ($I_{SF}$) in the corresponding DCI according to Table 22.

A repetition number ($N_{Rep}$) determined by the repetition number field ($I_{Rep}$) in the corresponding DCI according to Table 23.

TABLE 22

| $I_{SF}$ | $N_{SF}$ |
| --- | --- |
| 0 | 1 |
| 1 | 2 |
| 2 | 3 |
| 3 | 4 |
| 4 | 5 |
| 5 | 6 |
| 6 | 8 |
| 7 | 10 |

Table 23 shows an example of the number of repetitions for NPDSCH.

TABLE 23

| $I_{Rep}$ | $N_{Rep}$ |
| --- | --- |
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |

TABLE 23-continued

| $I_{Rep}$ | $N_{Rep}$ |
| --- | --- |
| 10 | 384 |
| 11 | 512 |
| 12 | 768 |
| 13 | 1024 |
| 14 | 1536 |
| 15 | 2048 |

The number of repetitions for the NPDSCH carrying SystemInformationBlockType1-NB is determined based on the parameter schedulingInfoSIB1 configured by higher-layers and according to Table 24.

Table 24 shows an example of the number of repetitions for SIB1-NB.

TABLE 24

| Value of schedulingInfoSIB1 | Number of NPDSCH repetitions |
| --- | --- |
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The starting radio frame for the first transmission of the NPDSCH carrying SystemInformationBlockType1-NB is determined according to Table 25.

Table 25 shows an example of a start radio frame for the first transmission of the NPDSCH carrying SIB1-NB.

TABLE 25

| Number of NPDSCH repetitions | $N_{ID}^{Ncell}$ | Starting radio frame number for NB-SIB1 repetitions (nf mod 256) |
| --- | --- | --- |
| 4 | $N_{ID}^{Ncell}$ mod 4 = 0 | 0 |
| | $N_{ID}^{Ncell}$ mod 4 = 1 | 16 |
| | $N_{ID}^{Ncell}$ mod 4 = 2 | 32 |
| | $N_{ID}^{Ncell}$ mod 4 = 3 | 48 |
| 8 | $N_{ID}^{Ncell}$ mod 2 = 0 | 0 |
| | $N_{ID}^{Ncell}$ mod 2 = 1 | 16 |
| 16 | $N_{ID}^{Ncell}$ mod 2 = 0 | 0 |
| | $N_{ID}^{Ncell}$ mod 2 = 1 | 1 |

The starting OFDM symbol for NPDSCH is given by index $l_{DataStrart}$ in the first slot in a subframe k and is determined as follows if subframe k is a subframe used for receiving SIB1-NB, $l_{DataStrart}$=3 if the value of the higher layer parameter operationModeInfo is set to '00' or '01'

$l_{DataStrart}$=0 otherwise else $l_{DataStrart}$ is given by the higher layer parameter eutraControlRegionSize if the value of the higher layer parameter eutraControlRegionSize is present $l_{DataStrart}$=0 otherwise UE Procedure for Reporting ACK/NACK The UE shall upon detection of a NPDSCH transmission ending in NB-IoT subframe n intended for the UE and for which an ACK/NACK shall be provided, start, at the end of n+k$_0$−1 DL subframe transmission of the NPUSCH carrying ACK/NACK response using NPUSCH format 2 in N consecutive NB-IoT UL slots, where N=N$_{Rep}^{AN}$N$_{slots}^{UL}$, where the value of N$_{Rep}^{AN}$ is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of N$_{slots}^{UL}$ is the number of slots of the resource unit, allocated subcarrier for ACK/NACK and value of k0 is determined by the ACK/NACK resource field in the DCI format of the corresponding NPDCCH according to Table 16.4.2-1, and Table 16.4.2-2 in 3GPP TS36.213.

Narrowband Physical Broadcast Channel (NPBCH)

The processing structure for the BCH transport channel is according to Section 5.3.1 of 3GPP TS 36.212, with the following differences:

The transmission time interval (TTI) is 640 ms.

The size of the BCH transport block is set to 34 bits

The CRC mask for NPBCH is selected according to 1 or 2 transmit antenna ports at eNodeB according to Table 5.3.1.1-1 of 3GPP TS 36.212, where the transmit antenna ports are defined in section 10.2.6 of 3GPP TS 36.211

The number of rate matched bits is defined in section 10.2.4.1 of 3GPP TS 36.211

Scrambling shall be done according to clause 6.6.1 of 3GPP TS 36.211 with M$_{bit}$ denoting the number of bits to be transmitted on the NPBCH. M$_{bit}$ equals 1600 for normal cyclic prefix. The scrambling sequence shall be initialized with c$_{init}$=N$_{ID}^{Ncell}$ in radio frames fulfilling n$_f$ mod 64=0.

Modulation should be done using QPSK modulation scheme for each antenna port is transmitted in subframe 0 during 64 consecutive radio frames starting in each radio frame fulfilling n$_f$ mod 64=0 and shall Layer mapping and precoding shall be done according to clause 6.6.3 of 3GPP TS 36.211 with P∈{1,2}. The UE shall assume antenna ports R$_{2000}$ and R$_{2001}$ are used for the transmission of the narrowband physical broadcast channel.

The block of complex-valued symbols y$^{(p)}$(0), ... y$^{(p)}$(M$_{symb}$−1) for each antenna port is transmitted in subframe 0 during 64 consecutive radio frames starting in each radio frame fulfilling n$_f$ mod 64=0 and shall be mapped in sequence starting consecutive radio frames starting with y(0) to resource elements (k, l) not reserved for transmission of reference signals shall be in increasing order of the first the index k, then the index l. After mapping to a subframe, the subframe shall be repeated in subframe 0 in the 7 following radio frames, before continuing the mapping of y$^{(p)}$(·) to subframe 0 in the following radio frame. The first three OFDM symbols in a subframe shall not be used in the mapping process. For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing cell N$_{ID}^{cell}$ with N$_{ID}^{Ncell}$ in in the calculation of v$_{shift}$ in clause 6.10.1.2 of 3GPP TS 36.211.

Narrowband Physical Downlink Control Channel (NPDCCH)

The narrowband physical downlink control channel carries control information. A narrowband physical control channel is transmitted on an aggregation of one or two consecutive narrowband control channel elements (NCCEs), where a narrowband control channel element corresponds to 6 consecutive subcarriers in a subframe where NCCE 0 occupies subcarriers 0 through 5 and NCCE 1 occupies subcarriers 6 through 11. The NPDCCH supports multiple formats as listed in Table 26. For NPDCCH format 1, both NCCEs belong to the same subframe. One or two NPDCCHs can be transmitted in a subframe.

Table 26 shows an example of supported NPDCCH formats.

TABLE 26

| NPDCCH format | Number of NCCEs |
| --- | --- |
| 0 | 1 |
| 1 | 2 |

Scrambling shall be done according to clause 6.8.2 of TS36.211. The scrambling sequence shall be initialized at the start of subframe k$_0$ according to section 16.6 of TS36.213 after every 4th NPDCCH subframe with c$_{init}$=⌊n$_s$/2⌋2$^9$+N$_{ID}^{Ncell}$ where n$_s$ is the first slot of the NPDCCH subframe in which scrambling is (re-)initialized.

Modulation shall be done according to clause 6.8.3 of TS36.211 using the QPSK modulation scheme.

Layer mapping and precoding shall be done according to clause 6.6.3 of TS36.211 using the same antenna ports as the NPBCH.

The block of complex-valued symbols y(0), ... y(M$_{symb}$−1) shall be mapped in sequence starting with y(0) to resource elements (k, l) on the associated antenna port which meet all of the following criteria:

they are part of the NCCE(s) assigned for the NPDCCH transmission, and they are not used for transmission of NPBCH, NPSS, or NSSS, and they are assumed by the UE not to be used for NRS, and they are not overlapping with resource elements used for PBCH, PSS, SSS, or CRS as defined in clause 6 of TS36.211 (if any), and the index l in the first slot in a subframe fulfils l≥ l$_{NPDCCHStart}$ where l$_{NPDCCHStart}$ is given by clause 16.6.1 of 3GPP TS 36.213.

The mapping to resource elements (k, l) on antenna port p meeting the criteria above shall be in increasing order of first the index k and then the index l, starting with the first slot and ending with the second slot in a subframe.

The NPDCCH transmission can be configured by higher layers with transmissions gaps where the NPDCCH transmission is postponed. The configuration is the same as described for NPDSCH in clause 10.2.3.4 of TS36.211.

The UE shall not expect NPDCCH in subframe i if it is not a NB-IoT downlink subframe. In case of NPDCCH transmissions, in subframes that are not NB-IoT downlink subframes, the NPDCCH transmission is postponed until the next NB-IoT downlink subframe.

DCI Format

DCI Format N0

DCI format N0 is used for the scheduling of NPUSCH in one UL cell. The following information is transmitted by means of the DCI format N0:

Flag for format N0/format N1 differentiation (1 bit), Subcarrier indication (6 bits), Resource assignment (3 bits), Scheduling delay (2 bits), Modulation and coding scheme (4 bits), Redundancy version (1 bit), Repetition number (3 bits), New data indicator (1 bit), DCI subframe repetition number (2 bits)

DCI Format N1

DCI format N1 is used for the scheduling of one NPDSCH codeword in one cell and random access procedure initiated by a NPDCCH order. The DCI corresponding to a NPDCCH order is carried by NPDCCH. The following information is transmitted by means of the DCI format N1:

Flag for format N0/format N1 differentiation (1 bit), NPDCCH order indicator (1 bit)

Format N1 is used for random access procedure initiated by a NPDCCH order only if NPDCCH order indicator is set to "1", format N1 CRC is scrambled with C-RNTI, and all the remaining fields are set as follows:

Starting number of NPRACH repetitions (2 bits), Subcarrier indication of NPRACH (6 bits), All the remaining bits in format N1 are set to one.

Otherwise,

Scheduling delay (3 bits), Resource assignment (3 bits), Modulation and coding scheme (4 bits), Repetition number (4 bits), New data indicator (1 bit), HARQ-ACK resource (4 bits), DCI subframe repetition number (2 bits)

When the format N1 CRC is scrambled with a RA-RNTI, then the following fields among the fields above are reserved:

New data indicator, HARQ-ACK resource

If the number of information bits in format N1 is less than that of format N0, zeros shall be appended to format N1 until the payload size equals that of format N0.

DCI Format N2

DCI format N2 is used for for paging and direct indication. The following information is transmitted by means of the DCI format N2.

Flag for paging/direct indication differentiation (1 bit)

If Flag=0:

Direct Indication information (8 bits), Reserved information bits are added until the size is equal to that of format N2 with Flag=1

If Flag=1:

Resource assignment (3 bits), Modulation and coding scheme (4 bits), Repetition number (4 bits), DCI subframe repetition number (3 bits)

NPDCCH Related Procedure

A UE shall monitor a set of NPDCCH candidates as configured by higher layer signalling for control information, where monitoring implies attempting to decode each of the NPDCCHs in the set according to all the monitored DCI formats.

An NPDCCH search space $NS_k^{(L',mR)}$ at aggregation level $L' \in \{1,2\}$ and repetition level $R \in \{1, 2, 4, 8, 16, 32, 64, 128, 256, 512, 1024, 2048\}$ is defined by a set of NPDCCH candidates where each candidate is repeated in a set of R consecutive NB-IoT downlink subframes excluding subframes used for transmission of SI messages starting with subframe k.

The locations of starting subframe k are given by $k=k_b$ where $k_b$ is the $b^{th}$ consecutive NB-IoT DL subframe from subframe k0, excluding subframes used for transmission of SI messages, and $b=u \cdot R$, and $u=0, 1, \ldots, R/R_{max}-1$, and where subframe k0 is a subframe satisfying the condition $(10n_f + \lfloor n_s/2 \rfloor) \mod T = \lfloor \alpha_{offset} \cdot T \rfloor$, where $T=R_{max} \cdot G$, $T \geq 4$. G and $\alpha_{offset}$ are given by the higher layer parameters.

For Type1-NPDCCH common search space, k=k0 and is determined from locations of NB-IoT paging opportunity subframes.

If the UE is configured by high layers with a NB-IoT carrier for monitoring of NPDCCH UE-specific search space, the UE shall monitor the NPDCCH UE-specific search space on the higher layer configured NB-IoT carrier, the UE is not expected to receive NPSS, NSSS, NPBCH on the higher layer configured NB-IoT carrier.

otherwise, the UE shall monitor the NPDCCH UE-specific search space on the same NB-IoT carrier on which NPSS/NSSS/NPBCH are detected.

The starting OFDM symbol for NPDCCH given by index $l_{NPDCCHStart}$ in the first slot in a subframe k and is determined as follows if higher layer parameter eutraControlRegionSize is present $l_{NPDCCHStart}$ is given by the higher layer parameter eutraControlRegionSize Otherwise, $l_{NPDCCHStart}=0$ Narrowband Reference Signal (NRS)

Before a UE obtains operationModeInfo, the UE may assume narrowband reference signals are transmitted in subframes #0 and #4 and in subframes #9 not containing NSSS.

When UE receives higher-layer parameter operationModeInfo indicating guardband or standalone, Before the UE obtains SystemInformationBlockType1-NB, the UE may assume narrowband reference signals are transmitted in subframes #0, #1, #3, #4 and in subframes #9 not containing NSSS.

After the UE obtains SystemInformationBlockType1-NB, the UE may assume narrowband reference signals are transmitted in subframes #0, #1, #3, #4, subframes #9 not containing NSSS, and in NB-IoT downlink subframes and shall not expect narrowband reference signals in other downlink subframes.

When UE receives higher-layer parameter operationModeInfo indicating inband-SamePCI or inband-DifferentPCI, Before the UE obtains SystemInformationBlockType1-NB, the UE may assume narrowband reference signals are transmitted in subframes #0, #4 and in subframes #9 not containing NSSS.

After the UE obtains SystemInformationBlockType1-NB, the UE may assume narrowband reference signals are transmitted in subframes #0, #4, subframes #9 not containing NSSS, and in NB-IoT downlink subframes and shall not expect narrowband reference signals in other downlink subframes.

Narrowband Primary Synchronization Signal (NPSS)

The sequence $d_l(n)$ used for the narrowband primary synchronization signal is generated from a frequency-domain Zadoff-Chu sequence according to Equation 17 below.

$$d_l(n) = S(l) \cdot e^{-j\frac{\pi u n(n+1)}{11}}, n = 0, 1, \ldots, 10 \quad \text{[Equation 17]}$$

where the Zadoff-Chu root sequence index u=5 and S(l) for different symbol indices l is given by Table 27.

Table 27 shows an example of S(l).

TABLE 27

| Cyclic prefix length | S(3), ..., S(13) |             |
| --- | --- | --- |
| Normal | 1  1  1  1  -1  -1  1  1  1  -1  1 | |

The same antenna port shall be used for all symbols of the narrowband primary synchronization signal within a subframe.

UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k, l) in increasing order of first the index k=0, 1, . . . , $N_{sc}^{RB}$−2 and then the index l=3, 4, . . . , $2N_{symb}^{DL}$−1 in subframe 5 in every radio frame. For resource elements (k, l) overlapping with resource elements where cell-specific reference signals are transmitted, the corresponding sequence element d(n) is not used for the NPSS but counted in the mapping process.

Narrowband Secondary Synchronization Signals (NSSS)

The sequence d(n) used for the narrowband secondary synchronization signal is generated from a frequency-domain Zadoff-Chu sequence according to Equation 18 below.

$$d(n) = b_q(n) \cdot e^{-j2\pi\theta_f n} \cdot e^{-j\frac{\pi u n'(n'+1)}{131}}$$ [Equation 18]

where $n = 0, 1, \ldots, 131$ $n' = n \bmod 131$ $m = n \bmod 128$ $u = N_{ID}^{Ncell} \bmod 126 + 3$ $q = \left\lfloor \frac{N_{ID}^{Ncell}}{126} \right\rfloor$ The binary sequence $b_q(n)$ is given by Table 28. The cyclic shift $\theta_f$ in frame number $n_f$ is given by $$\theta_f = \frac{33}{132}(n_f/2) \bmod 4.$$

Table 28 shows an example of $b_q(n)$.

TABLE 28

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 1 −1 1 1 −1 −1 1 1 −1 1 −1 −1 1 1 −1 1 −1 −1 1 1 1 −1 −1 1 1 −1 1 −1 −1 1 1 −1 1 1 −1 −1 1 1 −1 1 −1 −1 1 1 1 1 −1 1 −1 1 1 −1 1 1 1 1 −1 −1 1 1 −1 1 −1 −1 1 1 −1 1 1 1 −1 −1 1 1 1 −1 1 1 −1 1 −1 −1 1 1 −1 1 1 −1 −1 1 1 −1 1 1 −1 1 −1 1 1 1 −1 −1 1 1 −1 1 1 −1 1 −1 −1 1 −1 1 1 −1 −1 1 1 −1 1 1 −1 1 1 −1 1] |
| 2 | [1 −1 −1 1 −1 1 1 1 −1 1 1 −1 1 1 −1 −1 1 1 −1 1 1 −1 1 −1 −1 1 1 1 −1 1 −1 −1 1 1 −1 1 1 1 −1 1 1 −1 1 −1 −1 1 1 1 −1 1 1 −1 1 −1 1 1 −1 1 1 1 −1 1 1 −1 1 1 −1 −1 1 −1 1 −1 −1 1 1 −1 1 1 −1 1 1 1 −1 1 1 1 −1 1 −1 1 1 1 1 −1 −1 1 −1 1 −1 −1 1 1 1 −1 1 1 −1 −1 1 1 −1 1 −1 −1 1 1 −1 1 −1 1 1 −1 1 1] |
| 3 | [1 −1 −1 1 −1 1 1 −1 1 1 1 −1 1 −1 −1 1 1 1 −1 1 1 −1 1 1 −1 1 −1 −1 1 −1 1 1 1 1 1 1 1 −1 −1 1 1 −1 1 1 −1 −1 1 1 −1 1 −1 1 1 −1 −1 1 −1 1 1 1] |

TABLE 28-continued

| q | $b_q(0), \ldots, b_q(127)$ |
|---|---|
| | 1 1 −1 1 −1 −1 1 1 −1 1 −1 1 1 −1 1 −1 −1 1 1 −1 1 −1 −1 1 1 |
| | 1 1 −1 1 −1 −1 1 1 −1 1 1 −1 1 1 1 −1 −1 1 −1 1 −1 −1 1 |
| | 1 1 −1 −1 1 −1 1 1 1 −1 1 1 1 −1 1 1 −1 1 −1 −1 1 1 −1 1 1 |
| | 1 −1 1 1 −1 −1 1 1 1 −1 −1 1 1 −1 1 1 1 −1] |

The same antenna port shall be used for all symbols of the narrowband secondary synchronization signal within a subframe.

UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k, l) in sequence starting with d(0) in increasing order of the first the index k over the 12 assigned subcarriers and then the index l over the assigned last $N_{symb}^{NSSS}$ symbols of subframe 9 in radio frames fulfilling $n_f$ mod 2=0, where $N_{symb}^{NSSS}$ is given by Table 29.

Table 29 shows an example of the number of NSSS symbols.

TABLE 29

| Cyclic prefix length | $N_{symb}^{NSSS}$ |
|---|---|
| Normal | 11 |

OFDM Baseband Signal Generation

If the higher layer parameter operationModeInfo does not indicate 'inband-SamePCI' and samePCI-Indicator does not indicate 'samePCI', then the time-continuous signal $s_l^{(p)}(t)$ on antenna port p in OFDM symbol l in a downlink slot is defined by Equation 19 below.

$$s_l^{(p)}(t) = \sum_{k=-\lfloor N_{sc}^{RB}/2 \rfloor}^{\lceil N_{sc}^{RB}/2 \rceil - 1} a_{k^{(-)},l}^{(p)} \cdot e^{j2\pi(k+\frac{1}{2})\Delta f(t-N_{CP,l}T_s)}$$ [Equation 19]

for $0 \le t < (N_{CP,l}+N) \times T_s$ where $k^{(-)}=k+\lfloor N_{sc}^{RB}/2 \rfloor$, N=2048, $\Delta f$=15 kHz and $a_{k,l}^{(p)}$ is the content of resource element (k, l) on antenna port p.

If the higher layer parameter operationModeInfo indicates 'inband-SamePCI' or samePCI-Indicator indicate 'samePCI', then the time-continuous signal $s_{l'}^{(p)}(t)$ on antenna port p in OFDM symbol l', where $l'=l+N_{symb}^{DL}(n_s \bmod 4) \in \{0, \ldots, 27\}$ is the OFDM symbol index from the start of the last even-numbered subframe, is defined by Equation 20 below.

$$s_{l'}^{(p)}(t) = \sum_{k=-\lfloor N_{RB}^{DL}N_{sc}^{RB}/2 \rfloor}^{-1} e^{\theta_{k^{(-)}}} a_{k^{(-)},l}^{(p)} \cdot e^{j2\pi k \Delta f\left(t-N_{CP,l'\bmod N_{symb}^{DL}} T_s\right)} +$$

$$\sum_{k=1}^{\lceil N_{RB}^{DL}N_{sc}^{RB}/2 \rceil} e^{\theta_{k^{(+)}}} a_{k^{(+)},l}^{(p)} \cdot e^{j2\pi k \Delta f\left(t-N_{CP,l'\bmod N_{symb}^{DL}} T_s\right)}$$ [Equation 20]

for $0 \leq t < (N_{CP,i}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor -1$, $\theta_{k,l} = j 2\pi f_{NB\text{-}IoT} T_s (N+\sum_{i=0}^{l'} N_{CP, i \bmod 7})$ if resource element (k, l') is used for Narrowband IoT, and 0 otherwise, and $f_{NB\text{-}IoT}$ is the frequency location of the carrier of the Narrowband IoT PRB minus the frequency location of the center of the LTE signal.

Only normal CP is supported for Narrowband IoT downlink in this release of the specification.

Hereinafter, the physical layer process of the narrowband physical broadcast channel (NPBCH) will be described in more detail.

Scrambling

Scrambling shall be done according to clause 6.6.1 with $M_{bit}$ denoting the number of bits to be transmitted on the NPBCH. $M_{bit}$ equals 1600 for normal cyclic prefix. The scrambling sequence shall be initialised with $c_{init}=N_{ID}^{Ncell}$ in radio frames fulfilling $n_f \bmod 64=0$.

Modulation

Modulation shall be done according to clause 6.6.2 using the modulation scheme in Table 10.2.4.2-1.

Table 30 shows an example of a modulation scheme for NPBCH.

TABLE 30

| Physical channel | Modulation schemes |
|---|---|
| NPBCH | QPSK |

Layer Mapping and Precoding

Layer mapping and precoding shall be done according to clause 6.6.3 with $P \in \{1,2\}$. The UE shall assume antenna ports $R_{2000}$ and $R_{2001}$ are used for the transmission of the narrowband physical broadcast channel.

Mapping to Resource Elements

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f \bmod 64=0$ and shall be mapped in sequence starting with y(0) to resource elements (k, l). The mapping to resource elements (k, l) not reserved for transmission of reference signals shall be in increasing order of first the index k, then the index l. After mapping to a subframe, the subframe shall be repeated in subframe 0 in the 7 following radio frames, before continuing the mapping of $y^{(p)}(\bullet)$ to subframe 0 in the following radio frame. The first three OFDM symbols in a subframe shall not be used in the mapping process.

For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing $N_{ID}^{cell}$ with $N_{ID}^{Ncell}$ in the calculation of $v_{shift}$ in clause 6.10.1.2.

Next, information related to MIB-NB and SIBN1-NB will be described in more detail.

MasterInformationBlock-NB

The MasterInformationBlock-NB includes the system information transmitted on BCH.

Signalling radio bearer: N/A
RLC-SAP: TM
Logical channel: BCCH
Direction: E-UTRAN to UE Table 31 shows an example of the MasterInformationBlock-NB format.

TABLE 31

```
-- ASN1START
MasterInformationBlock-NB ::=              SEQUENCE {
    systemFrameNumber-MSB-r13                  BIT STRING (SIZE (4)),
    hyperSFN-LSB-r13                           BIT STRING (SIZE (2)),
    schedulingInfoSIB1-r13                     INTEGER (0..15),
    systemInfoValueTag-r13                     INTEGER (0..31),
    ab-Enabled-r13                             BOOLEAN,
    operationModeInfo-r13                      CHOICE {
        inband-SamePCI-r13                         Inband-SamePCI-NB-r13,
        inband-DifferentPCI-r13                    Inband-DifferentPCI-NB-r13,
        guardband-r13                              Guardband-NB-r13,
        standalone-r13                             Standalone-NB-r13
    },
    spare                                      BIT STRING (SIZE (11))
}
ChannelRasterOffset-NB-r13 ::= ENUMERATED {khz-7dot5, khz-2dot5, khz2dot5, khz7dot5}
Guardband-NB-r13 ::=                       SEQUENCE {
    rasterOffset-r13                           ChannelRasterOffset-NB-r13,
    spare                                      BIT STRING (SIZE (3))
}
Inband-SamePCI-NB-r13 ::=                  SEQUENCE {
    eutra-CRS-SequenceInfo-r13                 INTEGER (0..31)
}
Inband-DifferentPCI-NB-r13 ::=             SEQUENCE {
    eutra-NumCRS-Ports-r13                     ENUMERATED (same, four),
    rasterOffset-r13                           ChannelRasterOffset-NB-r13,
    spare                                      BIT STRING (SIZE (2))
}
Standalone-NB-r13 ::=                      SEQUENCE {
    spare                                      BIT STRING (SIZE (5))
}
-- ASN1STOP
```

Table 32 shows the description of the MasterInformationBlock-NB field.

TABLE 32

MasterInformationBlock-NB field descriptions ab-Enabled
Value TRUE indicates that access barring is enabled and that the UE shall acquire SystemInformationBlockType14-NB before initiating RRC connection establishment or resume.
eutra-CRS-SequenceInfo
Information of the carrier containing NPSS/NSSS/NPBCH. Each value is associated with an E-UTRA PRB index as an offset from the
middle of the LTE system sorted out by channel raster offset.
eutra-NumCRS-Ports
Number of E-UTRA CRS antenna ports, either the same number of ports as NRS or 4 antenna ports.
hyperSFN-LSB
Indicates the 2 least significant bits of hyper SFN. The remaining bits are present in SystemInformationBlockType1-NB.
operationModeInfo
Deployment scenario (in-band/guard-band/standalone) and related information. See TS 36.211 [21] and TS 36.213 [23].
Inband-SamePCI indicates an in-band deployment and that the NB-IoT and LTE cell share the same physical cell id and have the same number of NRS and CRS ports.
Inband-DifferentPCI indicates an in-band deployment and that the NB-IoT and LTE cell have different physical cell id.
guardband indicates a guard-band deployment,

TABLE 32-continued

MasterInformationBlock-NB field descriptions standalone indicates a standalone deployment.
rasterOffset
NB-IoT offset from LTE channel raster. Unit in kHz in set {−7.5, −2.5, 2.5, 7.5}
schedulingInfoSIB1
This field contains an index to a table specified in TS 36.213 [23, Table 16.4.1.3-3] that defines SystemInformationBlockType1-NB scheduling information.
systemFrameNumber-MSB
Defines the 4 most significant bits of the SFN. As indicated in TS 36.211 [21], the 6 least significant bits of the SFN are acquired implicitly by decoding the NPBCH.
systemInfoValueTag
Common for all SIBs other than MIB-NB, SIB14-NB and SIB16-NB.

SystemInformationBlockType1-NB

The SystemInformationBlockType1-NB message contains information relevant when evaluating if a UE is allowed to access a cell and defines the scheduling of other system information.

Signalling radio bearer: N/A
RLC-SAP: TM
Logical channel: BCCH
Direction: E-UTRAN to UE Table 33 shows an example of a SystemInformationBlockType1 (SIB1)-NB message.

TABLE 33

```
-- ASN1START
SystemInformationBlockType1-NB ::=       SEQUENCE {
    hyperSFN-MSB-r13                         BIT STRING (SIZE (8)),
    cellAccessRelatedInfo-r13                SEQUENCE {
        plmn-IdentityList-r13                    PLMN-IdentityList-NB-r13,
        trackingAreaCode-r13                     TrackingAreaCode,
        cellIdentity-r13                         CellIdentity,
        cellBarred-r13                           ENUMERATED {barred, notBarred},
        intraFreqReselection-r13                 ENUMERATED {allowed, notAllowed}
    },
    cellSelectionInfo-r13                    SEQUENCE {
        q-RxLevMin-r13                           Q-RxLevMin,
        q-QualMin-r13                            Q-QualMin-r9
    },
    p-Max-r13                                P-Max                          OPTIONAL,    -- Need OP
    freqBandIndicator-r13                    FreqBandIndicator-NB-r13
    freqBandInfo-r13                         NS-PmaxList-NB-r13             OPTIONAL,    --
Need OR
    multiBandInfoList-r13                    MultiBandInfoList-NB-r13       OPTIONAL,    --
Need OR
    downLinkBitmap-r13                       DL-Bitmap-NB-r13               OPTIONAL,    --
Need OP,
    eutraControlRegionSize-r13               ENUMERATED {n1, n2, n3}        OPTIONAL,    --
Cond inband
    nrs-CRS-PowerOffset-r13                  ENUMERATED {dB-6,    dB-4dot77, dB-3,
                                                         dB-1dot77,  dB0,      dB1,
                                                         dB1dot23,   dB2,      dB3,
                                                         dB4,        dB4dot23, dB5,
                                                         dB6,        dB7,      dB8,
                                                         dB9}                           OPTIONAL,    -- Cond
inband-SamePCI
    schedulingInfoList-r13                   SchedulingInfoList-NB-r13,
    si-WindowLength-r13                      ENUMERATED {ms160, ms320, ms480, ms640,
                                                         ms960, ms1280, ms1600, spare1},
    si-RadioFrameOffset-r13                  INTEGER (1..15)                OPTIONAL,    -- Need OP
    systemInfoValueTagList-r13               SystemInfoValueTagList-NB-r13  OPTIONAL,    --
Need OR
    lateNonCriticalExtension                 OCTET STRING                   OPTIONAL,
    nonCriticalExtension                     SEQUENCE { }                   OPTIONAL
}
```

TABLE 33-continued

```
PLMN-IdentityList-NB-r13 ::=            SEQUENCE (SIZE (1..maxPLMN-r11)) OF PLMN-
IdentityInfo-NB-r13
PLMN-IdentityInfo-NB-r13 ::=            SEQUENCE {
    plmn-Identity-r13                       PLMN-Identity,
    cellReservedForOperatorUse-r13          ENUMERATED {reserved, notReserved},
    attachWithoutPDN-Connectivity-r13       ENUMERATED {true}        OPTIONAL       -- Need OP
}
SchedulingInfoList-NB-r13 ::= SEQUENCE (SIZE (1..maxSI-Message-NB-r13)) OF
SchedulingInfo-NB-r13
SchedulingInfo-NB-r13::=                SEQUENCE {
    si-Periodicity-r13                      ENUMERATED {rf64, rf128, rf256, rf512,
                                                rf1024, rf2048, rf4096, spare},
    si-RepetitionPattern-r13                ENUMERATED {every2ndRF, every4thRF,
                                                every8thRF, every16thRF},
    sib-MappingInfo-r13                     SIB-MappingInfo-NB-r13,
    si-TB-r13                               ENUMERATED {b56, b120, b208, b256, b328, b440, b552, b680}
}
SystemInfoValueTagList-NB-r13 ::=       SEQUENCE (SIZE (1..maxSI-Message-NB-r13)) OF
                                            SystemInfoValueTagSI-r13
SIB-MappingInfo-NB-r13 :: =             SEQUENCE (SIZE (0..maxSIB-1)) OF SIB-Type-NB-r13
SIB-Type-NB-r13 ::=                     ENUMERATED {
                                            sibType3-NB-r13, sibType4-NB-r13, sibType5-NB-
r13,
                                            sibType14-NB-r13, sibType16-NB-r13, spare3,
spare2, spare1}
-- ASN1STOP
```

Table 34 shows the description of the SystemInformationBlockType1-NB field.

TABLE 34

SystemInformationBlockType1-NB field descriptions attachWithoutPDN-Connectivity
If present, the field indicates that attach without PDN connectivity as specified in TS 24.301 [35] is supported for this PLMN.
cellBarred
Barred means the cell is barred, as defined in TS 36.304 [4].
cellIdentity
Indicates the cell identity.
cellReservedForOperatorUse
As defined in TS 36.304 [4].
cellSelectionInfo
Cell selection information as specified in TS 36.304 [4].
downlinkBitmapNB-IoT
downlink subframe configuration for downlink transmission.
If the bitmap is not present, the UE shall assume that all subframes are valid (except for subframes carrying NPSS/NSSS/NPBCH/SIB1-NB) as specified in TS 36.213[23].
eutraControlRegionSize
Indicates the control region size of the E-UTRA cell for the in-band operation mode. Unit is in number of OFDM symbols.
freqBandIndicator
A list of as defined in TS 36.101 [42, table 6.2.4-1] for the frequency band in freqBandIndicator.
freqBandInfo
A list of additionalPmax and additionalSpectrumEmission values as defined in TS 36.101 [42, table 6.2.4-1] for the frequency band in freqBandIndicator.
hyperSFN-MSB
Indicates the 8 most significat bits of hyper-SFN. Together with hyperSFN-LSB in MIB-NB, the complete hyper-SFN is built up. hyper-SFN is incremented by one when the SFN wraps around.
intraFreqReselection
Used to control cell reselection to intra-frequency cells when the highest ranked cell is barred, or treated as barred by the UE, as specified in TS 36.304 [4].
multiBandInfoList
A list of additional frequency band indicators, additionalPmax and additionalSpectrumEmission values, as defined in TS 36.101 [42, table 5.5-1]. If the UE supports the frequency band in the freqBandIndicator IE it shall apply that frequency band. Otherwise, the UE shall apply the first listed band which it supports in the multiBandInfoList IE.
nrs-CRS-PowerOffset

TABLE 34-continued

SystemInformationBlockType1-NB field descriptions

NRS power offset between NRS and E-UTRA CRS. Unit in dB. Default value of 0.
plmn-IdentityList
List of PLMN identities. The first listed PLMN-Identity is the primary PLMN.
p-Max
Value applicable for the cell. If absent the UE applies the maximum power according to the UE capability.
q-QualMin
Parameter "Qqualmin" in TS 36.304 [4].
q-RxLevMin
Parameter Qrxlevmin in TS 36.304 [4]. Actual value Qrxlevmin = IE value * 2 [dB].
schedulingInfoList
Indicates additional scheduling information of SI messages.
si-Periodicity
Periodicity of the SI-message in radio frames, such that rf256 denotes 256 radio frames, rf512 denotes 512 radio frames, and so on.
si-RadioFrameOffset
Offset in number of radio frames to calculate the start of the SI window. If the field is absent, no offset is applied.
si-RepetitionPattern
Indicates the starting radio frames within the SI window used for SI message transmission. Value every2ndRF corresponds to every second radio frame, value every4thRF corresponds to every fourth radio frame and so on starting from the first radio frame of the SI window used for SI transmission.
si-TB
This field indicates the transport block size in number of bits used to broadcast the SI message.
si-WindowLength
Common SI scheduling window for all SIs. Unit in milliseconds, where ms160 denotes 160 milliseconds, ms320 denotes 320 milliseconds and so on.
sib-MappingInfo
List of the SIBs mapped to this System Information message. There is no mapping information of SIB2; it is always present in the first SystemInformation message listed in the schedulingInfoList list.
systemInfoValueTagList
Indicates SI message specific value tags. It includes the same number of entries, and listed in the same order, as in SchedulingInfoList.
systemInfoValueTagSI TABLE 34-continued SystemInformationBlockType1-NB field descriptions SI message specific value tag as specified in Clause 5.2.1.3. Common for all SIBs within the SI message other than SIB14.
trackingAreaCode
A trackingAreaCode that is common for all the PLMNs listed.

TABLE 35

| Conditional presence | Explanation |
| --- | --- |
| inband | The field is mandatory present if IE operationModeInfo in MIB-NB is set to inband-SamePCI or inband-DifferentPCI. Otherwise the field is not present. |
| inband-SamePCI | The field is mandatory present, if IE operationModeInfo in MIB-NB is set to inband-SamePCI. Otherwise the field is not present. |

NB-IoT Initial Access Procedure

In the general signal transmission/reception procedure of NB-IoT, a procedure for initial access by an NB-IoT terminal to a base station has been briefly described. Specifically, the procedure for initial access by the NB-IoT terminal to the base station may include a procedure for searching for an initial cell and a procedure for obtaining system information by the NB-IoT terminal.

Figure 11:
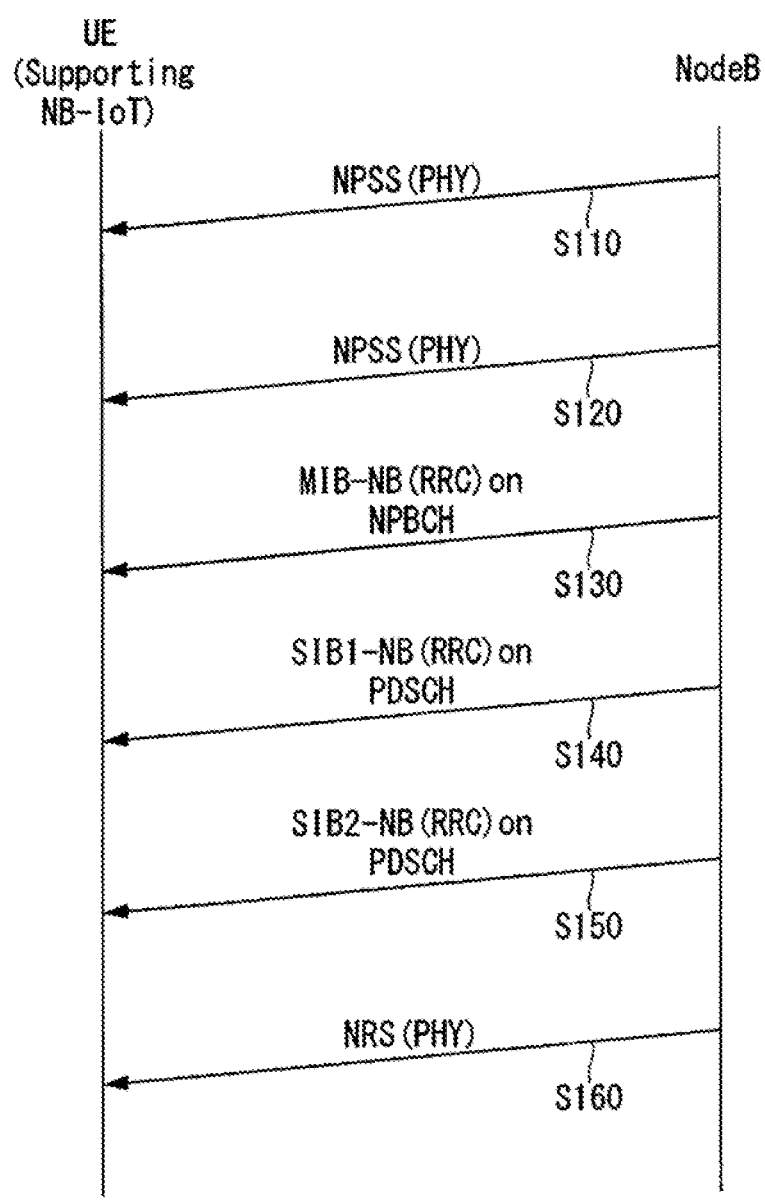
FIG. 11 is an example of an initial access procedure of NB-IoT.

In this regard, a specific signaling procedure between a terminal (UE) and a base station (e.g., NodeB, eNodeB, eNB, gNB, etc.) related to initial access of NB-IoT may be illustrated as shown in FIG. 11. Hereinafter, a general initial access procedure of NB-IoT, configuration of NPSS/NSSS, acquisition of system information (e.g., MIB, SIB, etc.) will be described in more detail with reference to FIG. 11.

FIG. 11 is an example of an initial access procedure of NB-IoT, and names of each physical channel and/or physical signal may be differently configured or referred to according to a wireless communication system to which NB-IoT is applied. As an example, basically, FIG. 11 is described in consideration of the NB-IoT based on the LTE system, but this is only for convenience of description, and it is a matter of course that the contents may be extended and applied to the NB-IoT based on the NR system.

As shown in FIG. 11, NB-IoT is based on following signals transmitted in the downlink: the first and the second narrowband synchronization signals (NPSS & NSSS). The NPSS is transmitted over 11 sub-carriers from the first subcarrier to the eleventh subcarrier in the sixth subframe of each frame (S110), and the NS SS is transmitted over 12 sub-carriers in the NB-IoT carrier in the tenth subframe for FDD and the first subframe for TDD of every other frame (S120).

The NB-IoT UE may receive MasterInformationBlock-NB (MIB-NB) on NPBCH (NB Physical Broadcast Channel) (S130).

The MIB-NB uses a fixed schedule with a periodicity of 640 ms and repetitions made within 640 ms. The first transmission of the MIB-NB is scheduled in subframe #0 of radio frames for which the SFN mod 64=0 and repetitions are scheduled in subframe #0 of all other radio frames. The transmissions are arranged in 8 independently decodable blocks of 80 ms duration.

Then, the UE may receive SystemInformationBlock-Type1-NB (SIB1-NB) on PDSCH (S140).

The SIB1-NB uses a fixed schedule with a periodicity of 2560 ms. SIB1-NB transmission occurs in subframe #4 of every other frame in 16 continuous frames. The starting frame for the first transmission of the SIB1-NB is derived from the cell PCID and the number of repetitions within the 2560 ms period and repetitions are made, equally spaced, within the 2560 ms period. TBS for SystemInformation-BlockType1-NB and the repetitions made within the 2560 ms are indicated by schedulingInfoSIB1 field in the The SI messages are transmitted within periodically occurring time domain windows (referred to as SI-windows) using scheduling information provided in SystemInformationBlockType1-NB. Each SI message is associated with a SI-window and the SI-windows of different SI messages do not overlap. That is, within one SI-window only the corresponding SI is transmitted. The length of the SI-window is common for all SI messages, and is configurable.

Within the SI-window, the corresponding SI message can be transmitted a number of times over 2 or 8 consecutive NB-IoT downlink subframes depending on TBS. The UE acquires the detailed time/frequency domain scheduling information and other information, e.g. used transport format for the SI messages from schedulingInfoList field in SystemInformationBlockType1-NB. The UE is not required to accumulate several SI messages in parallel but may need to accumulate a SI message across multiple SI windows, depending on coverage condition.

SystemInformationBlockType1-NB configures the SI-window length and the transmission periodicity for all SI messages.

Further, the UE may receive SystemInformationBlock-Type2-NB (SIB2-NB) on PDSCH for additional information (S150).

On the other hand, NRS in FIG. 11 refers to Narrowband reference signal.

Random Access Procedure of NB-IoT

In the general signal transmission/reception procedure of NB-IoT, a procedure for randomly accessing a base station by an NB-IoT terminal has been briefly described. Specifically, a procedure in which the NB-IoT terminal randomly accesses the base station may be performed through a procedure in which the NB-IoT terminal transmits a preamble to the base station and receives a response thereto.

Figure 12:
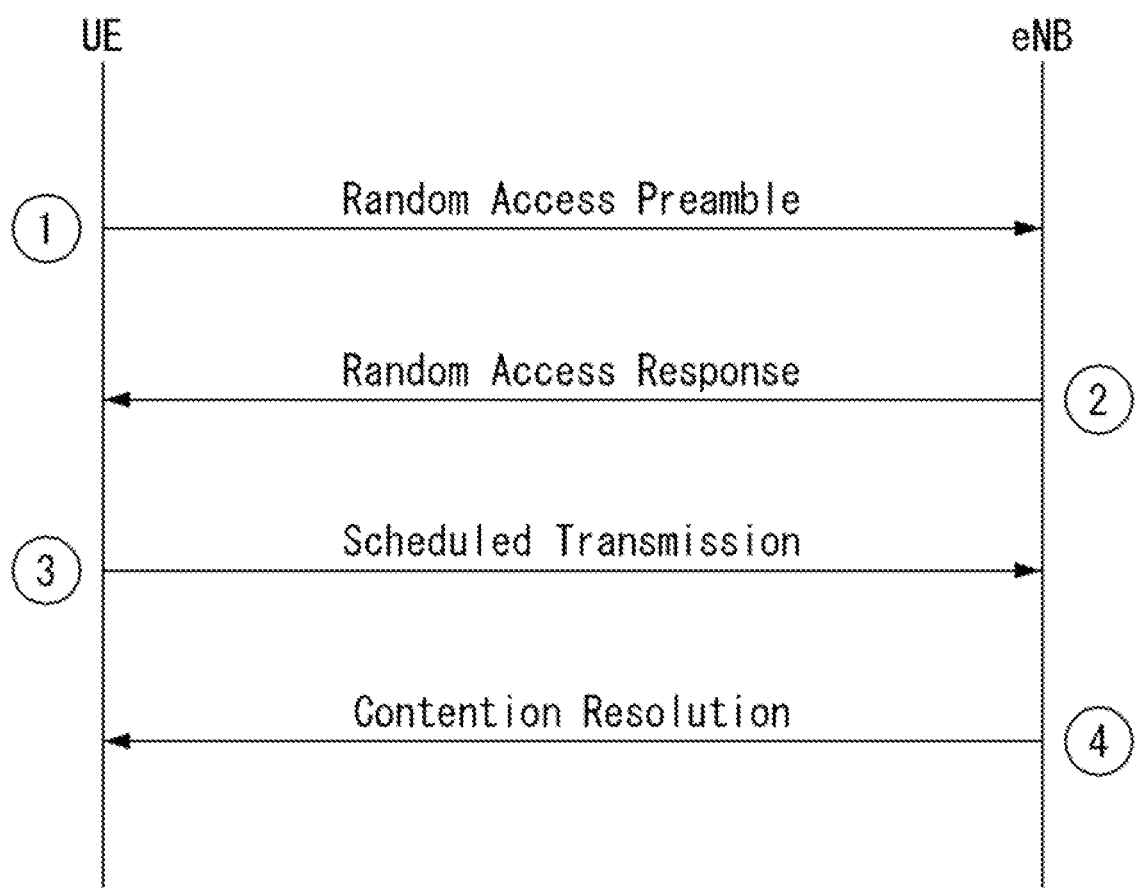
FIG. 12 is an example of a random access procedure of NB-IoT.

In this regard, a specific signaling procedure between a terminal (UE and a base station (e.g., NodeB, eNodeB, eNB, gNB, etc.) related to random access of NB-IoT may be illustrated as shown in FIG. 12. Hereinafter, detailed contents of a random access procedure based on messages (e.g., msg1, msg2, msg3, msg4) used for a general random access procedure of NB-IoT will be described through the description of FIG. 12.

FIG. 12 is an example of an NB-IoT random access procedure, and names of each physical channel, each physical signal, and/or each message may be differently configured or referred to according to a wireless communication system to which NB-IoT is applied. As an example, basically, FIG. 12 is described in consideration of the NB-IoT based on the LTE system, but this is only for convenience of description, and it is a matter of course that the contents may be extended and applied to the NB-IoT based on the NR system.

As shown in FIG. 12, in the case of NB-IoT, the RACH procedure has the same message flow as LTE having different parameters.

Hereinafter, the NPRACH transmitted from the NB-IoT terminal to the base station in relation to the NB-IoT random access procedure will be described in detail.

Figure 13:
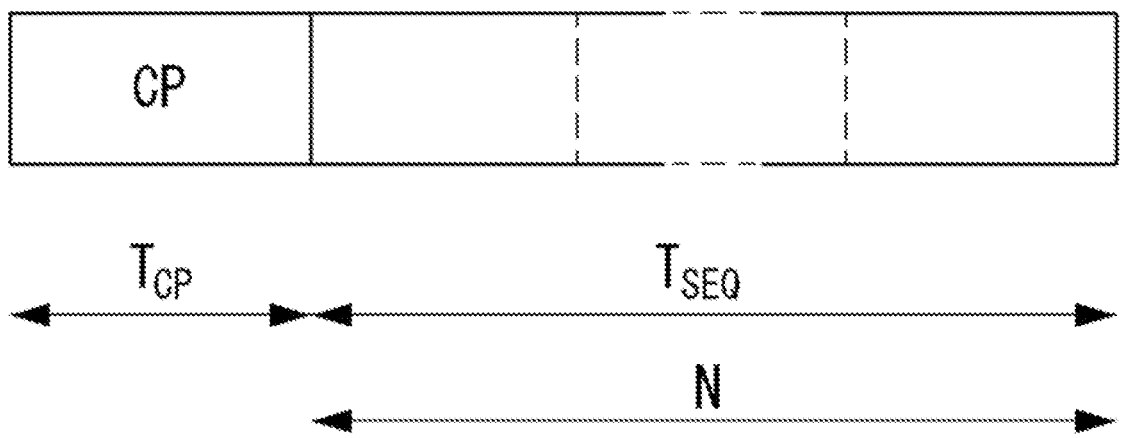
FIG. 13 shows the structure of a random access symbol group.

FIG. 13 illustrates the structure of a random access symbol group.

As shown in FIG. 13, a random access symbol group consists of a sequence of identical symbols with a cyclic prefix of length and a total length. The total number of symbol groups in the preamble repetition unit is denoted by P. The number of time-continuous symbol groups is given by G.

The parameter values of frame structures 1 and 2 are shown in Tables 36 and 37, respectively.

TABLE 36

| Preamble format | G | P | N | $T_{CP}$ | $T_{SEQ}$ |
|---|---|---|---|---|---|
| 0 | 4 | 4 | 5 | $2048T_s$ | $5 \cdot 8192\ T_s$ |
| 1 | 4 | 4 | 5 | $8192T_s$ | $5 \cdot 8192\ T_s$ |
| 2 | 6 | 6 | 3 | $24576T_s$ | $3 \cdot 24576T_s$ |

TABLE 37

| Preamble format | Supported uplink-downlink configurations | G | P | N | $T_{CP}$ | $T_{SEQ}$ |
|---|---|---|---|---|---|---|
| 0 | 1, 2, 3, 4, 5 | 2 | 4 | 1 | $4778T_s$ | $1 \cdot 8192T_s$ |
| 1 | 1, 4 | 2 | 4 | 2 | $8192T_s$ | $2 \cdot 8192T_s$ |
| 2 | 3 | 2 | 4 | 4 | $8192T_s$ | $4 \cdot 8192T_s$ |
| 0-a | 1, 2, 3, 4, 5 | 3 | 6 | 1 | $1536T_s$ | $1 \cdot 8192T_s$ |
| 1-a | 1, 4 | 3 | 6 | 2 | $3072T_s$ | $2 \cdot 8192T_s$ |

Transmission of the random access preamble is limited to specific time and frequency resources when triggered by the MAC layer. Each NPRACH resource configuration can configure up to three NPRACH resource configurations in cells corresponding to different coverage levels. NPRACH resource configuration is given by periodicity, number of repetitions, start time, frequency position, and number of subcarriers.

Discontinuous Reception Procedure of NB-IoT

During the general signal transmission/reception procedure of the above-described NB-IoT, the NB-IoT terminal is in an idle state (e.g., RRC_IDLE state) and/or an inactive state (e.g., RRC_INACTIVE state) in order to reduce power consumption. In this case, the NB-IoT terminal transitioned to an idle state and/or the inactive state may be configured to use the DRX scheme. For example, an NB-IoT terminal that has been transitioned to an idle state and/or an inactive state monitors the NPDCCH related to paging only in a specific subframe (or frame, slot) according to a DRX cycle configured by a base station or the like. It can be set to perform. Here, the NPDCCH related to paging may mean an NPDCCH scrambled with P-RNTI (Paging Access-RNTI).

Figure 14:
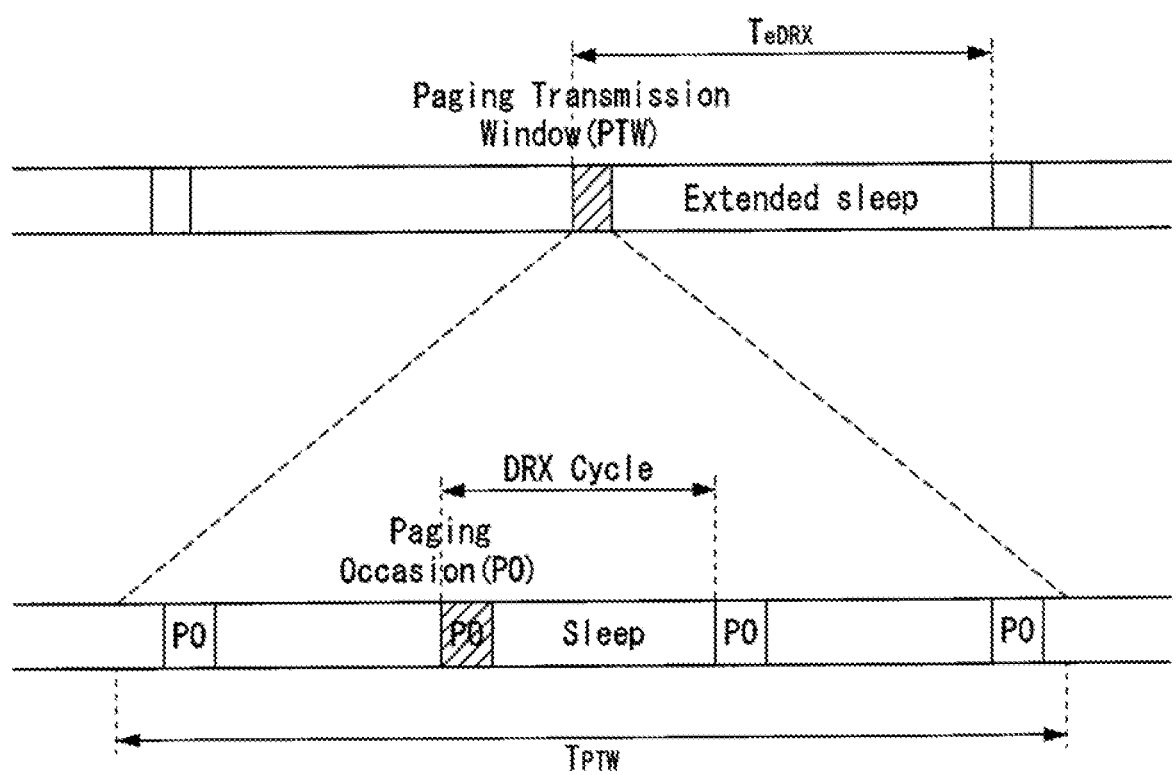
FIG. 14 shows an example of a DRX scheme in an idle state and/or an inactive state.

FIG. 14 illustrates an example of a DRX scheme in an idle state and/or an inactive state.

As shown in FIG. 14, the UE in the RRC_IDLE state only monitors some of the Subframes (SFs) with respect to paging (i.e., the paging occasions, PO) within a subset of radio frames (i.e., the paging frames, PF). Paging is used to trigger an RRC connection and to indicate a change in system information for UE in RRC_IDLE mode.

Figure 15:
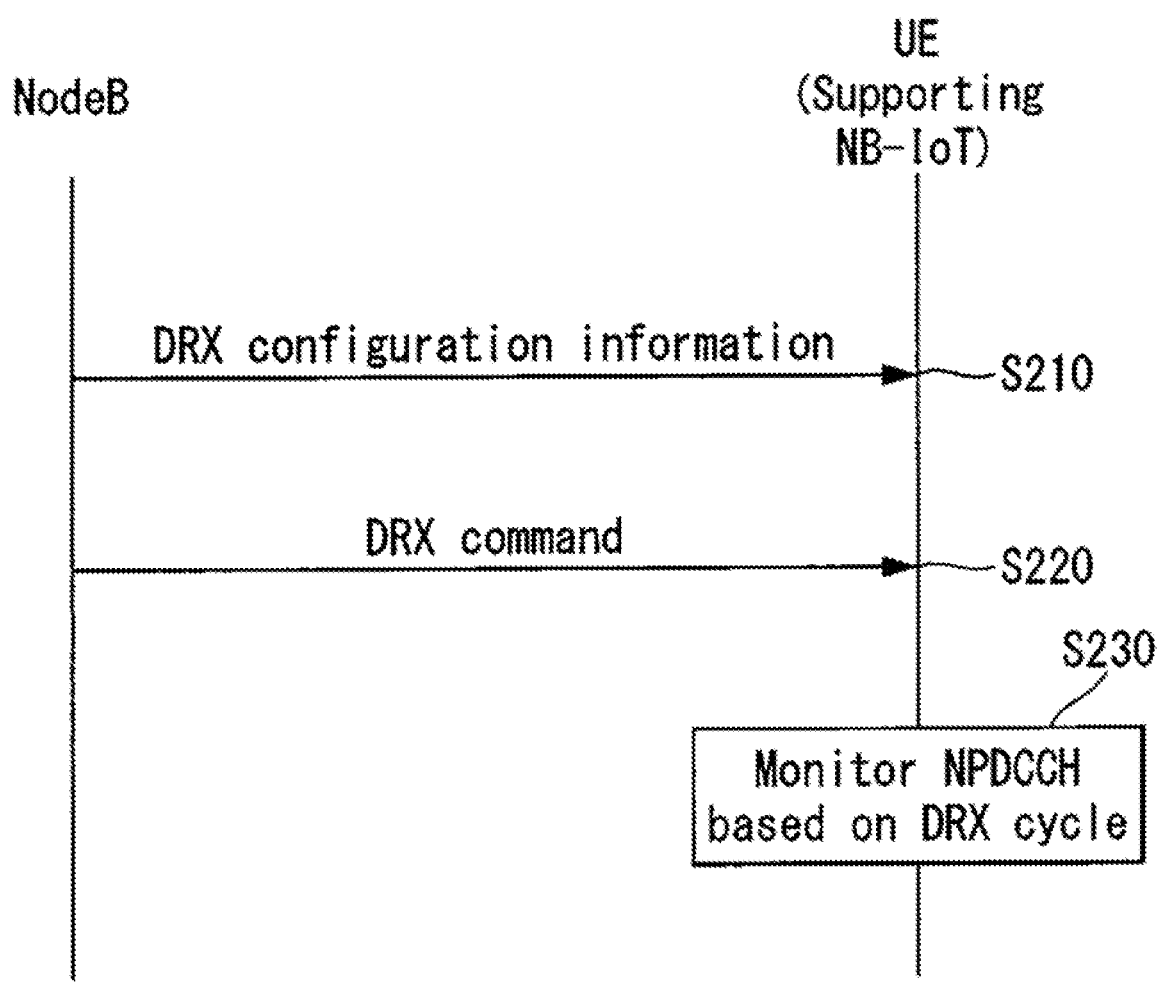
FIG. 15 shows an example of a DRX configuration and indication procedure for an NB-IoT terminal.

FIG. 15 illustrates an example of a DRX configuration and indication procedure for an NB-IoT terminal.

That is, DRX configuration and instruction for the NB-IoT terminal may be performed as shown in FIG. 15. In addition, FIG. 15 is only for convenience of description and does not limit the method proposed in the present disclosure.

Referring to FIG. 15, the NB-IoT terminal may receive DRX configuration information from a base station (e.g., NodeB, eNodeB, eNB, gNB, etc.) (S210). In this case, the terminal may receive such information from the base station through higher layer signaling (e.g., RRC signaling). Here, the DRX configuration information may include DRX cycle information, DRX offset, and configuration information for timers related to DRX.

Thereafter, the NB-IoT terminal may receive a DRX command from the base station (S220). In this case, the terminal may receive such a DRX command from the base station through higher layer signaling (e.g., MAC-CE signaling).

Upon receiving the above-described DRX command, the NB-IoT terminal may monitor the NPDCCH in a specific time unit (e.g., subframe, slot) according to the DRX cycle (S230). Here, monitoring the NPDCCH may means checking whether it matches (i.e., coincides) the desired value by scrambling corresponding CRC with a predetermined specific RNTI value after decoding the NPDCCH for a specific area according to the DCI format to be received through the corresponding search space.

When the corresponding NMB-IoT terminal receives information indicating its paging ID and/or a change of system information in the NPDCCH through the procedure shown in FIG. 15 described above, the connection (e.g., RRC connection) with the base station is initialized (or re-configured), or It may be configured to receive (or acquire) new system information from the base station.

When the NB-IoT UE detects the NPDCCH using a P-RNTI (Paging Access Radio Network Temporary Identifier) in the PO, the NB-IoT UE decodes the corresponding NPDSCH. The paging message is transmitted through the NPDSCH and may include a list of NB-IoT UEs to be paged and information including whether paging is for connection establishment or system information has been changed. Each NB-IoT UE that finds its ID in this list can transmit it to the paged upper layer and, in turn, receive a command to initiate an RRC connection. When the system information is changed, the NB-IoT UE starts reading SIB1-NB, and information that needs to read SIB again can be obtained from SIB1-NB.

Figure 16:
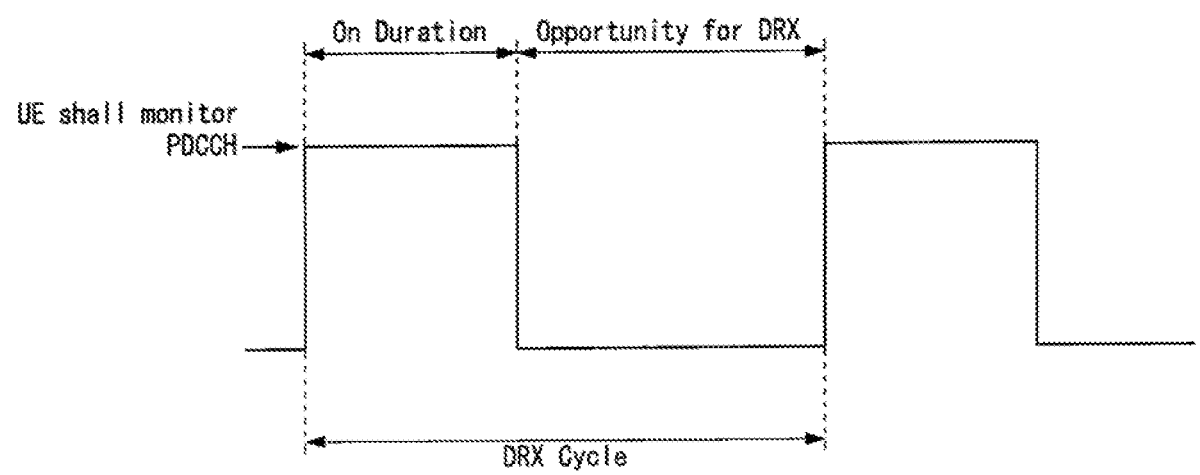
FIG. 16 shows an example of a cycle of DRX.

FIG. 16 illustrates an example of a cycle of DRX.

As shown in FIG. 16, the DRX Cycle specifies the periodic repetition of the On Duration followed by a possible period of inactivity. The MAC entity may be configured by RRC with a DRX functionality that controls the UE's PDCCH monitoring activity for the MAC entity's RNTIs (e.g., C-RNTI). Accordingly, the UE monitors the PDCCH for a short period (e.g., On Duration), and may stop monitoring the PDCCH for a long period (e.g., Opportunity for DRX). When in RRC CONNECTED, if DRX is configured (i.e., Connected Mode DRX, CDRX), the MAC entity is allowed to monitor the PDCCH discontinuously using the DRX operation specified below; otherwise the MAC entity monitors the PDCCH continuously. For NB-IoT, the PDCCH may refer to the NPDCCH. For NB-IoT, an extended DRX cycle of 10.24 s is supported in RRC Connected.

RRC controls DRX operation by configuring the timers onDurationTimer, drx-InactivityTimer, drx-RetransmissionTimer (for HARQ processes scheduled using 1 ms TTI, one per DL HARQ process except for the broadcast process), drx-RetransmissionTimerShortTTI (for HARQ processes scheduled using short TTI, one per DL HARQ process), drx-ULRetransmissionTimer (for HARQ processes scheduled using 1 ms TTI, one per asynchronous UL HARQ process), drx-ULRetransmissionTimerShortTTI (for HARQ processes scheduled using short TTI, one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined.

Machine Type Communication (MTC)

MTC (Machine Type Communication) is an application that does not require a large throughput that can be applied to M2M (Machine-to-Machine) or IoT (Internet-of-Things), and refers to the communication technology adopted to meet the requirements of an IoT service in 3GPP.

The MTC may be implemented to satisfy the criteria of (i) low cost & low complexity, (ii) enhanced coverage, and (iii) low power consumption.

In 3GPP, MTC has been applied from release 10, and briefly looks at the features of MTC added for each release of 3GPP.

First, the MTC described in 3GPP release 10 and release 11 relates to a load control method.

The load control method is to prevent IoT (or M2M) devices from suddenly loading the base station.

More specifically, in the case of release 10, the load control method relates to a method of controlling the load by disconnecting the connection to the connected IoT devices when a load occurs in the base station, and in the case of release 11, the load control method relates to a method of blocking access to a terminal in advance by a base station notifying the terminal to access later through broadcasting such as SIB14.

In the case of Release 12, features for low cost MTC were added, and for this purpose, UE category 0 was newly defined. UE category is an indicator of how much data a terminal can process in a communication modem.

That is, a UE of UE category 0 reduces the baseband and RF complexity of the UE by using a half duplex operation with a reduced peak data rate, relaxed RF requirements, and a single receiving antenna.

In Release 13, a technology called eMTC (enhanced MTC) was introduced, and by operating only at 1.08 MHz, which is the minimum frequency bandwidth supported by legacy LTE, the price and power consumption can be further reduced.

The contents described below are mainly eMTC-related features, but can be equally applied to MTC, eMTC, and MTC applied to 5G (or NR) unless otherwise specified. Hereinafter, for convenience of description, it will be collectively referred to as MTC.

Therefore, the MTC to be described later may be referred to as eMTC (enhanced MTC), LTE-M1/M2, BL (Bandwidth reduced low complexity)/CE (coverage enhanced), non-BL UE (in enhanced coverage), NR MTC, enhanced BL/CE, etc. as well. That is, the term MTC can be replaced with a term to be defined in the future 3GPP standard.

MTC General Characteristics (1) MTC operates only in a specific system bandwidth (or channel bandwidth).

A specific system bandwidth may use 6 RB of legacy LTE as shown in Table 38 below, and may be defined in consideration of the frequency range and subcarrier spacing (SCS) of the NR defined in Tables 39 to 41. The specific system bandwidth may be expressed as a narrowband (NB). For reference, Legacy LTE refers to a part described in 3GPP standards other than MTC. Preferably, in the NR, the MTC may operate using RBs corresponding to the lowest system bandwidth of Tables 40 and 41 below, as in legacy LTE. Alternatively, in NR, the MTC may operate in at least one bandwidth part (BWP) or may operate in a specific band of the BWP.

TABLE 38

| Channel bandwidth [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

TABLE 39

| Frequency range designation | Corresponding frequency range |
|---|---|
| FR1 | 450 MHz-6000 MHz |
| FR2 | 24250 MHz-52600 MHz |

Table 40 is a table showing an example of the maximum transmission bandwidth configuration (NRB) for the channel bandwidth and SCS in FR 1 of the NR.

TABLE 40

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 41 is a table showing an example of the maximum transmission bandwidth configuration (NRB) for the channel bandwidth and SCS in FR 2 of the NR.

TABLE 41

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

The MTC narrowband (NB) will be described in more detail.

MTC follows a narrowband operation to transmit and receive physical channels and signals, and the maximum channel bandwidth is reduced to 1.08 MHz or 6 (LTE) RBs.

The narrowband may be used as a reference unit for resource allocation units of some channels of downlink and uplink, and the physical location of each narrowband in the frequency domain may be defined differently according to system bandwidth.

The bandwidth of 1.08 MHz defined in MTC is defined in order for the MTC terminal to follow the same cell search (cell search) and random access procedure as the legacy terminal.

MTC can be supported by cells with a much larger bandwidth (e.g., 10 MHz) than 1.08 MHz, but physical channels and signals transmitted/received by MTC are always limited to 1.08 MHz.

The system having a much larger bandwidth may be a legacy LTE, NR system, 5G system, and the like.

Narrowband is defined as 6 non-overlapping consecutive physical resource blocks in the frequency domain.

If $N_{NB}^{UL} \geq 4$, the wideband is defined as 4 non-overlapping narrowbands in the frequency domain. If $N_{NB}^{UL} < 4$, $N_{WB}^{UL}=1$ and a single wideband are composed of $N_{NB}^{UL}$ non-overlapping narrowband(s).

For example, in the case of a 10 MHz channel (50 RBs), 8 non-overlapping narrowbands are defined.

FIG. 17(a) is a diagram illustrating an example of a narrowband operation, and FIG. 17(b) is a diagram illustrating an example of repetition with RF retuning.

With reference to FIG. 17(b), frequency diversity by RF retuning will be described.

Due to the narrowband RF, single antenna and limited mobility, MTC supports limited frequency, spatial and temporal diversity. To reduce the effects of fading and outage, frequency hopping is supported between different narrowbands by RF retuning.

This frequency hopping is applied to different uplink and downlink physical channels when repetition is possible.

For example, when 32 subframes are used for PDSCH transmission, the first 16 subframes may be transmitted on the first narrowband. At this time, the RF front-end is retuned to another narrowband, and the remaining 16 subframes are transmitted on the second narrowband.

The narrowband of the MTC may be configured by system information or downlink control information (DCI).

(2) MTC operates in half duplex mode and uses a limited (or reduced) maximum transmit power.

(3) MTC does not use a channel (defined in legacy LTE or NR) that should be distributed over the entire system bandwidth of legacy LTE or NR.

For example, legacy LTE channels not used for MTC are PCFICH, PHICH, and PDCCH.

Accordingly, the MTC cannot monitor the above channels and thus defines a new control channel, MPDCCH (MTC PDCCH).

The MPDCCH spans up to 6 RBs in the frequency domain and one subframe in the time domain.

MPDCCH is similar to EPDCCH, and additionally supports common search space for paging and random access.

The MPDCCH is similar to the concept of E-PDCCH used in legacy LTE.

(4) MTC uses a newly defined DCI format, and may be DCI formats 6-0A, 6-0B, 6-1A, 6-1B, 6-2, etc. as an example.

(5) MTC is a PBCH (physical broadcast channel), PRACH (physical random access channel), M-PDCCH (MTC physical downlink control channel), PDSCH (physical downlink shared channel), PUCCH (physical uplink control channel), PUSCH (physical uplink shared channel) can be repeatedly transmitted. Due to such MTC repetition transmission, even when the signal quality or power is very poor, such as in a poor environment such as a basement, the MTC channel can be decoded, resulting in an increase in cell radius and a signal penetration effect. The MTC may support only a limited number of transmission modes (TM) that can operate in a single layer (or single antenna), or can support a channel or a reference signal (RS) that can operate in a single layer. For example, the transmission mode in which the MTC can operate may be TM 1, 2, 6 or 9.

(6) HARQ retransmission of MTC is adaptive and asynchronous, and is based on a new scheduling assignment received on the MPDCCH.

(7) In MTC, PDSCH scheduling (DCI) and PDSCH transmission occur in different subframes (cross subframe scheduling).

(8) All resource allocation information (subframe, transport block size (TBS), subband index) for SIB1 decoding is determined by parameters of MIB, and no control channel is used for SIB1 decoding of MTC.

(9) All resource allocation information (subframe, TBS, subband index) for SIB2 decoding is determined by several SIB1 parameters, and no control channel for SIB2 decoding of MTC is used.

(10) MTC supports extended paging (DRX) cycle.

(11) The MTC can use the same primary synchronization signal (PSS)/secondary synchronization signal (SSS)/common reference signal (CRS) used in legacy LTE or NR. In the case of NR, PSS/SSS is transmitted in units of SS blocks (or SS/PBCH blocks or SSBs), and TRS (tracking RS) can be used for the same purpose as CRS. That is, the TRS is a cell-specific RS and may be used for frequency/time tracking.

MTC Operating Mode and Level

Next, the MTC operation mode and level will be described. MTC is classified into two operation modes (first mode and second mode) and four different levels for coverage enhancement, and may be as shown in Table 42 below.

The MTC operation mode is referred to as CE Mode. In this case, the first mode may be referred to as CE Mode A and the second mode may be referred to as CE Mode B.

TABLE 42

| Mode | Level | Description |
|---|---|---|
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

The first mode is defined to improve small coverage in which complete mobility and channel state information (CSI) feedback are supported, and thus, there is no repetition or the number of repetitions is small. The operation of the first mode may be the same as the operation range of UE category 1. The second mode is defined for UEs with extremely poor coverage conditions supporting CSI feedback and limited mobility, and a large number of repetitive transmissions are defined. The second mode provides up to 15 dB of coverage enhancement based on the range of UE category 1. Each level of MTC is defined differently in RACH and paging procedure.

It looks at the MTC operation mode and how each level is determined.

The MTC operation mode is determined by the base station, and each level is determined by the MTC terminal. Specifically, the base station transmits RRC signaling including information on the MTC operation mode to the terminal. Here, RRC signaling may be an RRC connection setup message, an RRC connection reconfiguration message, or an RRC connection reestablishment message. Here, the term of the message may be expressed as an information element (IE).

Thereafter, the MTC terminal determines a level within each operation mode and transmits the determined level to the base station. Specifically, the MTC terminal determines the level in the operation mode based on the measured channel quality (e.g., RSRP, RSRQ, or SINR), and informs the determined level to the base station using PRACH resources (frequency, time, preamble) corresponding to the determined level.

MTC Guard Period

As described above, MTC operates in the narrowband. The position of the narrowband may be different for each specific time unit (e.g., subframe or slot). The MTC terminal tunes to a different frequency in all time units. Therefore, a certain time is required for all frequency retuning, and this certain time is defined as the guard period of the MTC. That is, the guard period is required when transitioning from one time unit to the next time unit, and transmission and reception do not occur during the period.

The guard period is defined differently depending on whether it is a downlink or an uplink, and is defined differently according to a downlink or uplink situation. First, the guard period defined in the uplink is defined differently according to the characteristics of data carried by the first time unit (time unit N) and the second time unit (time unit N+1). Next, the guard period of the downlink requires a condition that (1) the first downlink narrowband center frequency and the second narrowband center frequency are different, and (2) in TDD, the first uplink narrowband center frequency and the second downlink center frequency are different.

The MTC guard period defined in Legacy LTE is described, and guard periods of $N_{symb}^{retune}$ SC-FDMA symbols are generated at most for Tx-Tx frequency retuning between two consecutive subframes. If the upper layer parameter ce-RetuningSymbols is configured, $N_{symb}^{retune}$ is equal to ce-RetuningSymbols, otherwise $N_{symb}^{retune}=2$. In addition, for the MTC terminal configured with the upper layer parameter srs-UpPtsAdd, a guard period of the maximum SC-FDMA symbol is generated for Tx-Tx frequency retuning between the first special subframe for frame structure type 2 and the second uplink subframe.

Figure 18:
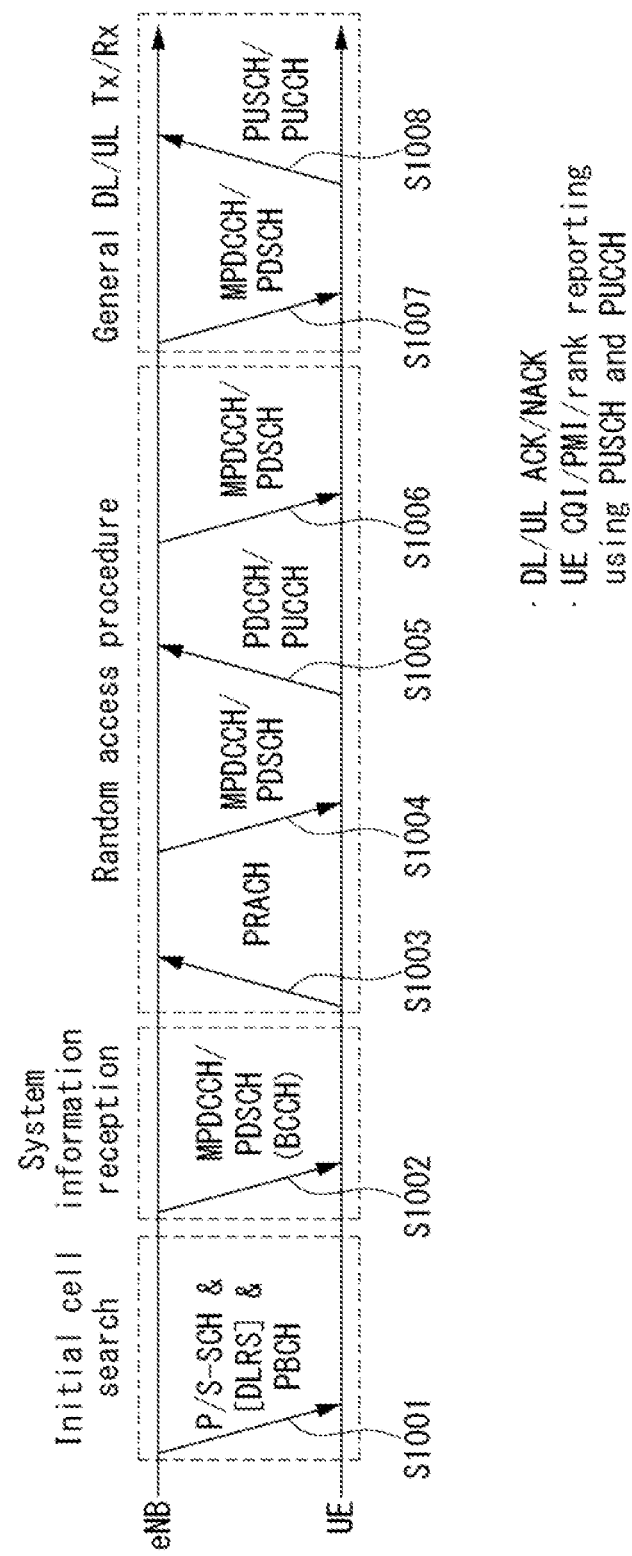
FIG. 18 is a diagram illustrating physical channels that may be used for MTC and a general signal transmission method using them.

FIG. 18 is a diagram illustrating physical channels that can be used for MTC and a general signal transmission method using them.

The MTC terminal, which is powered on again while the power is turned off, or that newly enters the cell, performs an initial cell search operation such as synchronizing with the base station in step S1101. To this end, the MTC terminal receives a Primary Synchronization Signal (PSS) and a Secondary Synchronization Signal (SSS) from the base station, synchronizes with the base station, and acquires information such as a cell identifier (ID). The PSS/SSS used for the initial cell search operation of the MTC may be a legacy LTE PSS/SSS, a Resynchronization signal (RSS), or the like.

Thereafter, the MTC terminal may receive a physical broadcast channel (PBCH) signal from the base station to obtain intra-cell broadcast information.

Meanwhile, the MTC terminal may check a downlink channel state by receiving a downlink reference signal (DL RS) in the initial cell search step. Broadcast information transmitted through PBCH is MIB (Master Information Block), and in MTC, the MIB is repeated in a subframe different from the first slot of subframe #0 of the radio frame (subframe #9 for FDD and subframe #5 for TDD).

PBCH repetition is performed by repeating exactly the same constellation point in different OFDM symbols so that it can be used for initial frequency error estimation even before attempting PBCH decoding.

FIG. 19(a) illustrates an example of a frequency error estimation method for a repetition pattern for subframe #0, a general CP, and repeated symbols in FDD, and FIG. 19(b) illustrates an example of transmission of SIB-BR over a broadband LTE channel.

In MIB, five reserved bits are used in MTC to transmit scheduling information for a new system information block for bandwidth reduced device (SIB1-BR) including a time/frequency location and a transport block size.

SIB-BR is transmitted directly on the PDSCH without any control channel associated with it.

The SIB-BR remains unchanged in 512 radio frames (5120 ms) to allow multiple subframes to be combined.

Table 43 is a table showing an example of the MIB.

TABLE 43

```
-- ASN1START
MasterInformationBlock ::=         SEQUENCE {
    dl-Bandwidth                       ENUMERATED {
                                           n6, n15, n25, n50, n75,
                                           n100},
    phich-Config                       PHICH-Config,
    systemFrameNumber                  BIT STRING (SIZE (8)),
    schedulingInfoSIB1-BR-r13          INTEGER (0..31),
    systemInfoUnchanged-BR-r15         BOOLEAN,
    spare                              BIT STRING (SIZE (4))
}
-- ASN1STOP
```

In Table 43, the schedulingInfoSIB1-BR field represents an index for a table defining SystemInformationBlockType1-BR scheduling information, and a value of 0 means that SystemInformationBlockType1-BR is not scheduled. The overall function and information carried by SystemInformationBlockType1-BR (or SIB1-BR) is similar to that of legacy LTE SIB1. The contents of SIB1-BR can be classified into (1) PLMN, (2) cell selection criteria, and (3) scheduling information for SIB2 and other SIBs.

After completing the initial cell search, the MTC terminal may receive the MPDCCH and the PDSCH according to the MPDCCH information in step S1102 to obtain more detailed system information. For MPDCCH, (1) it is very similar to EPDCCH, carries common and UE specific signaling, (2) it can be transmitted only once or can be transmitted repeatedly (the number of repetitions is configured by higher layer signaling), (3) A number of MPDCCHs are supported, and the UE monitors the set of MPDCCHs, (4) it is formed by an aggregation of an enhanced control channel element (eCCE), each eCCE includes a set of resource elements, (5) RA-RNTI (Radio Network Temporary Identifier), SI-RNTI, P-RNTI, C-RNTI, temporary C-RNTI, and semi-persistent scheduling (SPS) C-RNTI are supported.

Thereafter, the MTC terminal may perform a random access procedure such as steps S1103 to S1106 in order to complete access to the base station. The basic configuration related to the RACH procedure is transmitted by SIB2. In addition, SIB2 includes parameters related to paging. Paging Occasion (PO) is a subframe in which P-RNTI can be transmitted on the MPCCH. When the P-RNTI PDCCH is repeatedly transmitted, PO refers to the start subframe of the MPDCCH repetition. The paging frame (PF) is one radio frame and may include one or a plurality of POs. When DRX is used, the MTC terminal monitors only one PO per DRX cycle. Paging NarrowBand (PNB) is one narrowband, and the MTC terminal performs paging message reception.

To this end, the MTC terminal may transmit a preamble through a physical random access channel (PRACH) (S1103) and receive a response message (RAR) to the preamble through the MPDCCH and a corresponding PDSCH (S1104). In the case of contention-based random access, the MTC terminal may perform a contention resolution procedure such as transmission of an additional PRACH signal (S1105) and reception of an MPDCCH signal and a PDSCH signal corresponding thereto (S1106). Signals and/or messages (Msg 1, Msg 2, Msg 3, Msg 4) transmitted in the RACH procedure in MTC may be repeatedly transmitted, and this repetition pattern is configured differently according to the CE level. Msg 1 may mean PRACH preamble, Msg 2 may mean RAR (random access response), Msg 3 may mean UL transmission of the MTC terminal for RAR, and Msg 4 may mean DL transmission of the base station for Msg 3.

For random access, signaling for different PRACH resources and different CE levels is supported. This provides the same control of the near-far effect for the PRACH by grouping together UEs experiencing similar path loss. Up to four different PRACH resources may be signaled to the MTC terminal.

The MTC terminal estimates the RSRP using a downlink RS (e.g., CRS, CSI-RS, TRS, etc.), and selects one of the resources for random access based on the measurement result. Each of the four resources for random access has a relationship with the number of repetitions for the PRACH and the number of repetitions for the random access response (RAR).

Therefore, the MTC terminal with bad coverage needs a large number of repetitions to be successfully detected by the base station, and needs to receive an RAR having a corresponding repetition number to satisfy their coverage level.

Search spaces for RAR and contention resolution messages are also defined in the system information and are independent for each coverage level.

And, the PRACH waveform used in MTC is the same as the PRACH waveform used in legacy LTE (e.g., OFDM and Zadoff-Chu sequence).

After performing the above-described procedure, the MTC terminal receives MPDCCH signal and/or PDSCH signal (S1107) and transmits physical uplink shared channel (PUSCH) signal and/or physical uplink control channel (PUCCH) (S1108) as a general uplink/downlink signal transmission procedure. Control information transmitted from the MTC terminal to the base station is collectively referred to as uplink control information (UCI). UCI may include HARQ-ACK/NACK, scheduling request (SR), channel quality indicator (CQI), precoding matrix indicator (PMI), rank indication (RI) information, etc.

When the RRC connection to the MTC terminal is established, the MTC terminal blind-decodes the MPDCCH in a search space configured to obtain uplink and downlink data allocation.

MTC uses all OFDM symbols available in a subframe to transmit DCI. Therefore, time domain multiplexing between the control channel and the data channel in the same subframe is impossible. That is, as discussed above, cross-subframe scheduling between the control channel and the data channel is possible.

The MPDCCH having the last repetition in subframe #N schedules PDSCH allocation in subframe #N+2.

The DCI transmitted by the MPDCCH provides information on how many times the MPDCCH is repeated so that the MTC terminal knows when PDSCH transmission starts.

PDSCH allocation can be performed in different narrowbands. Therefore, the MTC terminal needs to retune before decoding the PDSCH allocation.

For uplink data transmission, scheduling follows the same timing as legacy LTE. Here, the last MPDCCH in subframe #N schedules PUSCH transmission starting in subframe #N+4.

Figure 20:
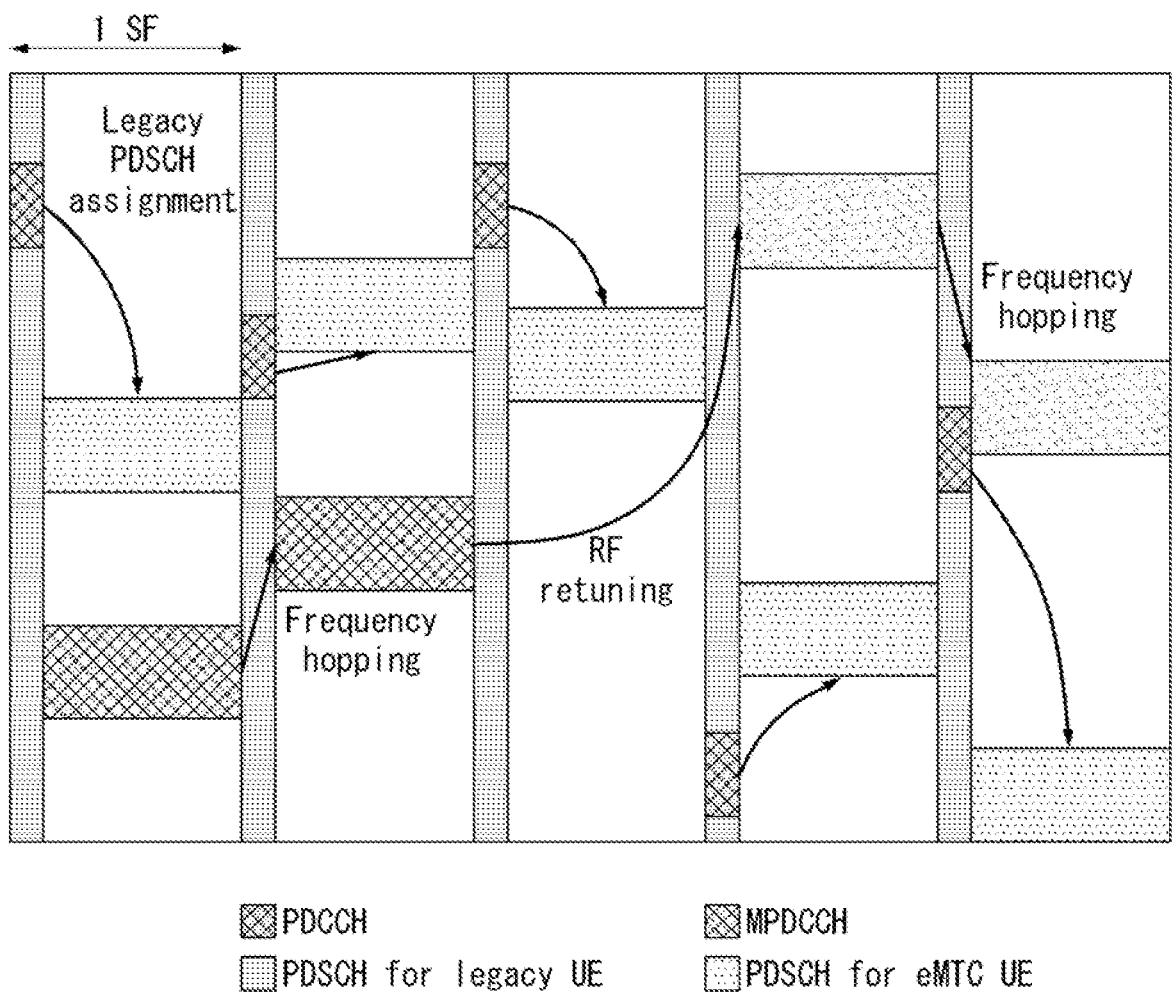
FIG. 20 is a diagram showing an example of scheduling for each of the MTC and legacy LTE.

FIG. 20 is a diagram illustrating an example of scheduling for each of the MTC and legacy LTE.

Legacy LTE allocation is scheduled using the PDCCH, which uses the first OFDM symbols in each subframe, and the PDSCH is scheduled in the same subframe as the subframe in which the PDCCH is received.

In contrast, the MTC PDSCH is scheduled for cross-subframe, and one subframe is defined between the MPDCCH and the PDSCH to allow MPDCCH decoding and RF retuning.

The MTC control channel and data channels may be repeated through a large number of subframes having a maximum of 256 subframes for the MPDCCH and a maximum of 2048 subframes for the PDSCH so as to be decoded under extreme coverage conditions.

Cell Search of MTC

Hereinafter, the (initial) cell search (cell search) procedure of MTC in step S1001 of FIG. 18 will be described in more detail.

Cell search is the procedure by which a UE acquires time and frequency synchronization with a cell and detects the cell ID of that cell. E-UTRA cell search supports a scalable overall transmission bandwidth corresponding to 6 RBs and upwards. PSS and SSS are transmitted in the downlink to facilitate cell search. If a resynchronization signal is transmitted in the downlink, it can be used to re-acquire time and frequency synchronization with the cell. Physical layer provides 504 unique cell identities using synchronization signals.

The UE searches for the PSS/SSS in the center 6 PRBs to obtain the cell ID, subframe timing information, duplexing mode (time division duplex (TDD), or frequency division duplex (FDD)), and cyclic prefix (CP) length. The PSS uses Zadoff-Chu (ZC) sequence. For frame structure type 1 (i.e. FDD), the PSS shall be mapped to the last orthogonal frequency division multiplexing (OFDM) symbol in slots 0 and 10. For frame structure type 2 (i.e. TDD), the PSS shall be mapped to the third OFDM symbol in subframes 1 and 6. The SSS uses an interleaved concatenation of two length-31 binary sequences. The concatenated sequence is scrambled with a scrambling sequence given by the PSS. For FDD, the SSS shall be mapped OFDM symbol number NsymbDL-2 in slots 0 and 10, where NsymbDL is the number of OFDM symbols in a downlink slot. For TDD, the SSS shall be mapped OFDM symbol number NsymbDL-1 in slots 1 and 11, where NsymbDL is the number of OFDM symbols in a downlink slot.

System Information Acquisition of MTC

Hereinafter, a procedure for obtaining system information of the MTC in step S1002 of FIG. 18 will be described in more detail.

Figure 21:
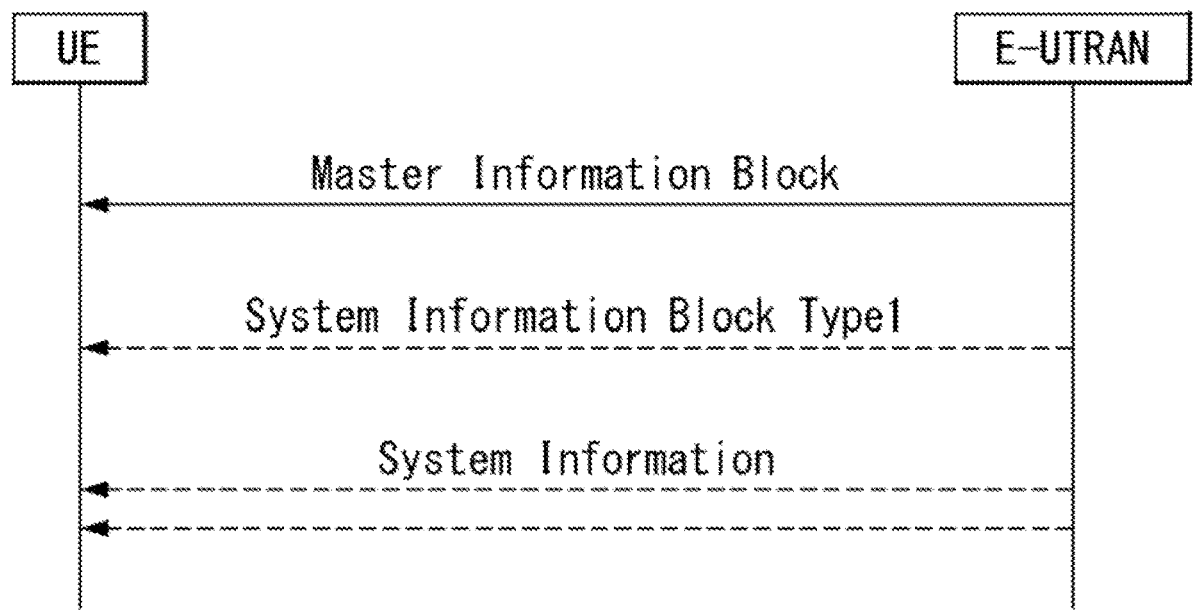
FIG. 21 shows a general system for a system information acquisition procedure.

FIG. 21 illustrates a general system related to system information acquisition procedure.

Upon searching the cell by using the PSS/SSS, the UE acquires system information (SI).

The UE applies the system information acquisition procedure to acquire the access stratum (AS)- and non-access stratum (NAS)-system information that is broadcasted by the E-UTRAN. The procedure applies to UEs in RRC_IDLE and UEs in RRC_CONNECTED.

System information is divided into master information block (MIB; MasterInformationBlock) and a number of system information blocks (SIBs). The MIB defines the most essential physical layer information of the cell required to receive further system information. The MIB is transmitted on PBCH. SIBs other than system information block type-1 (SIB1; SystemInformationBlockType1) are carried in SI messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; system information block type-1 (SIB2; SystemInformationBlockType2) is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH. The BL UEs and UEs in CE apply BR version of the SIB or SI messages, e.g. SystemInformationBlockType1-BR.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For TDD/FDD system with a bandwidth larger than 1.4 MHz that supports BL UEs or UEs in CE, MIB transmission may additionally be repeated in subframe #0 of the same radio frame, and subframe #5 of the same radio frame for FDD and TDD.

The SystemInformationBlockType1 contain information relevant when evaluating if a UE is allowed to access a cell and defines the scheduling of other system information blocks. The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR include information such as valid downlink and uplink subframes, maximum support of coverage enhancement, and scheduling information for other SIBs. The SystemInformationBlockType1-BR is transmitted over PDSCH directly, without any control channel associated with it. The SystemInformationBlockType1-BR uses a schedule with a periodicity of 80 ms. Transport block size (TBS) for SystemInformationBlockType1-BR and the repetitions made within 80 ms are indicated via schedulingInfoSIB1-BR in MIB or optionally in the RRCConnectionReconfiguration message including the MobilityControlInfo. Specifically, five reserved bits in the MIB are used in eMTC to convey scheduling information about SystemInformationBlockType1-BR, including time and frequency location, and transport block size. SIB-BR remains unchanged for 512 radio frames (5120 ms) to allow a large number of subframes to be combined.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than multimedia broadcast multicast service single frequency network (MBSFN) subframes, uplink subframes in TDD, and subframe #5 of radio frames for which SFN mode. The UE acquires the detailed time-domain scheduling (and other information, e.g. frequency-domain scheduling, used transport format) from decoding system information radio network temporary identity (SI-RNTI) on PDCCH. For a BL UE or a UE in CE, the detailed time/frequency domain scheduling information for the SI messages is provided in SystemInformationBlockType1-BR.

The SystemInformationBlockType2 contains common and shared channel information.

Random Access Procedure of MTC

Hereinafter, a random access procedure of MTC in steps S1003 to S1006 of FIG. 18 will be described in more detail.

The random access procedure is performed for the following events:
Initial access from RRC_IDLE;
RRC Connection Re-establishment procedure;
Handover;
DL data arrival during RRC_CONNECTED requiring random access procedure;
UL data arrival during RRC_CONNECTED requiring random access procedure;
For positioning purpose during RRC_CONNECTED requiring random access procedure.

Figure 22:
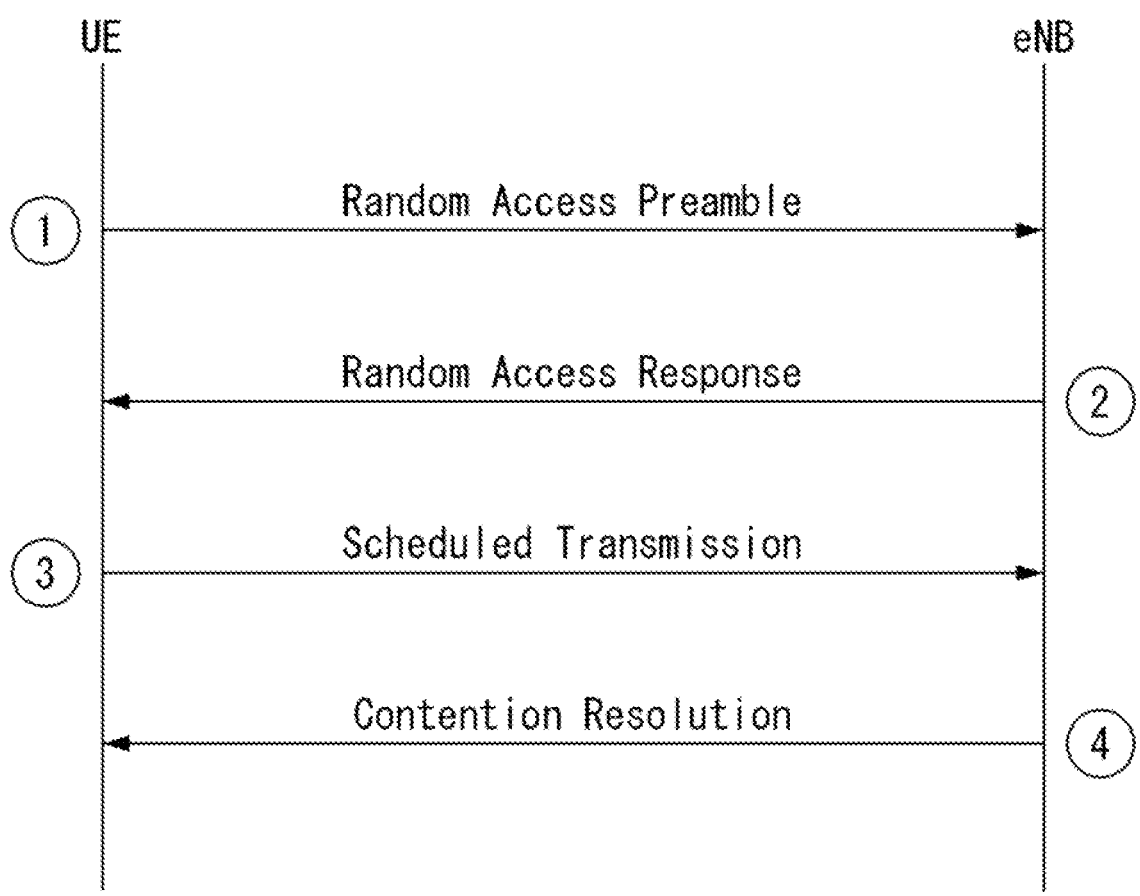
FIG. 22 shows a contention-based random access procedure.

FIG. 22 illustrates a contention-based random access procedure.

A random access preamble (may be referred to as "Msg1") is transmitted over PRACH. A UE randomly selects one random access preamble from a set of random access preambles indicated by system information or a handover command, selects a PRACH resource able to transmit the random access preamble, and transmits the same.

The physical layer random access preamble consists of a cyclic prefix of length TCP and a sequence part of length TSEQ. The parameter values are listed in Table 44 below and depend on the frame structure and the random access configuration. Higher layers control the preamble format.

TABLE 44

| Preamble format | TCP | TSEQ |
|---|---|---|
| 0 | 3168 · Ts | 24576 · Ts |
| 1 | 21024 · Ts | 24576 · Ts |
| 2 | 6240 · Ts | 2 · 24576 · Ts |
| 3 | 21024 · Ts | 2 · 24576 · Ts |
| 4 | 448 · Ts | 4096 · Ts |

Discontinuous Reception Procedure of MTC

During the general signal transmission/reception procedure of the MTC described above, the MTC terminal is in an idle state (e.g., RRC_IDLE state) and/or an inactive state (e.g., RRC_INACTIVE state) in order to reduce power consumption. In this case, the MTC terminal transitioned to the idle state and/or the inactive state may be configured to use the DRX scheme. For example, the MTC terminal that has been transitioned to the idle state and/or the inactive state may be configured to perform monitoring of the MPDCCH related to paging only in a specific subframe (or frame, slot) according to a DRX cycle configured by a base station, etc. Here, the MPDCCH related to paging may mean an MPDCCH scrambled with P-RNTI (Paging Access-RNTI).

Figure 23:
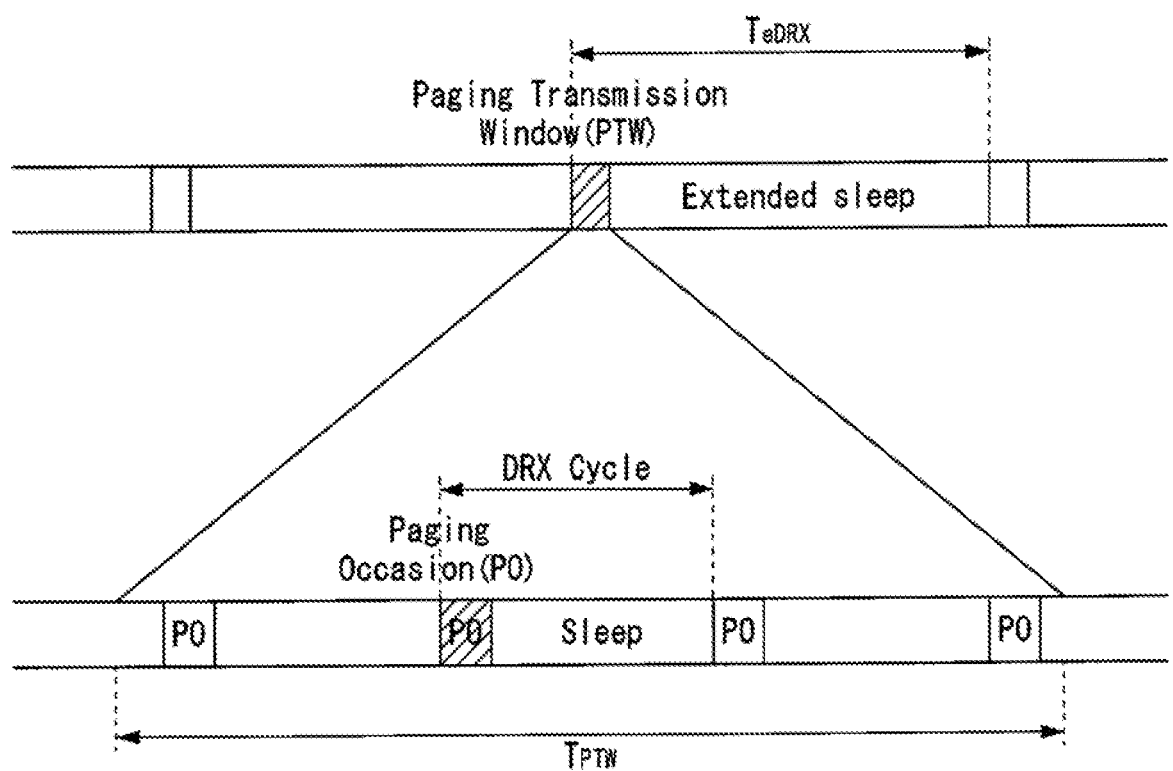
FIG. 23 shows an example of a DRX scheme in an idle state and/or an inactive state.

FIG. 23 illustrates an example of a DRX scheme in an idle state and/or an inactive state.

As shown in FIG. 23, the MTC UE in the RRC_IDLE state monitors only some subframes (SF) in relation to paging (i.e., paging opportunity, PO) within a subset of radio frames (i.e., paging frame, PF). Paging is used to trigger RRC connection and indicate a change in system information for the UE in RRC_IDLE mode.

Figure 24:
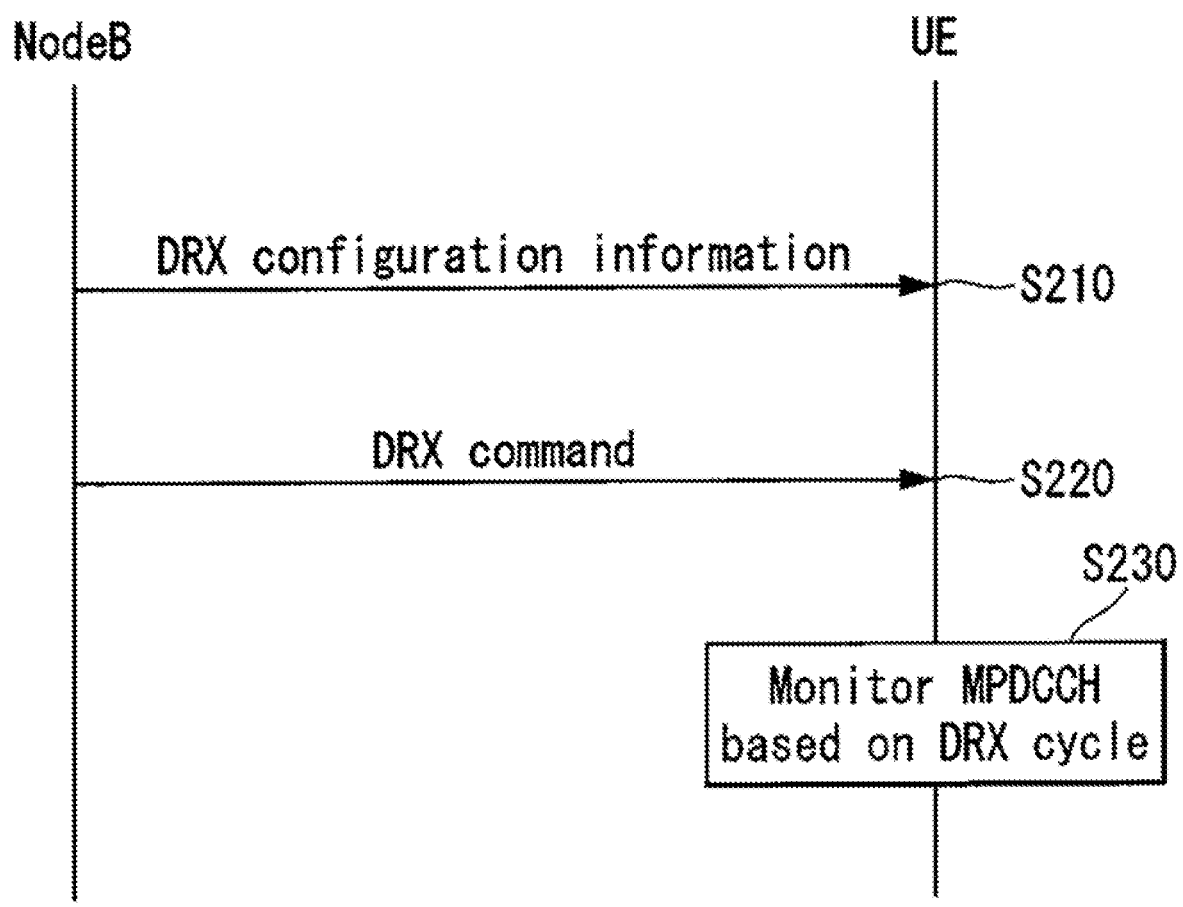
FIG. 24 shows an example of a DRX configuration and indication procedure for an MTC terminal.

In addition, DRX configuration and indication for the MTC terminal may be performed as shown in FIG. 24.

FIG. 24 illustrates an example of a DRX configuration and indication procedure for an MTC terminal. In addition, FIG. 24 is merely for convenience of description and does not limit the method proposed in the present disclosure.

Referring to FIG. 24, the MTC terminal may receive DRX configuration information from a base station (e.g., NodeB, eNodeB, eNB, gNB, etc.) (S210). In this case, the MTC terminal may receive such information from the base station through higher layer signaling (e.g., RRC signaling). Here, the DRX configuration information may include DRX cycle information, DRX offset, and configuration information for timers related to DRX.

Thereafter, the MTC terminal may receive a DRX command from the base station (S220). In this case, the UE may receive such a DRX command from the base station through higher layer signaling (e.g., MAC-CE signaling).

The MTC terminal received the above-described DRX command may monitor the MPDCCH in a specific time unit (e.g., subframe, slot) according to the DRX cycle (S230). Here, monitoring the MPDCCH may means checking whether it matches (i.e., coincides) the desired value by scrambling corresponding CRC with a predetermined specific RNTI value after decoding the MPDCCH for a specific area according to the DCI format to be received through the corresponding search space.

When the corresponding MTC terminal receives information indicating its paging ID and/or a change of system information in the MPDCCH through the procedure shown in FIG. 23 described above, the connection (e.g., RRC connection) with the base station is initialized (or re-configured), or It may be configured to receive (or acquire) new system information from the base station.

Figure 25:
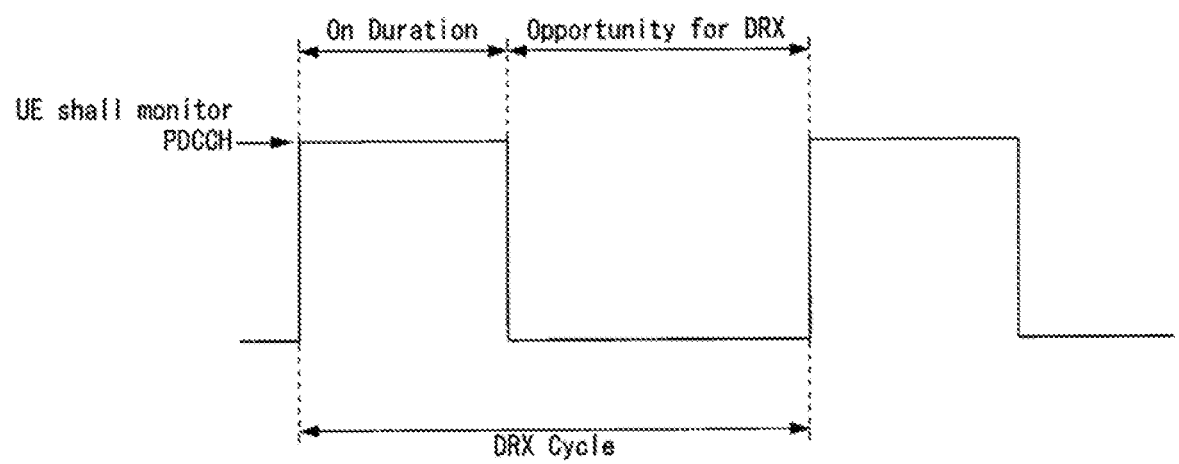
FIG. 25 shows an example of a DRX cycle.

FIG. 25 illustrates an example of a DRX cycle.

As shown in FIG. 25, the DRX Cycle specifies the periodic repetition of the On Duration followed by a possible period of inactivity. The MAC entity may be configured by RRC with a DRX functionality that controls the UE's PDCCH monitoring activity for the MAC entity's RNTIs (e.g., C-RNTI). Accordingly, the MTC UE monitors the PDCCH for a short period (e.g., On Duration), and may stop monitoring the PDCCH for a long period (e.g., Opportunity for DRX). When in RRC CONNECTED, if DRX is configured (i.e., Connected Mode DRX, CDRX), the MAC entity is allowed to monitor the PDCCH discontinuously using the DRX operation specified below. Otherwise the MAC entity monitors the PDCCH continuously. For MTC, the PDCCH may refer to the MPDCCH. For MTC, an extended DRX cycle of 10.24 s is supported in RRC Connected.

Abbreviation

Before describing the method proposed in the present disclosure, abbreviations and definitions of terms to be described later are summarized.

MIB-NB: masterinformationblock-narrowband

SIB1-NB: systeminformationblockl-narrowband

CRS: cell specific reference signal or common reference signal

ARFCN: absolute radio-frequency channel number

PRB: physical resource block

PRG: precoding resource block group

PCI: physical cell identifier

N/A: non-applicable

EARFCN: E-UTRA absolute radio frequency channel number

RRM: radio resource management

RSRP: reference signal received power

RSRQ: reference signal received quality

TBS: transport block size

TDD/FDD: time division duplex/frequency division duplex

Definition

NB-IoT: NB-IoT allows access to network services through E-UTRA with a channel bandwidth limited to 200 kHz.

NB-IoT in-band operation: NB-IoT operates in-band when using resource block(s) in a normal E-UTRA carrier.

NB-IoT guard band operation: NB-IoT operates as a guard band when using resource block(s) not used in the guard band of the E-UTRA carrier.

NB-IoT standalone operation: NB-IoT operates stand-alone when using its own spectrum. For example, the spectrum currently used by the GERAN system on behalf of one or more GSM carriers and the spectrum that is scattered for potential IoT deployments.

Anchor carrier: In NB-IoT, the carrier assumes that NPSS/NSSS/NPBCH/SIB-NB for FDD or NPSS/NSSS/NPBCH for TDD is transmitted.

Non-anchor carrier: In NB-IoT, a carrier that does not assume that NPSS/NSSS/NPBCH/SIB-NB for FDD or NPSS/NSSS/NPBCH for TDD is transmitted.

Channel raster: The smallest unit in which the terminal reads resources. In the case of the LTE system, the channel raster (channel raster) has a value of 100 kHz.

In addition, '/' described in the present disclosure can be interpreted as 'and/or', and 'A and/or B' may be interpreted as having the same meaning as 'including at least one of A or (and/or) B'.

The present disclosure provides a method for improving reception performance of an MPDCCH (MTC physical downlink control channel) of MTC (Machine Type Communication) terminal.

MPDCCH is an MTC downlink control channel based on EPDCCH (Enhanced Physical Downlink Control Channel).

Accordingly, the MTC terminal performs MPDCCH demodulation by performing channel estimation based on a demodulation reference signal (DM-RS) like the EPDCCH.

In order to improve the channel estimation performance, the LTE-MTC terminal performs time/frequency interpolation in the same way as a conventional LTE terminal, time/frequency interpolation may not be possible in terms of channel estimation performance due to the following characteristics of the DM-RS for MPDCCH demodulation.

MPDCCH DM-RS is transmitted only in PRB (Physical Resource Block) used for MPDCCH transmission.

MPDCCH format is supported that supports various ECCE (Enhanced Control Channel Element) AL (aggregation level).

The MPDCCH format supported by LTE-MTC occupies 1, 2 or 4 PRBs. There are four ECCEs in one PRB. Accordingly, in case of localized transmission of the MPDCCH format with AL<=4, the MPDCCH is transmitted in one PRB and the DM-RS is transmitted only in the PRB. That is, in PRBs other than the corresponding PRB, a DMRS for the terminal may not be expected.

MPDCCH and PDSCH multiplexing is supported between the same or different terminals within the same MPDCCH subframe.

The terminal performs blind detection (BD) for various supported MPDCCH formats.

Due to the characteristics of the MPDCCH as described above, PRB bundling is not supported within the MPDCCH subframe.

PRB bundling is a technique that allows frequency interpolation between PRBs when channel estimation of a terminal is performed, by applying the same precoding between different PRBs.

Here, a group of PRBs to which the same precoding scheme is applied is referred to as a precoding RB group (PRG).

There is a problem in that the best or theoretical channel estimation performance is not secured because time/frequency interpolation is impossible only with the MPDCCH DM-RS and the conventional technique.

The present disclosure provides, by addressing the above problems, methods for improving the MPDCCH reception performance of the MTC terminal and further improving the overall performance of the LTE-MTC terminal.

First, in order to improve the MPDCCH reception performance of an MTC terminal, the present disclosure provides a method of supporting the application of time interpolation to a channel estimation result.

In addition, the present disclosure provides a method of supporting application of frequency interpolation to a channel estimation result.

Additionally, the present disclosure provides a fallback operation for applying the time interpolation and frequency interpolation, and a method of configuring information related to a relationship between a cell-specific reference signal (CRS) and a DM-RS to a terminal.

Method of Supporting Time Interpolation

In order to improve performance through time interpolation, a method of utilizing LTE cell-specific RS (CRS) may be considered.

The CRS is transmitted in all subframes as a cell-specific reference signal.

Therefore, unlike the MPDCCH DM-RS transmitted only in the subframe/resource block (RB) in which the MPDCCH is transmitted, the terminal may always perform a channel estimation operation through the CRS if necessary.

More specifically, the terminal may perform channel estimation using the CRS before the subframe in which the MPDCCH is transmitted.

The terminal may perform time interpolation between the channel estimation result using the CRS and the channel estimation result in a subframe in which the MPDCCH is transmitted, thereby enabling noise reduction or the like.

However, since CRS is a non-precoded reference signal and MPDCCH DM-RS is a precoded reference signal, applying time interpolation may not be possible between the channel estimation result using CRS and the channel estimation result using MPDCCH DM-RS.

Hereinafter, a CRS to which precoding is not applied may be referred to as 'non-precoded CRS', and a DM-RS to which precoding is applied may be referred to as 'precoded DM-RS'.

With reference to FIG. 26, the meanings of 'non-precoded CRS' and 'precoded DM-RS' will be described in detail.

FIG. 26 is a diagram illustrating an example in which precoding is performed according to an embodiment of the present disclosure.

FIG. 26(a) shows an example of performing precoding when a CRS is transmitted.

Modulated symbol(s) 2612 corresponding to one or two transport blocks 2611 are mapped to $N_L$ layers.

Precoding is performed by applying a precoding matrix W 2613 to the layers.

Thereafter, a CRS is added to each of the modulation symbols to which the precoding is applied and mapped to an antenna port.

That is, the CRS is mapped to an antenna port in addition to the modulation symbol to which the precoding has been applied, and precoding is not applied to the CRS.

Accordingly, the CRS may be expressed as a 'non-precoded CRS' to which precoding is not applied.

When the terminal performs channel estimation through the CRS, the channel estimation reflects a channel of each antenna port that does not include precoding. Therefore, the terminal must explicitly receive information on precoding applied to the transmitter.

In FIG. 26(b), an example of performing precoding according to a case in which a DM-RS is transmitted is shown.

$N_L$ modulated symbol(s) 2262 corresponding to one or two transport blocks 2621 are mapped to $N_L$ layers.

Thereafter, a DM-RS is added to each of the modulation symbols, and a precoding matrix W 2623 is applied to the modulation symbol to which the DM-RS is added to perform precoding.

That is, since the DM-RS is added to the modulation symbol, precoding is applied together with the modulation symbol (data), and then mapped to an antenna port, precoding is applied directly to the DM-RS.

Accordingly, the DM-RS may be expressed as a 'precoded DM-RS' to which precoding is applied.

When the terminal performs channel estimation through the DM-RS, the channel estimation reflects a channel of each antenna port including precoding. Therefore, the terminal does not need to receive information on precoding applied to the transmitter.

Returning to the time interpolation supporting method again, the present disclosure includes a method for applying time interpolation between channel estimation results, and provides a method of performing channel estimation using only CRS (Method 1), or a method of performing channel estimation using both CRS and MPDCCH DMRS (Method 2).

First, a method of performing channel estimation using only CRS (Proposal 1) will be described.

Method of Performing Channel Estimation Using Only CRS (Method 1)

As described above, since non-precoded CRS and precoded DM-RS by themselves may not improve channel estimation performance through time interpolation, the present method proposes a method of performing channel estimation using only CRS.

However, since the number of resource elements (REs) used for channel estimation is smaller than a method in which both the CRS and the MPDCCH DM-RS are used for channel estimation of the terminal, MPDDCH reception performance may be degraded.

In addition, in the case of a subframe in which the UE may not expect CRS transmission, for example, a Multicast Broadcast Single Frequency Network (MBSFN) subframe, only the CRS of the LTE control region may be relied on.

That is, since the CRS is transmitted only in the LTE control region in the MBSFN subframe, the UE may use only the CRS in the LTE control region of the MBSFN subframe for channel estimation.

However, exceptionally, for the LTE-MTC terminal, the CRS may be configured to be transmitted in the MBSFN region in the MBSFN subframe, that is, in the remaining regions except for the LTE control region in the MBSFN subframe.

Method for performing channel estimation using both CRS and MPDCCH DM-RS (Method 2)

As mentioned above, the non-precoded CRS and precoded DM-RS by themselves may not improve channel estimation performance through time interpolation.

Therefore, the present method proposes methods that allows channel estimation through time interpolation between the CRS and the DM-RS.

(Proposal 1) Transmitting MPDCCH DMRS in a non-precoded manner

In this case, since both the DM-RS and the CRS are non-precoded, time interpolation and averaging may be applied between the channel estimation result using the DM-RS and the channel estimation result using the CRS, and noise may be reduced.

However, since the present method may not apply precoding to the DM-RS antenna port(s), there is a disadvantage of limiting the flexibility of the base station (eNB).

(Proposal 2) Apply the same precoding of MPDCCH DM-RS to CRS

The present proposal applies the same precoding to the CRS and the MPDCCH DM-RS, allowing the CRS and the DMRS to experience the same effective channel.

Through the above method, noise reduction through time interpolation and averaging between each channel estimation result using CRS and MPDCCH DM-RS may be possible.

The effective channel may be expressed as $Hv^H$, where H is a channel matrix, v is a precoding matrix, and $^H$ indicated by a superscript is a Hermitian operator.

Existing terminals in the LTE system expect to receive non-precoded CRS.

Therefore, when the precoded CRS according to the present proposal is transmitted, an existing legacy LTE terminal that performs channel estimation or measurement using a narrowband (NB) region may be impacted.

In order to minimize the impact on the existing legacy LTE terminal or the like, a configuration or indication that allows the legacy LTE terminal to exclude the corresponding region from channel estimation or measurement may be additionally required.

For example, when a method of transmitting a precoded CRS is applied to improve MPDCCH reception performance, a subframe or slot to which the precoded CRS is applied may be designated, to the terminal, as an invalid subframe or an invalid slot.

The legacy eMTC terminal or the legacy LTE terminal may not use a CRS of a corresponding invalid subframe or invalid slot for channel estimation or measurement.

The information (hereinafter, invalid period information) on the invalid subframe or the invalid slot may be in the form of a bitmap in units of subframes or slots for a specific period (e.g., 10 ms, etc.).

In addition, the invalid period information may be configured by a higher layer to be cell-specific or UE-specific, or may be dynamically indicated to the terminal through downlink control information (DCI).

(Proposal 3) Applying fixed precoding to MPDCCH DM-RS

The present proposal is, by applying to the MPDCCH DM-RS a fixed precoding that may be known to the UE, a method in which the UE performs channel estimation using fixed precoding (known to the UE) information in the receiver.

Let the signal received by the terminal when the reference signal passing through the channel be y, the following equation is satisfied.

$$y = Hv^H x \qquad \text{[Equation 21]}$$

In the above equation, H denotes a channel matrix, x denotes an MPDCCH DM-RS, v denotes a precoding matrix (known to the terminal), and a superscript $^H$ denotes Hermitian operator.

In the present proposal, a terminal may separate H using information on a precoding matrix known to the UE, by the following operation.

$(Hv^H)v = H$, In other words, H may be separated by multiplying $Hv^H$ by the precoding matrix v known to the terminal.

As described above, the terminal may increase channel estimation accuracy by time interpolating or averaging the channel matrix information through the MPDCCH DM-RS and H information through the CRS.

The fixed pre-coding known to the UE may be configured to have a fixed value.

(Proposal 4) Indicating to terminal after applying codebook-based precoding

The conventional MPDCCH DM-RS follows a precoding scheme that is not based on a codebook (non-codebook based) or that is transparent to a terminal.

In this case, the terminal has no way of separating the channel matrix from the effective channel.

The effective channel may be expressed as $Hv^H$, where H is a channel matrix, v is a precoding matrix, and a superscript $^H$ is Hermitian operator.

Therefore, since the channel matrix H may not be separated from the DM-RS, interpolation and averaging with the channel matrix H estimated through the CRS is impossible.

In order to separate the channel matrix H through the DM-RS and allowing interpolation and averaging with the channel matrix H estimated through the CRS, the present proposal proposes a method of applying codebook-based precoding on the MPDCCH DM-RS and signaling the applied codebook information to a terminal.

The codebook information may be signaled to the terminal in the form of a codebook index.

In order to support the method provided in the present proposal, the following operation is proposed depending on the number of CRS ports.

Case 1) the number of CRS ports is 1

MPDCCH DM-RS may be transmitted using the same port as the CRS (e.g., port 0).

Case 2) the number of CRS ports is 2

2-port and layer 1 codebook (PMI (Precoding Matrix Indicator) set) for MPDCCH DM-RS precoding may be defined.

For example, the codebook for 2 antenna ports may be a codebook defined for spatial multiplexing using 2-port CRS in LTE.

The base station may select and apply the precoding defined in the codebook, and then indicate codebook information to the terminal. The codebook information may be in the form of a codebook index.

Case 3) the number of CRS ports is 4

4-port and layer 1 codebook (PMI set) for MPDCCH DM-RS precoding may be defined.

For example, the codebook for 4 antenna ports may be a codebook defined for spatial multiplexing using 4-port CRS in LTE.

Alternatively, it may be a codebook for 4 antenna ports defined for PMI feedback using a Channel State Information-Reference Signal (CSI-RS).

The base station may select and apply the precoding defined in the codebook, and then indicate codebook information to the terminal. The codebook information may be in the form of a codebook index.

The codebook for MPDCCH DM-RS precoding may be configured as a set or subset to be orthogonal for each MPDCCH DM-RS port.

More specifically, based on the codebook defined for spatial multiplexing using LTE CRS or PMI feedback using CSI-RS in the above examples, a set or subset may be configured and used to have an orthogonal relationship for each DM-RS port.

Power allocation or power boosting may be applied to the fixed precoding or codebook-based precoding methods.

Here, the base station may have to additionally define information related to the power allocation or power boosting and transmit to the terminal.

The information may be related to the relationship between the DM-RS and the CRS, the information may be expressed as DM-RS to CRS power ratio (DMRS-to-CRS power ratio) information or power offset information between the DM-RS and the CRS.

In addition, the DMRS-to-CRS power ratio information or power offset information between the DM-RS and the CRS may be information on a terminal in an idle mode. That is, the DMRS-to-CRS power ratio may be for a terminal in an idle state, and a power offset between the DM-RS and a CRS may be for a terminal in an idle state.

In the case of the MPDCCH DM-RS precoding determination method based on a CSI report from the terminal, the power allocation or power boosting may be applied in a way of improving downlink transmission efficiency in terms of a system, or increasing or decreasing the power for each terminal or for all terminals in order to secure SNR that allows a specific terminal to receive.

For the power allocation or boosting, MCS (Modulation Coding Scheme) information of the CSI report may be referred to.

When precoding is applied to the MPDCCH in a manner in which power is differently distributed for each port after precoding is applied, that is, when output power is different for each port, DM-RS power information is transmitted for each port.

The DM-RS power information may be information such as a DMRS-to-CRS power ratio for each port.

In LTE MTC, the base station may transmit the MPDCCH to a plurality of different LTE MTC terminals for each layer through downlink Multi User-Multi Input Multi Output (MU-MIMO).

Here, the MPDCCH DM-RS power may decrease depending on the number of terminals receiving the MPDCCH simultaneously transmitted on the same time/frequency resource by the base station through downlink MU-MIMO.

For example, when transmitting to two terminals each in a single layer, MPDCCH DMRS power transmitted to each terminal may be reduced by 3 dB. Alternatively, in the case of four terminals each in single-layer, it may be reduced by 6 dB.

Here, the LTE MTC terminal has no problem in receiving the PDSCH or MPMDCCH using only the DM-RS that is not based on the codebook, but the DM-RS power is attenuated compared to the CRS, so that the channel estimation or the like simultaneously using CRS and DM-RS may not be allowed.

In order for the UE to use the CRS together with the MPDCCH DM-RS to improve the MPDCCH reception performance even when the power of the MPDCCH DM-RS compared to the CRS decreases due to the downlink MU-MIMO transmission of the base station, the base station may transmit information for inferring the power change according to the downlink MU-MIMO to the terminal.

The information for inferring the power change according to the MU-MIMO (power change inferring information) may include the number of streams/layers/ports simultaneously transmitted by the base station through MU-MIMO and transmission rank information in consideration of a downlink MU-MIMO transmission channel.

The base station may indicate information for inferring the power change according to the MU-MIMO to the terminal through RRC signaling, or through medium access control (MAC) signaling in order to more quickly adapt to changes in the number of users and access environment.

Alternatively, the base station may transmit information for inferring the power change according to the MU-MIMO through DCI, so that the corresponding information may be dynamically indicated to the terminal in a scheduling unit or in a repetition unit.

In the case of information for inferring the power change according to the MU-MIMO is transmitted through DCI, there is an advantage in terms of fast adaptation.

However, since the UE may not know the exact power ratio between the CRS and the MPDCCH DM-RS until receiving the information for inferring power change, there is a disadvantage in that, only after receiving the DCI using only the MPDCCH DM-RS, CRS may be additionally used utilizing the corresponding information.

Therefore, the information for inferring power change transmitted through DCI may be applied during a specific period (e.g., N-subframe period) from a subframe in which DCI is transmitted (e.g., subframe n) or from a specific time point thereafter (e.g., subframe n+k).

The value N may be configured to the UE by a higher layer as a tradeoff between dynamic adaptation and CRS utilization extent.

The UE may update MPDCCH DM-RS power information according to downlink MU-MIMO transmission, by receiving update information through DCI within N-subframe period.

Figure 27:
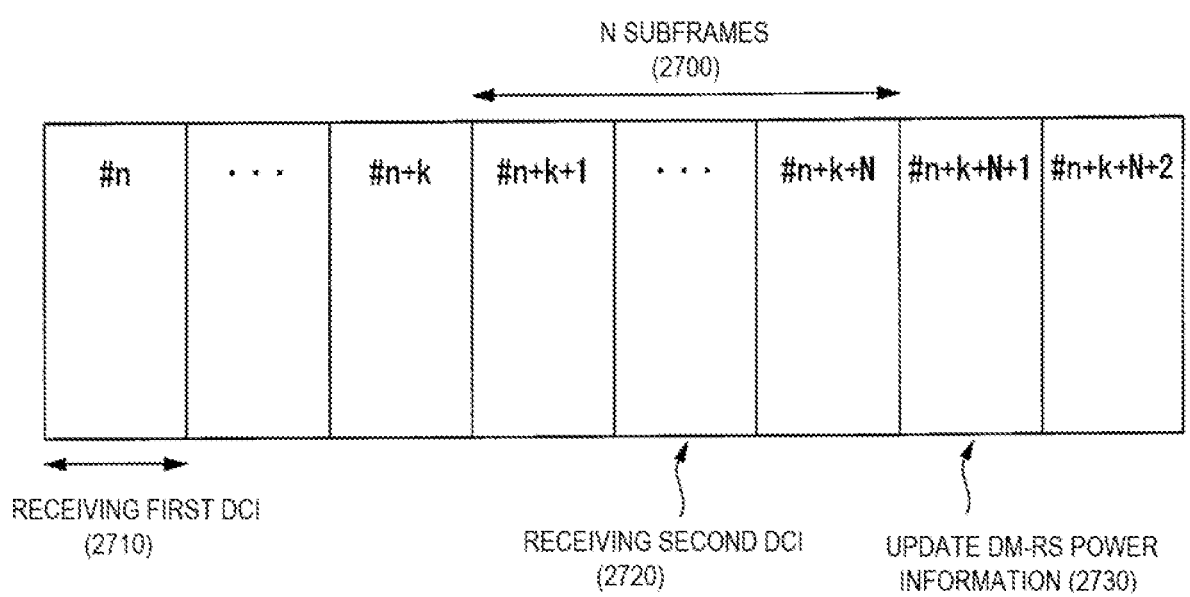
FIG. 27 illustrates an example in which the terminal receives power change inferring information through DCI and performs an operation of updating information according to an embodiment of the present disclosure.

FIG. 27 shows an example in which a terminal receives power change inferring information and updates information through DCI.

In FIG. 27, #n to #n+k+N+2 correspond to subframe indexes. The terminal may receive 2710 the DCI including the power change inferring information in the subframe #n.

From #n+k subframe which is k subframes thereafter, the terminal may apply the power change inferring information during a period 2700 for a specific N-subframe period.

The terminal may receive 2720 the second DCI including the power change inferring information updated in the specific N-subframe period, and in the #n+k+N+1 subframe, the terminal may update 2730 DM-RS power information based on the updated power change inferring information included in the second DCI.

(Proposal 5) Cycling all or part of the precoding matrix set included in the MPDCCH DM-RS codebook The present proposal provides a method of cycling within the entire set of precoding matrices defined in the MPDCCH DM-RS codebook or within a predetermined part.

More specifically, in order to obtain a spatial diversity gain in a situation in which PMI feedback is not configured or is impossible, a method of cycling within all or part of the precoding matrix set defined in the MPDCCH DMRS codebook is proposed.

The above mentioned part may be, for example, a subset of the precoding matrix defined in the codebook.

The information on the type of the cycling precoding matrix and the order of cycling may be predefined and fixed values, may be configured by a higher layer, or may be indicated by DCI.

The cycling may be a time direction or a frequency direction.

When the direction in which the precoding matrix defined in the codebook cycles is the time direction, the unit in which the precoding matrix included in the codebook cycles is one or more OFDM symbol units, or a slot/sub-slot unit. The sub-slot may be composed of a predefined plurality of symbols.

In addition, the precoding matrix may be cycled in units of subframes, in units of transmission time intervals (TTIs), or in units of multiple subframes that are RRC configured or predefined.

When the direction in which the precoding matrix defined in the codebook cycles is the frequency direction, the unit in which the precoding matrix included in the codebook cycles may be a resource element (RE) level, or a resource block (RB) level.

In addition, a precoding matrix defined in the codebook may be cycled according to a plurality of RB-levels, RB group (RBG) levels, or narrow band (NB) levels that are configured in RRC or predefined.

Hereinafter, the precoding matrix may be expressed as a precoder.

Precoder cycling may be held for a certain period preconfigured by a higher layer within the MPDCCH repetition period, and when frequency hopping is applied, it may be held within the frequency hopping period.

In this case, when the frequency hopping period or interval is referred to as N consecutive downlink subframes, the UE may assume that the same precoder is used during N consecutive downlink subframes in which MPDCCH may be transmitted.

The value N may be a cell-specifically RRC configured value and/or a RRC configured value for each CE (Coverage Enhancement) mode (or CE level).

In addition, when the index of the first subframe of each block consisting of N consecutive downlink subframes is n1, n1 may be a value that satisfies (n1+offset) mod N=0.

In order to facilitate multiple user multiplexing, the base station may make the start subframe of the precoder cycling unit have the same value for all terminals in the cell.

In this case, the offset value may be a cell specific value.

When the precoder cycling unit is a frequency hopping period or interval, the precoder cycling may be applied only when frequency hopping is turned on.

Alternatively, even when frequency hopping is turned off, for the purpose of obtaining an averaging gain during channel estimation or the like, precoder cycling may performed in units of the N consecutive downlink subframes, or the same precoder may be maintained.

In addition, the precoder cycling may be cycled in units of REs constituting an EREG (Enhanced Resource Element Group) within an EREG similar to port cycling of LTE MTC.

In this case, there is an effect of obtaining a spatial diversity gain within the EREG.

Figure 28:
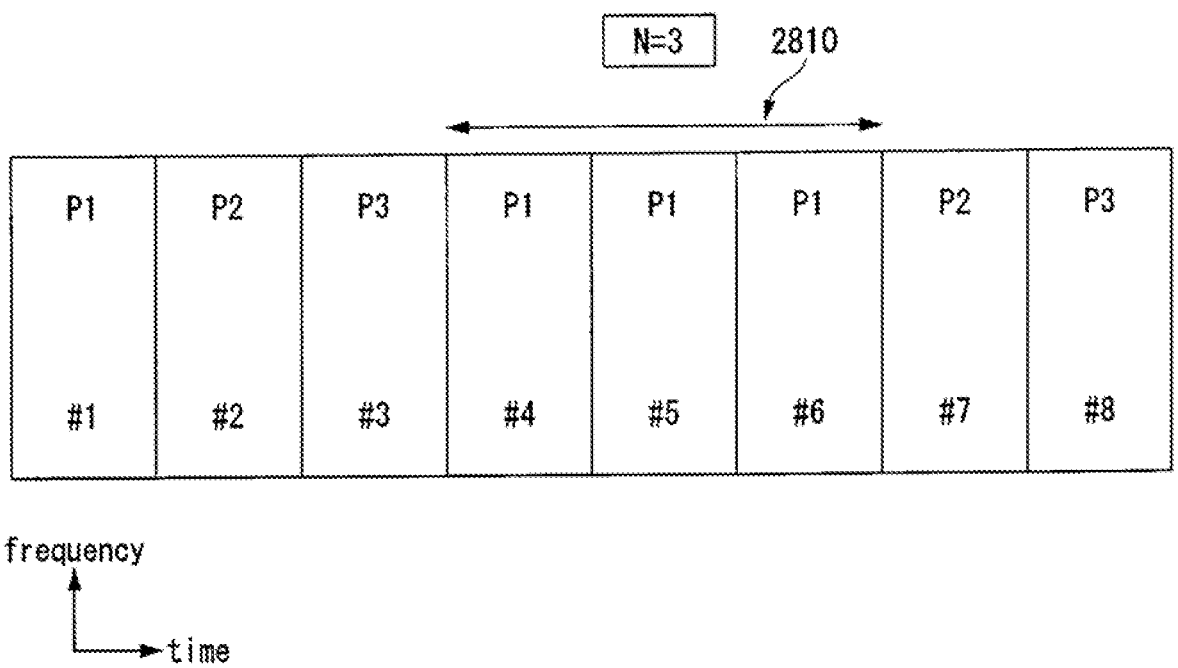
FIG. 28 is a diagram illustrating an example of a case in which precoder cycling is held in an MPDCCH repetition period or a frequency hopping period according to an embodiment of the present disclosure.

FIG. 28 is a diagram illustrating an example of a case in which a precoder cycling is held in an MPDCCH repetition period or a frequency hopping period.

In FIG. 28, the MPDCCH repetition period or frequency hopping application period is 3 consecutive downlink subframes.

1 to #8 denote subframe indices, and 2810 may be an MPDCCH repetition period or a frequency hopping application period.

Precoders P1, P2, and P3 are defined in the codebook, and the precoder cycles in the time direction in the order of P1→P2→P3→P1 in subframe units on time frequency resources.

Here, in the MPDCCH repetition period or frequency hopping application period 2810, the UE may assume that the same precoder P1 is used for 3 downlink subframes 2810.

When the precoder cycling is performed in the frequency direction, the precoder cycling unit (or granularity) may be a minimum of configuration units of the MPDCCH PRB set or a greatest common denominator of the configuration units of the MPDCCH PRB set.

When the precoder cycling in the frequency direction is applied to the MPDCCH DM-RS, based on the MPDCCH PRB set being composed of 2, 4 or 6 PRBs, the precoder cycling unit (or granularity) may be configured as the minimum or the greatest common denominator of the configuration units of the MPDCCH PRB set.

For example, when the MPDCCH PRB set is composed of 2, 4, or 6 PRBs, a precoder cycling unit (or granularity) may be composed of 2 PRBs.

That is, since the minimum unit of 2, 4 or 6, which is the configuration unit of the MPDCCH PRB set, is 2, and the greatest common denominator of 2, 4 or 6 is also 2, the precoder cycling unit may configured as 2 PRBs.

The PRB bundling effect may be obtained by configuring the precoder cycling unit (or granularity) as the minimum or greatest common denominator of configuration units of the MPDCCH PRB set.

In addition, by performing a frequent precoder cycling, a frequency diversity effect may be obtained.

In the case of the precoder cycling in the frequency direction, the precoder cycling unit (or granularity) may be determined differently depending on the MPDCCH transmission type.

MPDCCH transmission types include localized transmission and distributed transmission.

Even when the precoder cycling is applied to the MPDCCH DM-RS, the precoder cycling unit (or granularity) may be determined differently according to the MPDCCH transmission type (localized/distributed).

The precoder cycling unit may be determined differently through RRC signaling for configuring the MPDCCH transmission type.

For example, in the case of localized MPDCCH transmission, the precoder cycling unit may be configured as a minimum or a greatest common denominator of configuration units of MPDCCH PRB set. Alternatively, in the case of distributed MPDCCH transmission, a precoder cycling unit may be configured as 1 PRB.

In the case of distributed MPDCCH transmission, PRBs included in the MPDCCH PRB set may be non-contiguous in a frequency dimension.

That is, the RB indices included in the MPDCCH PRB set may be non-contiguous, and a PRB bundling effect may be difficult to be expected.

In this case, in order to maximize the frequency diversity effect based on the precoder cycling, the precoder cycling unit may be configured as 1 PRB when applying the precoder cycling as described above.

Precoder cycling may be performed not for all time/frequency domain units.

In other words, the precoder cycling operation may be performed only for specific part of time/frequency dimension units.

The counter for increasing the precoder index may be counting only in a specific part of the time/frequency dimension unit.

Here, the specific part of the time-frequency dimension unit may be, in terms of a base station, a time/frequency dimension unit in which the base station may actually transmit or be allowed to transmit an MPDCCH for a specific terminal.

In addition, in terms of a terminal, it may be a time frequency dimension unit in which the corresponding terminal may expect MPDCCH reception.

Time-frequency dimension units may be, in frequency dimension, RE (or subcarrier), RB, minimum or greatest common denominator of configuration units of MPDCCH PRB set, PRG (when PRB bundling is supported), NB (e.g., 6 RB), or the like.

In the time dimension, it may be an OFDM symbol, a sub-slot, a slot, a subframe, a TTI, a frequency hopping period, or the like.

More specifically, in case of the time dimension, the precoder cycling operation may be performed only for subframes in which the base station is allowed to transmit an MPDCCH or only for subframes in which the terminal may expect MPDCCH reception.

In addition, in case of the frequency dimension, the precoder cycling operation may be performed only for an RB in which the base station is allowed to transmit an MPDCCH or only for an RB in which the terminal may expect MPDCCH reception.

For example, the precoder cycling operation may be performed only for PRB(s) included in the MPDCCH PRB set, or the precoder cycling operation may be performed only for PRB(s) in which the UE actually expects to receive MPDCCH among PRB(s) included in the the MPDCCH PRB set.

The reason that the precoder cycling is performed only for specific part of time/frequency dimension units as above is to obtain a time/frequency diversity effect, even when the number of precoders (Np) in the precoder set for precoder cycling is insufficient.

More specifically, a case of precoder cycling in the frequency direction illustrated in FIG. 29 will be described as an example.

Figure 29:
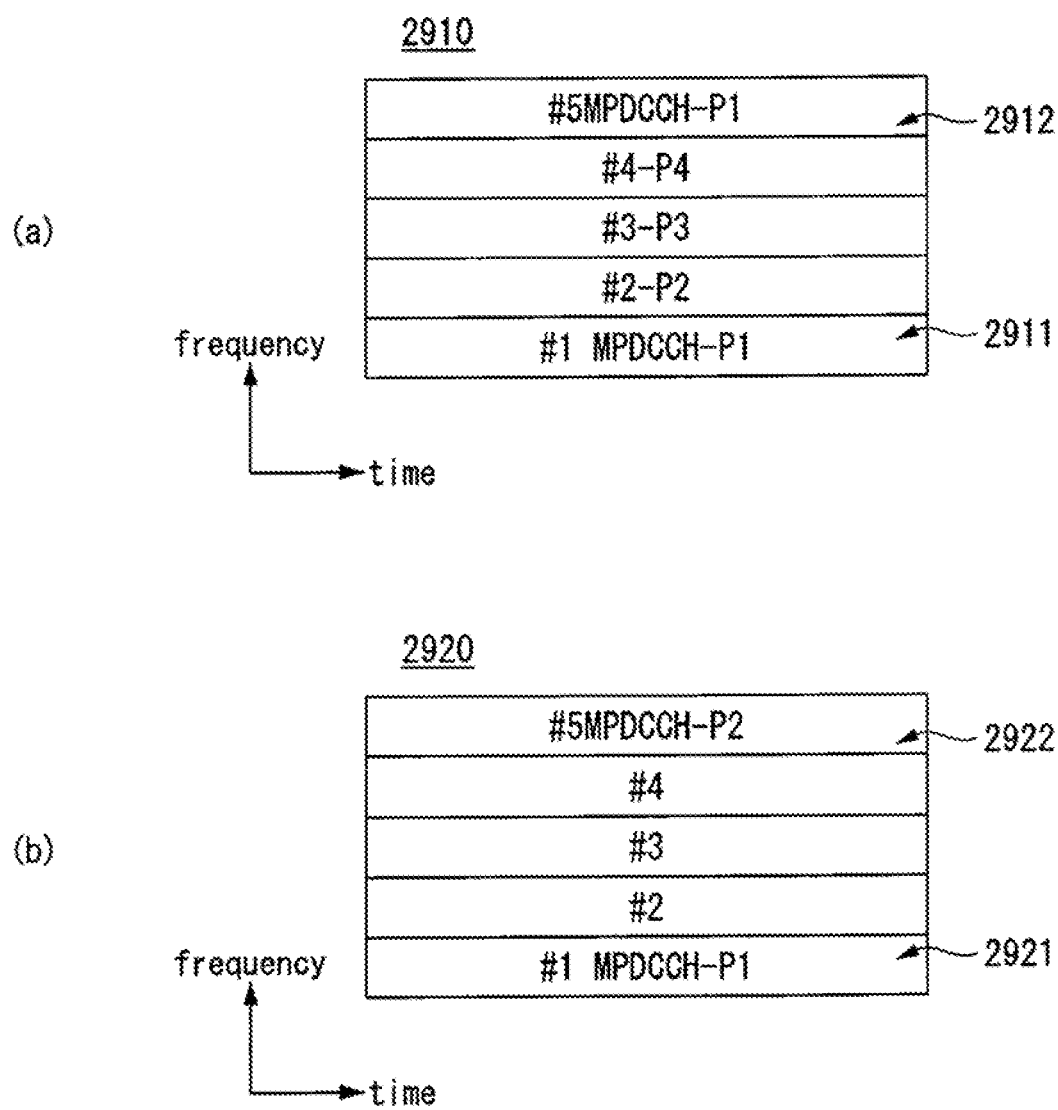
FIG. 29 is a diagram illustrating an example in which a precoder cycling operation is performed in a frequency direction according to an embodiment of the present disclosure.

FIG. 29 is a diagram illustrating an example in which a precoder cycling operation is performed in a frequency direction.

In FIG. 29, a precoder cycling is performed in RB units within a set including 4 precoders (Np=4), and an MPDCCH PRB set includes 2 PRBs, and the PRB indexes included in the MPDCCH PRB correspond to 1 and 5.

In the example of FIG. 29, MPDCCH transmission corresponds to distributed MPDCCH transmission.

As shown in FIG. 29(a), when precoder cycling is performed regardless of whether or not MPDCCH is transmitted, 2 PRBs included in the MPDCCH PRB set use the same precoder P1 even though precoder cycling is intended (2911, 2912).

On the other hand, as shown in FIG. 29(b), according to the method of performing precoder cycling only for a specific part of time/frequency dimension unit, precoder index 1 is applied to PRB index 1, precoder index 2 is applied to PRB index 5, and the intended precoder cycling is achieved (2921, 2922).

Hereinafter, rules for operation in which precoder cycling is performed in time/frequency dimensions units will be described in more detail.

The precoder cycling in the frequency direction sequentially increases or decreases the precoder index in the order of increasing or decreasing of the frequency dimension unit.

For example, when the precoder index is 0 in the RB having the index 1 on the frequency dimension, the precoder index may be 1 in the RB having the index 2.

Here, the precoder index may increase or decrease for a unit on a frequency dimension, or may increase or decrease only for a specific part of time/frequency unit.

The specific part of time/frequency unit may be an RB or the like through which the MPDCCH is actually transmitted.

The precoder cycling in the time direction sequentially increases or decreases the precoder index in the order of increasing of time dimension units. For example, when the precoder index is 0 in subframe #1, the precoder index may be 1 in subframe #2.

Here, the precoder index may increase or decrease for all time dimension units, or may increase or decrease only for specific part of time/frequency dimension units.

The specific part of the time/frequency unit may be a subframe or the like in which the MPDCCH is actually transmitted.

In the precoder cycling in time/frequency dimension units, a precoder index value calculated according to the index increase/decrease rule may exceed, as a result of precoder cycling, the number of precoders Np in the precoder set.

In this case, the value after applying the modular operation (i.e., mod Np) is used as the precoder index value.

For example, when the number of precoders in the precoder set is 3 and the precoder cycling is performed four times, the precoder index value in the fourth cycle of the precoder may be 1, which is a result of the 4 mod 3 operation.

When the precoder cycling is applied simultaneously in the time and frequency directions, a certain offset may be applied to the precoder index whenever the unit (subframe, slot, etc.) on the time dimension increases.

In this case, the offset may be added to all precoder indexes belonging to a corresponding time dimension unit. In addition, the offset may be a value accumulated and added according to an increase in the time dimension unit.

The offset may be added to all time dimension units, or may be added only when there is a target to which an actual precoder is applied, as in the previously proposed method.

For example, it may be applied only to a specific/partial unit on the time dimension in which the MPDCCH is transmitted.

The precoder index value calculated by the above rule may exceed the number of precoders (Np) in the precoder set in which precoder cycling is performed.

In this case, the value after applying the modulo operation (i.e., mod Np) is used as the precoder index value.

The above description will be described in more detail with reference to FIG. 30.

Figure 30:
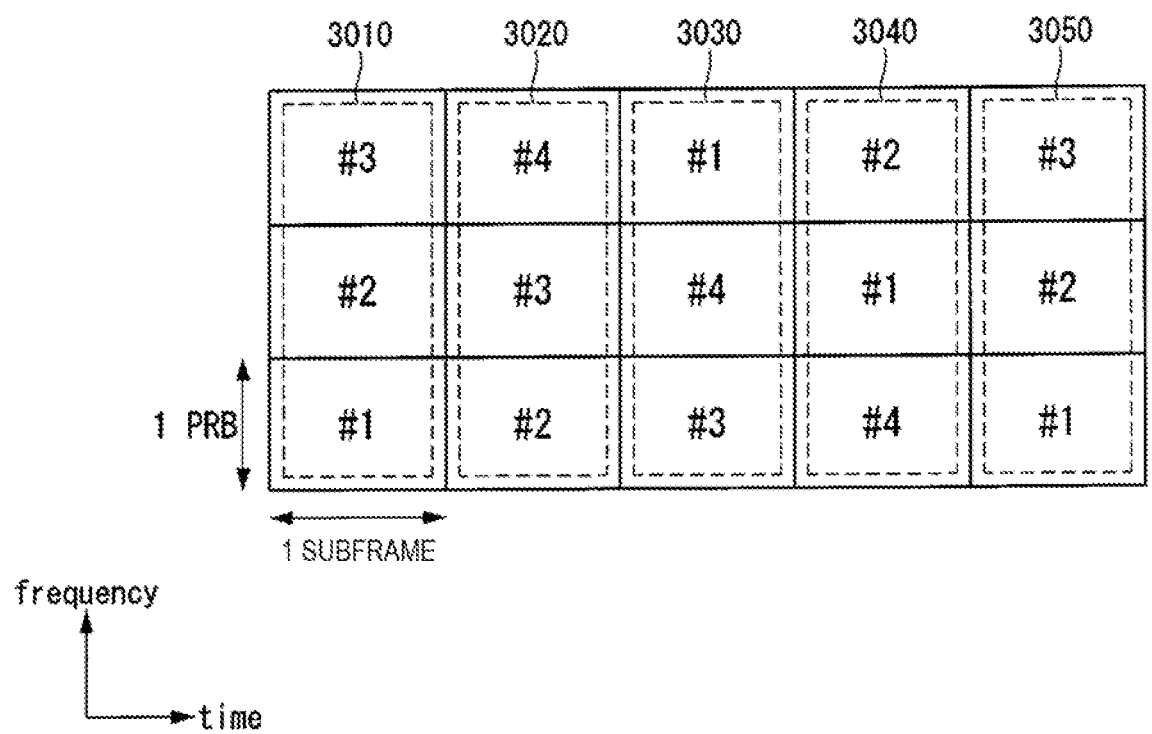
FIG. 30 is a diagram illustrating an example of an operation in which precoder cycling is performed simultaneously in a time/frequency direction in a time/frequency dimension according to an embodiment of the present disclosure.

FIG. 30 is a diagram illustrating an example of an operation in which precoder cycling is performed simultaneously in a time/frequency direction in a time/frequency dimension according to an embodiment of the present disclosure.

In FIG. 30, a precoder set includes 4 precoders, an offset is 1, and 3 PRBs are included in one MPDCCH PRB set.

In FIG. 30, #1 to #4 denote a precoder indices, one column on the horizontal axis corresponds to one subframe, and one row on the vertical axis corresponds to one PRB.

In the first subframe 3010, a precoder cycling is performed in the frequency direction, and the precoder index increases in the y-axis direction, so that the precoders of indexes #1, #2, and #3 are applied.

In the second subframe 3020, an offset of 1 is added to the precoder belonging to the time dimension unit, and as a result, the precoder index increases in the y-axis direction, so that the precoder of indexes #2, #3, and #4 are applied.

In the third subframe 3030, an offset of 1 is added by 1 to the precoder belonging to the time dimension unit, and as a result, the precoder index increases in the y-axis direction, so that the precoder of indexes #3, #4, and #5 are applied. Here, for the index #5, 5 mod 4 operation is applied, and the index #1 is applied. Finally, in the third subframe, indexes #3, #4, and #1 are applied.

In the fourth subframe 3040, an offset of 1 is added to the precoder belonging to the time dimension unit, and as a result, the precoder index increases in the y-axis direction, so that the precoder of the index #4, #5, and #2 are applied. Here, for the index #5, 5 mod 4 operation is applied, and the index #1 is applied. Finally, in the fourth subframe, indexes #4, #1, and #2 are applied.

In the fifth subframe 3050, an offset of 1 is added to the precoder belonging to the time dimension unit, and as a result, the precoder index increases in the y-axis direction, so that the precoder of the index #5, #2, and #3 are applied. Here, for the index #5, 5 mod 4 operation is applied, respectively, and index #1 is applied. Finally, in the fifth subframe, indexes #1, #2, and #3 are applied.

As above, precoder cycling may be performed in both the frequency direction and the time direction.

As described above, precoder cycling may operate in the direction of increasing or decreasing a precoder index (or PMI index) within a precoder set (or PMI table including a plurality of PMIs) configured by a higher layer or predefined.

As another example, based on precoder A (or PMI A) and precoder B (or PMI B) that are configured by a higher layer or predefined, precoder B (or PMI) B) may be sequentially multiplied or divided with respect to precoder A (or PMI A) and by a period of increasing or decreasing the precoder index (or PMI index).

For example, in the case of a frequency direction precoder cycling, precoder A may be applied in the first frequency unit in which the precoder cycling is performed, precoder A x precoder B may be applied in the second frequency unit, and precoder A x (precoder B)2 may be applied in the third frequency unit.

In addition, the number of times precoder B is multiplied may be limited to a specific value.

In the latter case, precoder A (or PMI A) and precoder B (or PMI B) may be configured in the form of a PMI table, respectively.

For example, the precoder A (or PMI A) and precoder B (or PMI B) may be referred to as base PMI and delta PMI, respectively.

The method for performing channel estimation by the terminal using both the CRS and the MPDCCH DM-RS described above may be selected differently according to the LTE-MTC operation mode.

For example, when the terminal operates in the LTE in-band mode, in order to minimize the impact on the existing LTE or LTE MTC terminal, the base station may use the CRS as it is, and may apply a non-precoded method, or a codebook-based precoding method, or a precoder cycling method to transmit the MPDCCH DM-RS.

Alternatively, when the MTC terminal operates in the standalone mode, a method (precoded CRS transmission method) of applying the same precoding of the MPDCCH DMRS to the CRS may be applied alone, in order to perform beamforming optimized for the operation of the standalone MTC terminal.

Alternatively, in addition to a method of transmitting the MPDCCH DM-RS in a non-precoded method or in a codebook-based precoding method, or in a precoder circulation method, a method of applying the same precoding of the MPDCCH DMRS may be applied to the CRS.

Selection of the two methods of the LTE in-band mode operation method or the standalone mode operation method may be automatically selected by the MTC operation mode.

Alternatively, in order to provide additional flexibility, it may be selectively applied based on configuration (through higher layer configuration) by the base station (eNB), or based on whether or not the terminal shares resources such as subframe or NB or the like with a legacy terminal (MTC or non-BL UE in CE mode or LTE).

For both of the above operations, the UE may assume that the DM-RS and the CRS are transmitted through the same antenna port.

However, the terminal may recognize the method selected by the base station by referring to the MTC operation mode or by referring to configured higher layer parameters, and additionally perform above described detailed operation for the selected method.

The detailed operation refers to a method of applying the same precoding of the MPDCCH DMRS to the CRS or the like, in addition to a method of transmitting the MPDCCH DM-RS in a non-precoded method, or a codebook-based precoding method, or a precoder cycling method.

The base station may transmit information for configuring the precoding and port relationship between the MPDCCH DM-RS and the CRS to terminals through broadcast signaling.

The broadcast signaling may include a master information block (MIB), a system information block (SIB), a system information (SI) message, or the like.

The information for configuring the precoding and port relationship between the MPDCCH DM-RS and the CRS may be included in a 1-bit flag of a broadcast message.

The information for configuring the precoding and port relationship between the MPDCCH DM-RS and the CRS may be referred to as DM-RS/CRS relationship information.

Here, the UE receives an MPDCCH by selecting a method among methods of MPDCCH DM-RS and/or CRS precoding described above, when the DM-RS/CRS relationship information is a specific value, for example, '1', or with combination of other information when it is a specific value.

The DM-RS/CRS relationship information may be replaced with a signal such as an operation mode and whether an LTE control region is used.

When the DM-RS/CRS relationship information is replaced by a signal indicating whether or not the LTE control region is used, only the LTE MTC terminal supporting the use of the LTE control region may be allowed to receive MPDCCH by referring to the flag included in the information and using the precoding and port relationships between MPDCCH DM-RS and CRS.

The information for configuring the precoding and port relationship between the MPDCCH DM-RS and the CRS includes meaning of information indicating whether to apply the precoding and port relationship between the MPDCCH DM-RS and the CRS, or information indicating MPDCCH reception by applying the above relationship.

Alternatively, the base station may indicate to the UE whether to apply the precoding and port relationship between the MPDCCH DM-RS and the CRS through DCI, or may indicate to receive the MPDCCH using the relationship.

The base station may include to DCI a 1-bit flag indicating whether to apply the precoding and port relationship between the MPDCCH DM-RS and the CRS and to receive the MPDCCH using the relationship.

The UE may receive the MPDCCH by applying precoding and port relationships between the MPDCCH DMRS and the CRS with reference to the DCI information.

The precoding and port relationship between the MPDCCH DM-RS and the CRS may be used not only for improving MPDCCH reception performance, but also for measurement using MPDCCH.

For example, it may be used in the case of measurement for the hypothetical MPDCCH BLER performance estimation for determining in-sync and out-of-sync during radio link monitoring.

Among the above-described methods, in a method related to the precoded DM-RS, a specific relationship between the precoding matrix and the ECCE index may be defined.

For example, in an MPDCCH blind detection (BD) process, the terminal may attempt MPDCCH detection assuming one or more ECCEs based on an aggregation level (AL), and the ECCE index is related to the DM-RS port index.

Accordingly, the precoding matrix of the precoded DM-RS assumed by a specific terminal may be determined according to the ECCE index.

When the UE may assume a specific precoding matrix, the UE may assume that the same precoding is applied to all ECCE indexes used in performing the BD.

More specifically, the ECCE index may be the lowest ECCE index when the aggregation level (AL) is greater than 1.

The lowest ECCE index means the smallest value among ECCE index values of a plurality of ECCEs included in the MPDCCH.

Frequency Interpolation Supporting Method

To improve performance through frequency interpolation, applying PRB bundling may be considered.

In the case where PRB bundling may be assumed in the MPDCCH detection process through the channel estimation of the terminal, for the PRG (Precoding Resource block Group), a grid may not be generated within the LTE system bandwidth, but the grid may be configured in the corresponding NB (Narrow Band).

An example in which a grid is configured in the NB will be described with reference to FIG. 31.

Figure 31:
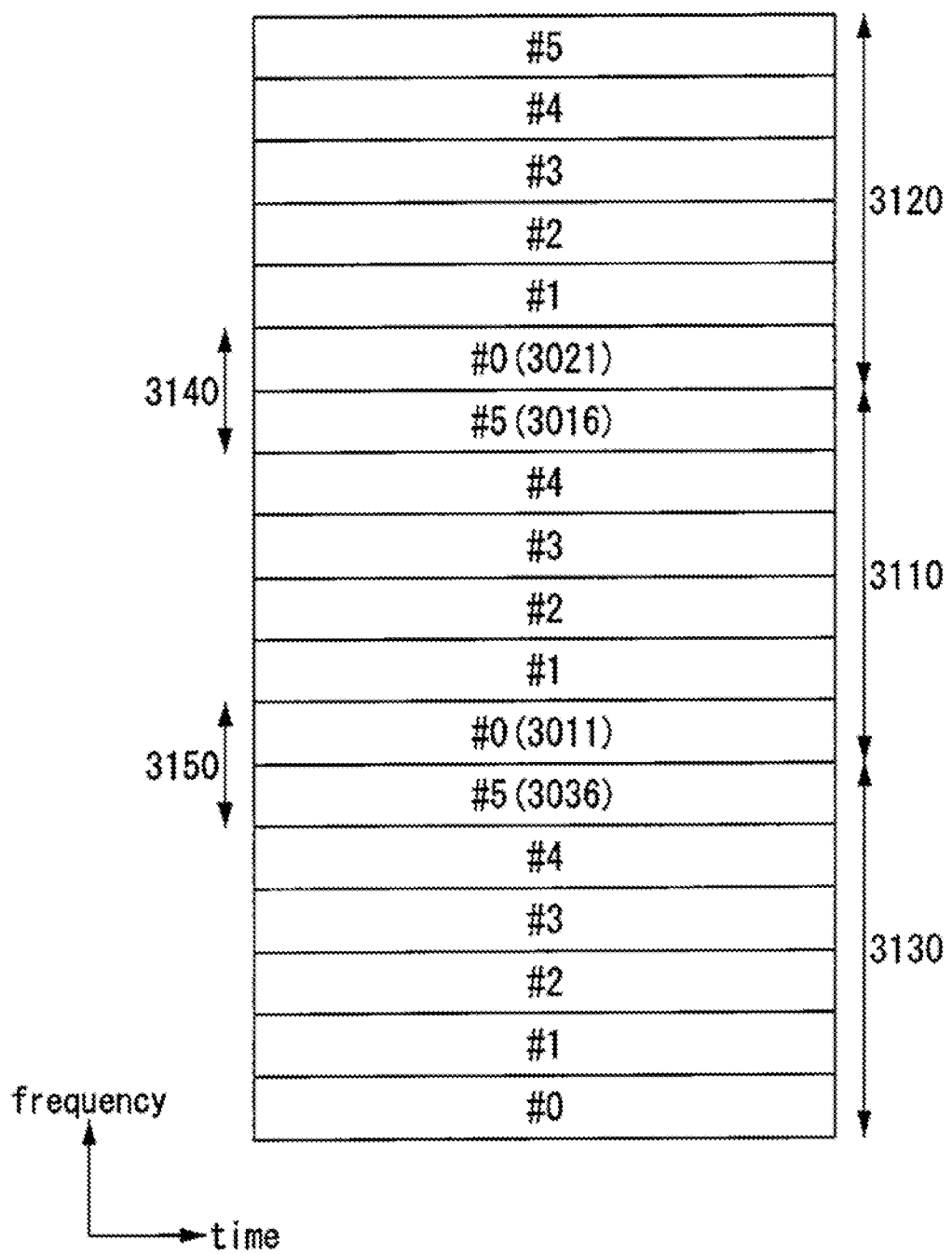
FIG. 31 is a diagram illustrating an example in which a grid is configured within an NB according to an embodiment of the present disclosure.

In FIG. 31, #0 to #5 represent the RB indices in each NB.

The specific NB 3110 is adjacent to two other NB s, that is, the first NB 3120 and the second NB 3130, and the highest RB (Resource Block) index 3116 and the lowest RB index 3111 of the specific NB 3110 may belong to different PRGs, that is, the first PRG 3140 and the second PRG 3150.

The highest RB index 3116 of the specific NB 3110 may belong to the first PRG 3140 together with the lowest RB index 3121 of the first NB 3120 adjacent to the specific NB.

In addition, the lowest RB index 3111 of the specific NB 3110 may belong to the second PRG 3150 together with the highest RB index 3136 of the second NB 3130 adjacent to the specific NB.

This may be inefficient in terms of a terminal that performs MPDCCH detection within a specific NB.

Accordingly, the PRG unit may be configured based on the system bandwidth of the LTE cell, but the physical grid of the PRG may be configured within the NB.

In LTE-MTC, the PRB bundling of the MPDCCH may be configured implicitly according to the Coverage Enhanced (CE) mode.

For example, a UE configured with CE mode B (or CE level 3 or 4) mainly requires large coverage enhancement, so may be configured to monitor MPDCCH format including at least 2 PRBs or more, that is, PRB=2, 4 or 6 only, and may perform blind detection (BD) on the assumption of PRB bundling.

Here, Aggregation Level=8, 16, or 24, and the PRB bundling unit may be 2 PRBs.

When the MPDCCH PRB set configuration unit is 2, 4 or 6 PRBs, and the PRG unit exceeds 3 PRB, the performance gain is small, and thus the PRG may be configured with 2 PRBs which is the minimum unit of the MPDCCH PRB set configuration.

That is, one PRG may include two PRBs, and three PRGs may be configured within 1 NB.

A method of configuring PRG in units of 2 PRBs will be described. First, when the PRB index in each NB is pE{0, 1,2,3,4,5}, 3 non-overlapping PRGs respectively having the index pairs of {0,1}, {2,3}, and {4,5} may be configured.

Second, when the PRGs included in the MPDCCH PRB set are not adjacent to each other, the PRBs included in the MPDCCH PRB set may configure one PRG.

For example, when an MPDCCH PRB set including 2 PRBs is configured with p={1,4}, a PRB set having a PRB index of {1,4} may form a PRG.

Configuration information related to the configuration of the above MPDCCH PRB set may be indicated to the terminal through a higher layer configuration.

As another method of configuring the MPDCCH PRB set, the PRG may be configured such that the number of PRBs is an integer multiple of the PRG.

For example, in the case of an MPDCCH PRB set including 4 PRB sets, one PRG may include 4 PRBs, or one PRG may include 2 PRBs.

The UE refers to the configuration information of the MPDCCH PRB set configured from the higher layer, may identify the PRG configuration in the MPDCCH PRB set configured based on the above-described method, and may perform channel estimation by assuming the same precoding within the PRG.

More specifically, when the terminal determines that the method of configuring the PRG in units of the MPDCCH PRB set is applied based on the configuration information of the MPDCCH PRB set configured from the higher layer, the terminal may assume that the same precoding is applied within the MPDCCH PRB set, and may perform a channel estimation operation or the like for MPDCCH demodulation/decoding.

The PRB bundling method may be applied to the codebook-based MPDCCH DM-RS transmission of the present disclosure.

For example, when the base station configures the PRG in units of the MPDCCH PRB set among the above methods, and transmits the MPDCCH DM-RS using the same MPDCCH DM-RS precoding and/or port within the PRG, the terminal may perform a channel estimation operation or the like for MPDCCH demodulation/decoding by assuming the same MPDCCH DM-RS precoding and/or port within the MPDCCH PRB set.

As another example, when the base station configures the PRG in units of MPDCCH PRB set among the above methods and applies the same MPDCCH DM-RS precoder cycling or port cycling within the PRG, the terminal may perform a channel estimation operation or the like for MPDCCH demodulation/decoding by assuming the same MPDCCH DMRS precoder cycling or port cycling rule within the MPDCCH PRB set.

The base station may determine whether PRB bundling of the MPDCCH or the PDSCH or the PRG value according to whether same subframe multiplexing of the MPDCCH and the physical downlink shared channel (PDSCH) between the same or different terminals.

For example, a UE that has been configured with a PRG of the PDSCH being 3 by a higher layer may perform PDSCH demodulation assuming PRG=3 for a subframe to which the same subframe multiplexing is not applied, and then when receiving the subframe to which the same subframe multiplexing is applied, may perform PDSCH demodulation assuming PRG=2 PRB.

Here, whether to apply the same subframe multiplexing may be indicated to the UE through PDSCH scheduling DCI.

Alternatively, since the MPDCCH PRB set is configured in units of 2, 4 or 6 PRBs, in order to support effective MPDCCH/PDSCH same subframe multiplexing, the higher layer may configure the PRG configuration of the PDSCH to the UE as PRG=2 PRB.

That is, one PRG of the PDSCH may be configured to include two PRBs. In this case, the UE may assume PRG=2 PRB for PDSCH demodulation in all subframes.

Fallback Operation

A fallback operation needs to be defined when the UE additionally uses the CRS as well as the DM-RS for the purpose of improving MPDCCH reception performance or when PRB bundling is applied.

Definition of fallback operation according to subframe type

The types of subframes may be classified into non-MBSFN subframes and MBSFN subframes according to whether including a period in which the CRS is not transmitted.

When the type of subframe is a non-MBSFN subframe, both a DM-RS and a CRS may be used for channel estimation for MPDCCH reception. On the other hand, when the type of subframe is an MBSFN subframe, only the DM-RS may be used for channel estimation for MPDCCH reception.

In a method of additionally using a CRS as well as an MPDCCH DM-RS to improve MPDCCH reception performance, a region in which a CRS is not transmitted may exist in a period in which the MPDCCH is repeated.

For example, there may be an MBSFN area of an MBSFN subframe, that is, an area other than the LTE control area in the MBSFN subframe.

In this case, the UE needs to fallback for a certain period to a conventional operation of estimating a channel based only on the MPDCCH DM-RS.

When the UE performs fallback as described above, a performance problem that may occur when the UE reflects the RE to which the CRS is not transmitted to the channel estimation may be prevented.

As an example, the UE may perform a fallback operation to perform channel estimation based only on the DM-RS only in a subframe in which CRS transmission is not expected.

Alternatively, for an interpolation and/or averaging operation on channel estimation, the UE may perform a fallback operation in all subframes within the MPDCCH repetition period, not only subframes in which CRS transmission may not be expected.

Alternatively, the terminal may perform fallback operation in all subframes within the NB (Narrow Band) (or within the frequency hop), or subframes in which precoding is maintained (or the same precoding is applied) within the NB (or within the frequency hop).

As another example, in a subframe in which CRS may not assumed, or in a specific region within a subframe in which CRS may not be assumed, the UE may perform fallback to perform channel estimation using both CRS and DM-RS as in a subframe in which CRS may be expected.

The subframe in which the CRS transmission may be expected may include, for example, a non-MB SFN subframe.

More specifically, when an LTE MTC terminal capable of using CRS to improve MPDCCH reception performance receives a higher layer configuration of a CRS and a DM-RS port relationship and/or when indicated to perform channel estimation using a CRS and a DM-RS port relationship, the UE may perform channel estimation using the configured CRS and DMRS port relationship even for an MBSFN subframe in which CRS transmission may not be expected.

By performing channel estimation using both the CRS and the DM-RS in a subframe or the like where the UE may not expect CRS transmission, averaging gain may not be obtained during channel estimation as the precoding of the DM-RS of a specific subframe, for example a MBSFN subframe, becomes different during MPDCCH repetition, or additional processing performed to obtain an averaging gain may be eliminated.

Definition of Fallback Operation in Terms of Reliability

Operation switch from an operation of the base station (eNB) allowing channel estimation based on only the DM-RS due to a change in situation to an operation of allowing channel estimation based on both of DM-RS and CRS (or vice versa) may be required.

The operation switching may be performed by radio resource control (RRC) reconfiguration or the like.

In the procedure of RRC reconfiguration or the like, a mismatch may occur with respect to a reference signal for demodulation of MPDCCH that schedules a PDSCH or a PUSCH in which an RRC message transmitted and received between a base station and a terminal.

To prevent the mismatch, regardless of whether MPDCCH demodulation configuration based on both CRS and DM-RS, for a specific DCI format, PDCCH candidate or search space, a fallback operation in which MPDCCH demodulation is performed always based on DM-RS only may be performed.

For example, the fallback operation may be performed on an MPDCCH that is monitored simultaneously with a specific terminal and other terminal, not the MPDCCH that only the specific terminal monitors.

Said other terminal may be an MTC terminal, a non-BL terminal in a Coverage Enhancement (CE) mode or an LTE terminal.

As another example, it may be configured to perform the fallback operation on an MPDCCH including Downlink Control Information (DCI) that delivers information to one or more terminals.

The fallback operation as described above may be performed in Type0-MPDCCH CSS (Common Search Space), Type1-MPDCCH CSS, and Type2-MPDCCH CSS, and the fallback operation may be performed in Type1-/1A-/2-/2A-MPDCCH CSS.

Through the fallback operation, the relationship between the MPDCCH DM-RS and the CRS for a terminal capable of using a CRS to improve MPDCCH performance may not be directly applied to legacy devices monitoring the same CSS.

In this case, it is possible to protect the operation of legacy UEs.

Information on the relationship between the CRS and the DM-RS may be RRC configured and transmitted to all UEs in a cell, or may be transmitted by discriminating UEs within a cell according to CE mode (or CE level).

In addition, the information on the relationship between the CRS and the DM-RS may be RRC configured and transmitted for each terminal based on the capability and situation of the terminal.

For example, according to the received signal-to-noise ratio (SNR) of the terminal, that is, according to the channel estimation accuracy, whether the terminal performs channel estimation based only on the DM-RS, or performs channel estimation based on the DM-RS and the CRS may be determined.

Here, since the received SNR of the UE is a UE-specific value, RRC configuration may be required for each UE.

Accordingly, when the UE-specific RRC configuration is applied, a fallback operation in terms of reliability, that is, preventing a configuration mismatch between the base station and the terminal may be required.

As an example of the fallback operation, a fallback MPDCCH to which CRS is not applied may be required.

Method of Configuring the Relationship Between CRS and DM-RS

Hereinafter, various methods of configuring the relationship between the CRS and the DM-RS described above to the terminal will be described.

Method 1) Broadcasting the Relationship Between CRS and DM-RS

Method 1) is a method of broadcasting information on the MPDCCH DM-RS to the UE through a Master Information Block (MIB) or a System Information Block (SIB).

The UE acquires the information on the DM-RS from a cell selection step, and in an idle mode procedure, for example, paging, random access step, may use and apply the information on the DM-RS to MPDCCH demodulation.

The configuration of the relationship between the CRS and the DM-RS broadcast according to method 1) may be applied to all terminals for a cell that broadcasts the configuration.

Alternatively, it may be predefined to the terminal to apply when a specific condition is satisfied.

In the case of a conventional LTE-MTC terminal, since both the PBCH (Physical Broadcast Channel) transmitting MIB, and the PDSCH transmitting SIB1-BR or SI (System Information) message do not require MPDCCH demodulation, default operation to be applied before receiving broadcast information may not be defined.

When the MPDCCH performance improvement method proposed in the present disclosure is to be extended and applied to a general LTE or NR terminal, the configuration information broadcast by method 1) may define an operation of preventing the CRS from being applied to channel estimation in a specific step as a default operation.

The specific step may be an MPDCCH demodulation step for receiving the configuration information or an MPDCCH demodulation step prior to receiving the configuration information.

Method 2) Broadcast the relationship between CRS and DM-RS for each CE mode (or CE level)

CE mode A is mainly suitable for localized transmission for the following reasons.

Supports single layer beamforming through CSI feedback.

Supports multiplexing between terminals belonging to a good coverage.

On the other hand, CE mode B is mainly suitable for distributed transmission for the following reasons.

CSI feedback is not possible at the transmitter.

User multiplexing is limited due to the large level of merging (Large AL).

Transmission mode 6 (TM6) is not supported.

As described above, according to the difference according to the CE modes, the relationship between the CRS and the DM-RS may be configured for each CE mode (or CE level in the random access step).

First, in the case of CE mode B, distributed transmission is suitable, and channel dependent scheduling by single layer beamforming is impossible.

Accordingly, the base station may configure to apply a method of transmitting the MPDCCH DM-RS in a non-precoded manner, a method of applying a fixed precoding to the MPDCCH DM-RS, or a method of cycling within the entire set or predefined part of precoding matrices defined in the MPDCCH DM-RS codebook, or the like.

In CE mode A, terminal multiplexing and channel dependent scheduling gain through localized beamforming may be expected.

Accordingly, the base station may configure to apply a method of applying the same precoding as the MPDCCH DM-RS to the CRS (precoded CRS transmission method) or the like.

In addition, the precoded DM-RS or codebook-based DM-RS may be applied in relation to the CRS to which the PMI information is reflected among the CSI information fed back by the terminal.

The method includes MPDCCH DM-RS precoding in which a codebook defined for single layer beamforming (PDSCH TM6) using CRS is reused, based on a CSI report generated and fed back by the UE based on CRS.

Additionally, in CE mode A, the DCI may indicate to report PMI information to be used for the MPDCCH in addition to indicating the CSI report for PDSCH scheduling.

The CRS and DM-RS relationship configuration based on the CE mode of the UE may be similarly applied to the CRS and DM-RS relationship configuration based on whether the MPDCCH transmission is local or distributed transmission.

Specifically, in the case of local MPDCCH transmission, similar to the above-described CE mode A, terminal multiplexing and channel-dependent scheduling gain through local beamforming may be expected.

Accordingly, the CRS and DM-RS relationship in the case of local MPDCCH transmission may be set identically to the CRS and DM-RS relationship in CE mode A.

In addition, in the case of distributed MPDCCH transmission, channel dependent scheduling by single layer beamforming is not possible as in the above-described CE mode B.

Accordingly, the CRS and DM-RS relationship configuration in the case of distributed MPDCCH transmission may be configured the same as the CRS and DM-RS relationship configuration in CE mode B.

The CRS and DM-RS relationship configuration based on the CE mode of the UE may be similarly applied to the CRS and DM-RS relationship configuration based on the downlink transmission mode (TM).

Specifically, the relationship between the CRS and the DM-RS in the case where single layer beamforming may be applied like TM 6 and TM 9 may be configured as the relationship between CRS and DM-RS in CE mode A.

Alternatively, the relationship between the CRS and the DM-RS in the case of using transmit diversity like TM 2 may be configured similarly to the relationship between the CRS and the DM-RS in CE mode B.

Due to the difference, the CRS and the DM-RS relationship and/or the configuration for enabling/disabling the use of the CRS for improving MPDCCH performance may be configured for each CE mode (or CE level in the random access step).

In addition, CRS and DM-RS relationships may be separately configured according to local MPDCCH transmission and distributed MPDCCH transmission, and CRS and DM-RS relationships may be configured differently for each PDSCH transmission mode (TM) or for some TMs.

The detailed operations and definitions of Method 1) above apply equally to Method 2).

Method 3) RRC configuration of CRS and DMRS relationship for each terminal

The base station may configure by RRC the CRS and DM-RS relationship to all terminals in a cell, or by discriminating for each CE mode (or CE level) without applying the same to all terminals (i.e., without configuring the same to terminals of the same CE mode), in consideration of the terminal's capability, situation, or the like.

More specifically, according to the reception SNR of the terminal, that is, according to the channel estimation accuracy, the terminal may determine whether to perform an operation based only on the DM-RS or an operation based on both the DM-RS and the CRS.

In this case, since the received SNR of the UE is a UE-specific value, individual RRC configuration may be required for each UE.

When such a UE-specific RRC configuration is applied, a fallback operation in terms of reliability, that is, a fallback operation to prevent the above-described configuration mismatch between the base station and the terminal may be required.

For example, a fallback MPDCCH to which CRS is not applied may be required.

Method 4) transmitting dynamic CRS-DM-RS codebook information for each terminal by DCI In the same manner as in Method 3), there may be a case where fast switching of the configuration for the CRS and the DM-RS relationship is required in a situation where a UE-specific configuration is required.

In this case, the base station may transmit codebook information applied to the CRS and the DM-RS through DCI.

The configuration methods for the relationship between the CRS and the MPDCCH DM-RS may be applied equally to the case of enabling/disabling the use of CRS for improving MPDCCH performance.

In addition, the relationship between the CRS and the MPDCCH DM-RS includes power of the MPDCCH DM-RS compared to the CRS or power boosting information described in the method of indicating to the terminal after applying codebook-based precoding.

Therefore, it is configured as the CRS and MPDCCH DM-RS relationship configuration method.

The above proposed method of MPDCCH DM-RS precoding and port configuration based on the CSI report determines MPDCCH DM-RS precoding and port relationship based on the CSI report from a specific terminal, so it is configured or reconfigured as UE-specific RRC signaling similarly to the method of configuring the PDSCH transmission mode (TM)

When the PDSCH transmission mode (TM) and MPDCCH DM-RS precoding and port are configured based on the same CSI report, the TM of the PDSCH and the MPDCCH DM-RS precoding and port of the MPDCCH scheduling the corresponding PDSCH may be (re)configured based on the same CSI report.

Accordingly, MPDCCH precoding and port configuration may have to be preceded. For MPDCCH precoding and port configuration, the base station may transmit MPDCCH DM-RS precoding and port configuration to a specific UE through MPDCCH in which DM-RS precoding and port configuration based on CSI report of the specific UE is not applied.

Alternatively, the base station may transmit MPDCCH DM-RS precoding and port configuration information to the terminal through MPDCCH CSS supporting distributed MPDCCH transmission.

The MPDCCH DM-RS precoding and port configuration information may be PMI confirmation information and/or codebook index information selected by the base station.

The PMI confirmation information may be a flag indicating whether the codebook index or precoding applied by the base station is a codebook index recommended by the UE through aperiodic CSI reporting or a codebook index explicitly indicated through DCI.

Here, the MPDCCH DM-RS of the MPDCCH CSS itself supporting the distributed MPDCCH transmission that transmits the MPDCCH DM-RS precoding and port configuration information may be transmitted in a non-precoded manner, with applying a fixed precoding, or with applying a method of cycling within the entire set of precoding matrices defined within a codebook or within a predetermined part, or the like.

The base station may indicate to the UE to transmit an aperiodic CSI report at a specific time through DCI transmitted through distributed MPDCCH transmission or DCI transmitted through MPDCCH to which the recently successfully (re)configured MPDCCH precoding and port configuration have been applied.

When the base station receives an aperiodic CSI report from the terminal at the time indicated to the terminal, based on the corresponding CSI report, the PDSCH TM may be (re)configured through UE-specific RRC signaling, if necessary.

Alternatively, the base station may (re)configure the precoding and port configuration of the MPDCCH DM-RS to the terminal through UE-specific RRC signaling, MAC signaling, or DCI signaling.

When the base station transmits MPDCCH DMRS precoding and port information to the terminal through DCI, the base station may not receive an aperiodic CSI report from the terminal at an intended time point.

In this case, the base station may indicate that the codebook index applied by the base station has been used through PMI confirmation information by transmitting the DCI for the MPDCCH DM-RS precoding and port configuration through distributed MPDCCH transmission, and may indicate the codebook index previously successfully (re)configured as a codebook index that the base station applied, communication with the terminal may be maintained through previous MPDCCH DMRS precoding and port configuration.

When the base station indicates MPDCCH DM-RS precoding and port information to the terminal by using the DCI transmitted through the distributed MPDCCH transmission as above, it is allowed to distinguish the field by applying independent Radio Network Temporary Identifier (RNTI) for the corresponding DCI.

When changing the precoding applied to the MPDCCH DM-RS, the SNR or SINR of the received signal may be changed in terms of the UE due to a difference in beamforming gain or presence or absence of a beamforming gain.

Specifically, for reasons such as the precoding applied to the MPDCCH DM-RS is changed from fixed precoding or predefined precoding to precoding for single layer beamforming based on CSI, an increase in the number of ports for precoding for single layer beamforming, the shape of the transmission beam may be changed, and the SNR or SINR of the received signal may be changed in terms of the terminal.

In this case, there may be a variation in the MPDCCH repetition number that is optimized in terms of a terminal or in terms of a system.

For example, in terms of the terminal, the number of repetitions required for MPDCCH reception may be reduced as the beamforming gain varies.

On the other hand, in terms of the base station, power allocation applied to each terminal may vary in consideration of the situation of a plurality of terminals.

In this case, the base station may optimize the value of the number of MPDCCH repetitions indicated through DCI in order to increase the efficiency of resources and reduce the power consumption of the terminal through efficient application of the number of MPDCCH repetitions.

As a method of optimizing, a repetition number set indicated by the DCI corresponding to each precoding or codebook index may be newly defined, and a different repetition number set may be applied according to the precoding or codebook index.

By grouping precoding or codebook indices, a set of repetitions for each group may be defined and used.

For example, the grouping method may be, more simply, newly defining and using a set of repetition numbers for the case of using a codebook for single layer beamforming based on CSI reporting.

The repetition number set may include newly defining a repetition number set for MPDCCH transmission in a UE-specific RRC configuration, or configuring differently value of Rmax, or a value in a UE-specific RRC configuration is used as it is and applying by multiplying a specific scaling factor according to precoding or codebook index selection.

The scaling factor may have a value of ½.

When configuring the new repetition number set, for the case where it is necessary to reduce the number of repetitions due to an increase in beamforming gain, a value may be configured in a direction of increasing the granularity of the number of repetitions for effective use of the DCI field.

Specifically, when the Rmax value required before beamforming is 8, when the DCI field indicates one of {1, 2, 4, 8} as the value of the number of repetitions, when the Rmax required after beamforming is decreased to 4, the repetition number set may be changed a field such as {1, 2, 3, 4}.

Alternatively, when the UE receives the MPDCCH using the CRS, the MPDCCH reception performance is improved and the MPDCCH detection performance is improved, there may be disadvantage that the previous repetition number interval may be too long.

That is, since the MPDCCH detection performance of the terminal is improved, there is no need to repeat the MPDCCH by a large number.

To compensate for this disadvantage, intermediate values may be added when configuring a new set of repetition numbers.

Specifically, when the maximum number of repetitions is 32, and the set of repetition numbers that may be indicated in DCI is {1, 2, 4, 8, 16, 32}, then intermediate values such as 12, 20, 24, 28 may be added in the new set of repetition numbers.

The newly added value(s) may be defined, when the corresponding MPDCCH is frequency hopping, in relation to the number of consecutive subframes transmitted in the same NB before frequency hopping, that is, a value corresponding to the frequency hopping interval.

For example, values that are an integer multiple of the frequency hopping interval may be added as an intermediate value of the set of repetition numbers.

Figure 32:
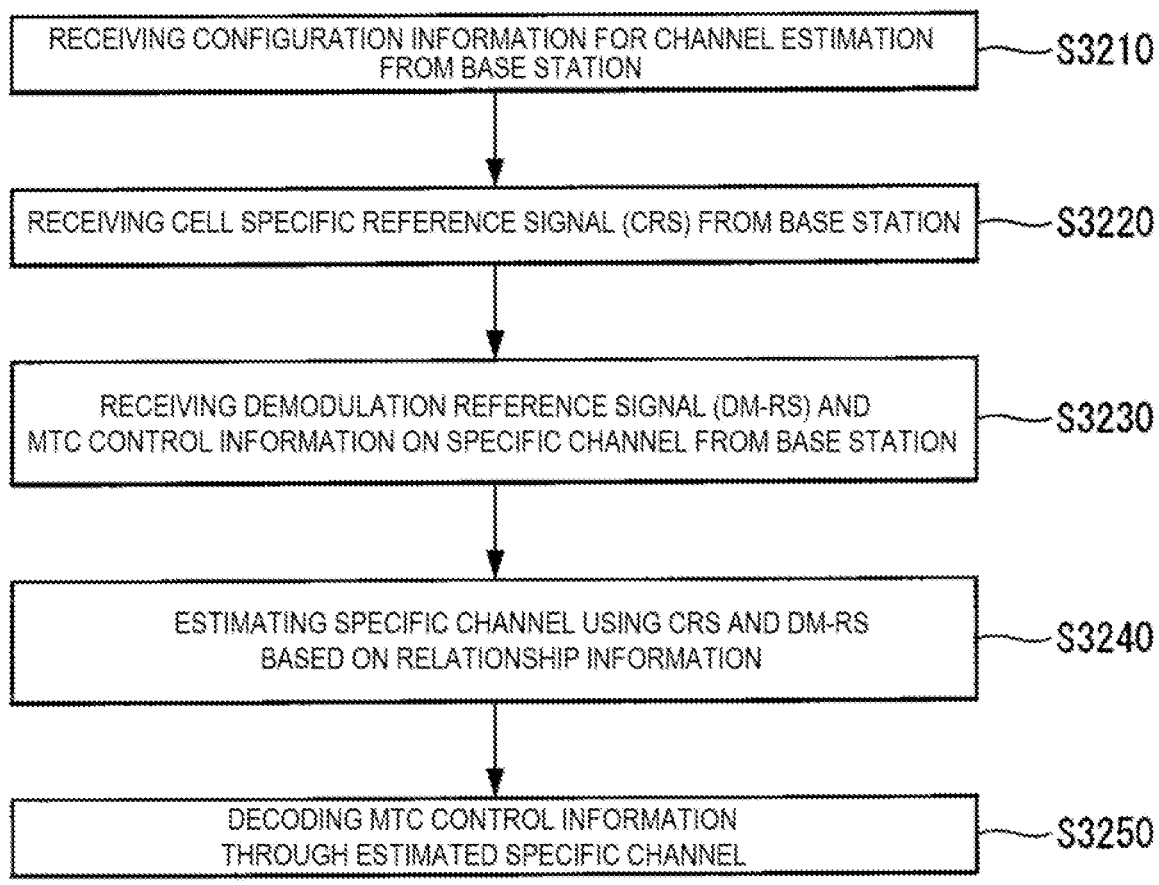
FIG. 32 is a flowchart illustrating an operation of a terminal performing a channel estimation method according to an embodiment of the present disclosure.

FIG. 32 shows an example of the operation of the terminal in the present disclosure as described above.

That is, FIG. 32 shows the operation of the terminal for estimating a channel in the wireless communication system.

In order for the terminal to estimate a channel in a wireless communication system, the terminal receives configuration information for channel estimation from the base station (S3210).

Here, the configuration information includes relationship information related to an association relationship between a cell-specific reference signal (CRS) and a dedicated demodulation-reference signal (DM-RS).

In addition, the terminal may receive the configuration information from the base station in the idle mode state in a discontinuous reception (DRX) period, and the configuration information may be received in the listening period in the idle mode.

Next, the terminal receives the CRS from the base station (S3220).

Thereafter, the terminal receives the DM-RS and MTC (Machine Type Communication) control information on a specific channel from the base station (S3230).

The terminal estimates the specific channel by using the CRS and the DM-RS based on the relationship information (S3240).

In addition, in order to estimate the specific channel, the terminal obtains a first channel estimation result through channel estimation using the CRS, and estimates the specific channel by using a time interpolation method based on the DM-RS and the first channel estimation result.

In addition, the step of estimating the specific channel includes estimating the specific channel using a frequency interpolation method, and the frequency interpolation method is applied with a minimum unit of a set of physical resource blocks (PRBs) included in the specific channel.

In addition, the configuration information may be included in downlink control information (DCI).

Thereafter, the terminal decodes the MTC control information through the estimated specific channel (S3250).

In this case, the relationship information includes precoding relationship information between the CRS and the DM-RS and power ratio information of the CRS to the DM-RS, and the power ratio information is information related to the power ratio between the CRS port and the DM-RS port for an idle mode.

In addition, the DM-RS is precoded by a plurality of precoders included in a predefined codebook in a time axis domain and/or a frequency axis domain, and the precoding relationship information includes rule information related to a rule of cycling the plurality of precoders, and the plurality of precoders are cycled in a time axis domain and/or a frequency axis domain according to the rule information and applied to the DM-RS.

In addition, the plurality of precoders are cycled in a time axis domain cycling unit and/or a frequency axis domain cycling unit, and the DM-RS may be precoded by the same precoder within the time axis domain cycling unit and/or a frequency axis domain cycling unit.

In addition, the time axis domain cycling unit may be the same as a frequency hopping interval.

In addition, the plurality of precoders may be cycled in the time axis domain and/or the frequency axis domain in which the specific channel is transmitted.

In addition, the precoding relationship information may indicate that the DM-RS is pre-coded by the same method as the CRS.

In addition, the precoding relationship information may indicate that the CRS is precoded by the same precoder as the precoder applied to the DM-RS.

In addition, the precoding relationship information indicates that a fixed precoding is applied to the DM-RS, and the fixed precoding may be a precoding known to the UE in advance.

In addition, the precoding relationship information may indicate that the DM-RS is precoded based on a codebook.

Additionally, the terminal may further receive codebook information applied to the DM-RS from the base station.

With reference to the terminal operation method of FIG. 32, more detailed contents implemented in a terminal for quickly performing initial access proposed in the present disclosure will be described.

In order to perform channel estimation in a wireless communication system, a terminal includes a transmitter for transmitting a radio signal; a receiver for receiving a radio signal; and a processor functionally connected to the transmitter and receiver.

The processor receives configuration information for channel estimation from the base station, and the configuration information includes relationship information related to the association relationship a cell-specific reference signal (CRS) and a demodulation reference signal (dedicated Demodulation-Reference Signal: DM-RS), receives the CRS from the base station, and receives the DM-RS and MTC (Machine Type Communication) control information on a specific channel from the base station, and based on the relationship information, estimates the specific channel using the CRS and the DM-RS, and decodes the MTC control information through the estimated specific channel, wherein the relationship information includes precoding relationship information between CRS and DM-RS and power ratio information of the CRS with respect to the DM-RS, and the power ratio information is information related to a power ratio between a CRS port and a DM-RS port for an idle mode.

Figure 33:
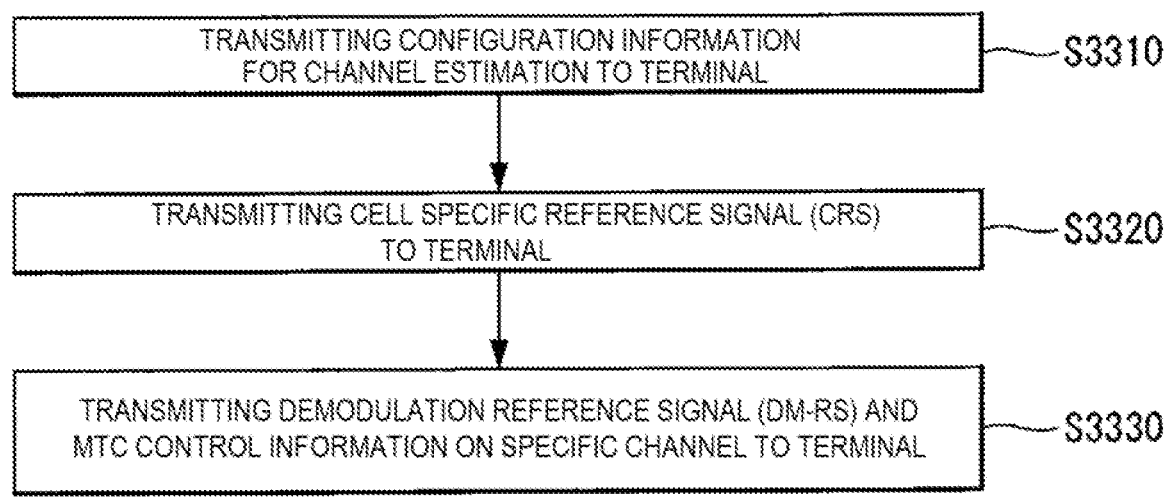
FIG. 33 is a flowchart illustrating an operation of a base station performing a channel estimation method according to an embodiment of the present disclosure.

FIG. 33 is a diagram showing an example of an operation of a base station in the present disclosure as described above.

That is, FIG. 33 shows the operation of the base station in a method for performing channel estimation in a wireless communication system.

The base station transmits configuration information for channel estimation to the terminal (S3310).

The configuration information includes relationship information related to an association relationship between a cell-specific reference signal (CRS) and a dedicated demodulation-reference signal (DM-RS).

Next, the base station transmits the CRS to the terminal (S3320).

Next, the base station transmits the DM-RS and MTC (Machine Type Communication) control information on a specific channel to the terminal (S3330), and based on the relationship information, the terminal estimates the specific channel using the CRS and the DM-RS, the MTC control information is decoded through the estimated specific channel, and the relationship information includes precoding relationship information between the CRS and the DM-RS and power ratio information of the CRS with respect to the DM-RS, and the power ratio information is information related to a power ratio between the CRS port and the DM-RS port for an idle mode.

With reference to the base station operation method of FIG. 33, more detailed information implemented in the base station for fast initial access proposed in the present disclosure will be described.

In order to perform channel estimation in a wireless communication system, a base station includes a transmitter for transmitting a radio signal; a receiver for receiving a radio signal; and a processor functionally connected to the transmitter and receiver.

The processor transmits the CRS to the terminal.

The processor transmits the DM-RS and MTC (Machine Type Communication) control information on a specific channel to the terminal.

The terminal estimates the specific channel using the CRS and the DM-RS based on the relationship information, and decodes the MTC control information through the estimated specific channel, and the relationship information includes precoding relationship information between the CRS and the DM-RS and power ratio information of the CRS with respect to the DM-RS, and the power ratio information is information related to the power ratio between the CRS port and the DM-RS port for an idle mode.

Example of General Device to which the Present Disclosure is Applied

Figure 34:
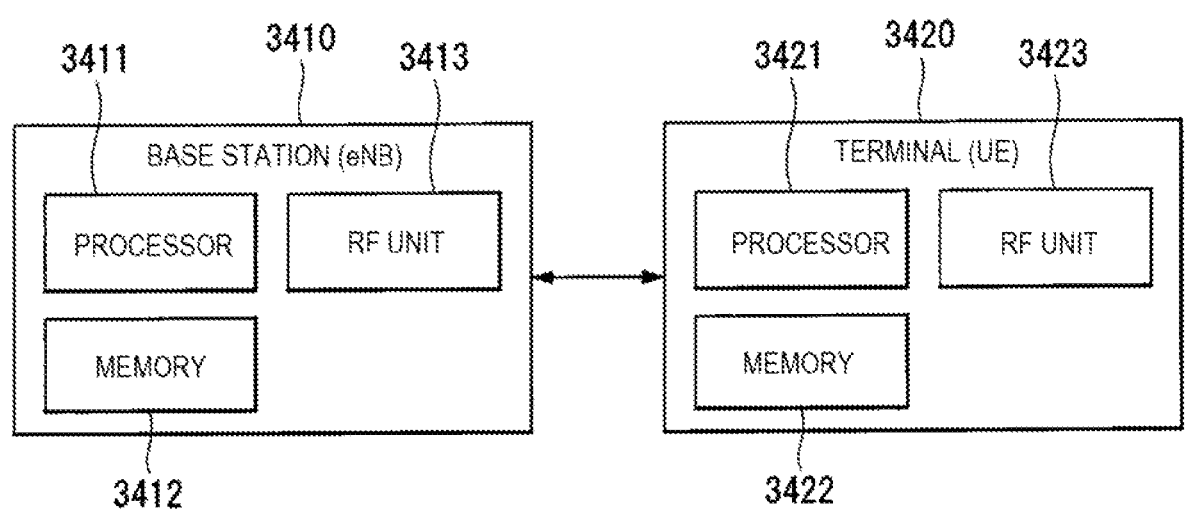
FIG. 34 illustrates a block diagram of a wireless communication device according to an embodiment of the present disclosure.

FIG. 34 illustrates a block diagram of a wireless communication device according to an embodiment of the present disclosure.

Referring to FIG. 34, a wireless communication system includes a base station 3410 and a plurality of terminals 3420 located within an area of the base station 3410.

The base station 3410 includes a processor 3411, a memory 3412, and an RF unit (radio frequency unit) 3413. The processor 3411 implements the functions, processes and/or methods proposed in FIGS. 1 to 33 above. Layers of the radio interface protocol may be implemented by the processor 3411. The memory 3412 is connected to the processor 3411 and stores various types of information for driving the processor 3411. The RF unit 3413 is connected to the processor 3411 and transmits and/or receives a radio signal.

The terminal 3420 includes a processor 3421, a memory 3422, and an RF unit 3423. The processor 3421 implements the functions, processes and/or methods proposed in FIGS. 1 to 41 above. Layers of the radio interface protocol may be implemented by the processor 3421. The memory 3422 is connected to the processor 3421 and stores various types of information for driving the processor 3421. The RF unit 3423 is connected to the processor 3421 and transmits and/or receives a radio signal.

The memories 3412 and 3422 may be inside or outside the processors 3411 and 3421, and may be connected to the processors 3411 and 3421 by various well-known means. In addition, the base station 3410 and/or the terminal 3420 may have one antenna or multiple antennas.

In the present disclosure, the terminal is a mobile phone, a smart phone, a laptop computer, a digital broadcasting terminal, a personal digital assistants (PDA), a portable multimedia player (PMP), a navigation system, a slate PC, and a tablet PC. (tablet PC), a ultrabook, a wearable device (e.g., a smartwatch, a smart glass, a head mounted display (HMD)), a foldable device, and the like. For example, the HMD is a type of display device worn on the head and may be used to implement VR or AR.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the disclosure. Therefore, the detailed description is not limited to the embodiments described above, but should be considered as examples. The scope of the present disclosure should be determined by reasonable interpretation of the attached claims, and all modification within the scope of equivalence should be included in the scope of the present disclosure.

Figure 35:
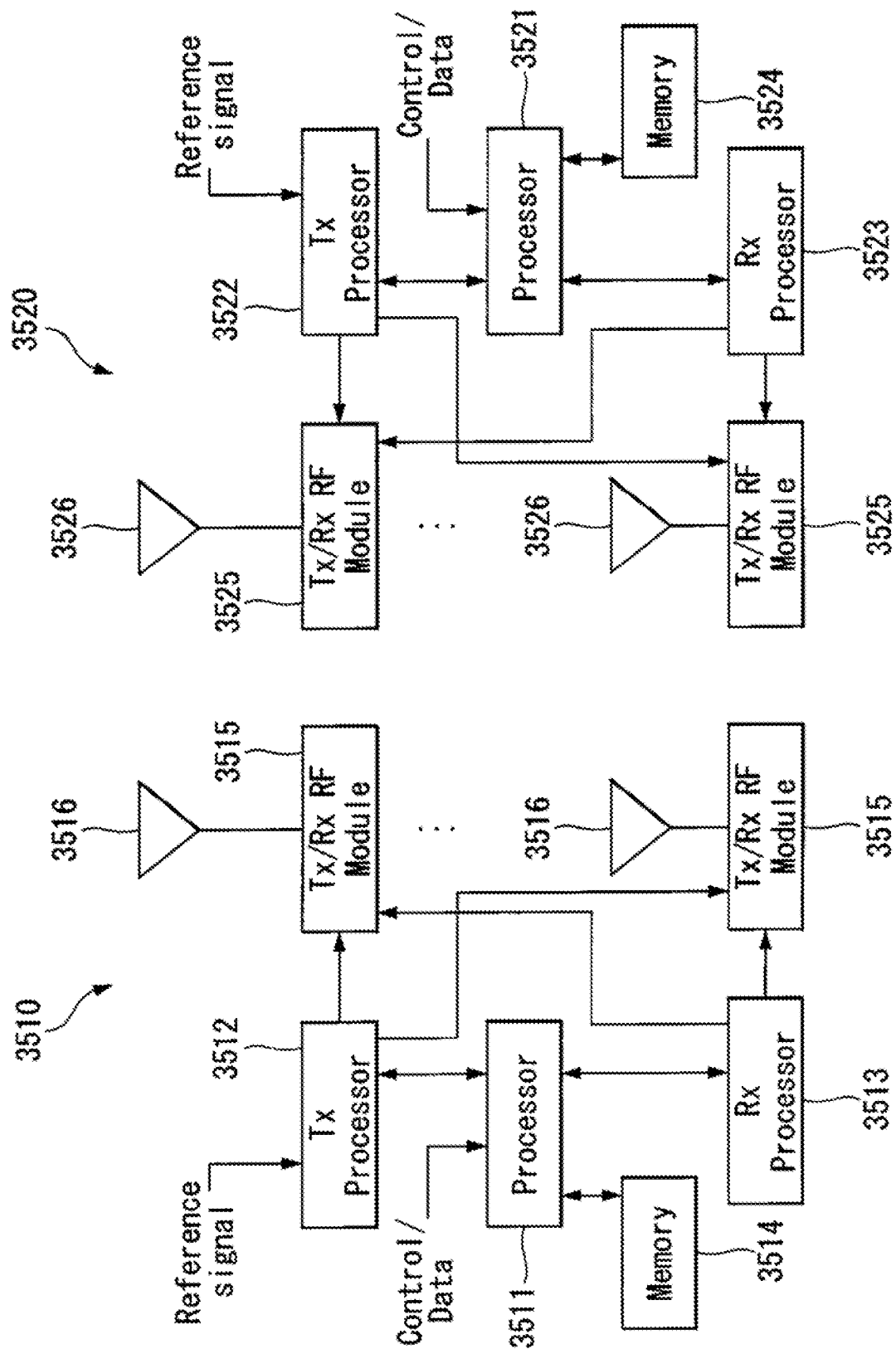
FIG. 35 illustrates a block diagram of a wireless communication device according to an embodiment of the present disclosure.

FIG. 35 is another example of a block diagram of a radio communication device according to some embodiments of the present disclosure.

In reference to FIG. 35, a radio communication system includes a base station 3510 and a plurality of terminals 3520 positioned in a region of a base station. A base station may be represented as a transmission device and a terminal may be represented as a reception device, and vice versa. A base station and a terminal include processors 3511 and 3521, memories 3514 and 3524, one or more Tx/Rx radio frequency (RF) modules 3515 and 3525, Tx processors 3512 and 3522, Rx processors 3513 and 3523 and antennas 3516 and 3526. A processor implements the above-described function, process and/or method. In more detail, an upper layer packet from a core network is provided for a processor 3511 in a DL (a communication from a base station to a terminal). A processor implements a function of a L2 layer. In a DL, a processor provides radio resource allocation and multiplexing between a logical channel and a transmission channel for a terminal 3520 and takes charge of signaling to a terminal. A transmission (TX) processor 3512 implements a variety of signal processing functions for a L1 layer (e.g., a physical layer). A signal processing function facilitates forward error correction (FEC) in a terminal and includes coding and interleaving. An encoded and modulated symbol is partitioned into parallel streams, and each stream is mapped to an OFDM subcarrier, is multiplexed with a reference signal (RS) in a time and/or frequency domain and is combined together by using Inverse Fast Fourier Transform (IFFT) to generate a physical channel which transmits a time domain OFDMA symbol stream. An OFDM stream is spatially precoded to generate a multiple spatial stream. Each spatial stream may be provided for a different antenna 3516 in each Tx/Rx module (or a transmitter-receiver 3515). Each Tx/Rx module may modulate a RF carrier in each spatial stream for transmission. In a terminal, each Tx/Rx module (or a transmitter-receiver 3525) receives a signal through each antenna 3526 of each Tx/Rx module. Each Tx/Rx module reconstructs information modulated by a RF carrier to provide it for a reception (RX) processor 3522. A RX processor implements a variety of signal processing functions of a layer 1. A RX processor may perform a spatial processing for information to reconstruct an arbitrary spatial stream heading for a terminal. When a plurality of spatial streams head for a terminal, they may be combined into a single OFDMA symbol stream by a plurality of RX processors. A RX processor transforms an OFDMA symbol stream from a time domain to a frequency domain by using Fast Fourier Transform (FFT). A frequency domain signal includes an individual OFDMA symbol stream for each subcarrier of an OFDM signal. Symbols and a reference signal in each subcarrier are reconstructed and demodulated by determining the most probable signal arrangement points transmitted by a base station. Such soft decisions may be based on channel estimated values. Soft decisions are decoded and deinterleaved to reconstruct data and a control signal transmitted by a base station in a physical channel. The corresponding data and control signal are provided for a processor 3521.

An UL (a communication from a terminal to a base station) is processed in a base station 3510 by a method similar to that described in a terminal 3520 in relation to a function of a receiver. Each Tx/Rx module 3525 receives a signal through each antenna 3526. Each Tx/Rx module provides a RF carrier and information for a RX processor 3523. A processor 3521 may be related to a memory 3524 which stores a program code and data. A memory may be referred to as a computer readable medium.

Figure 36:
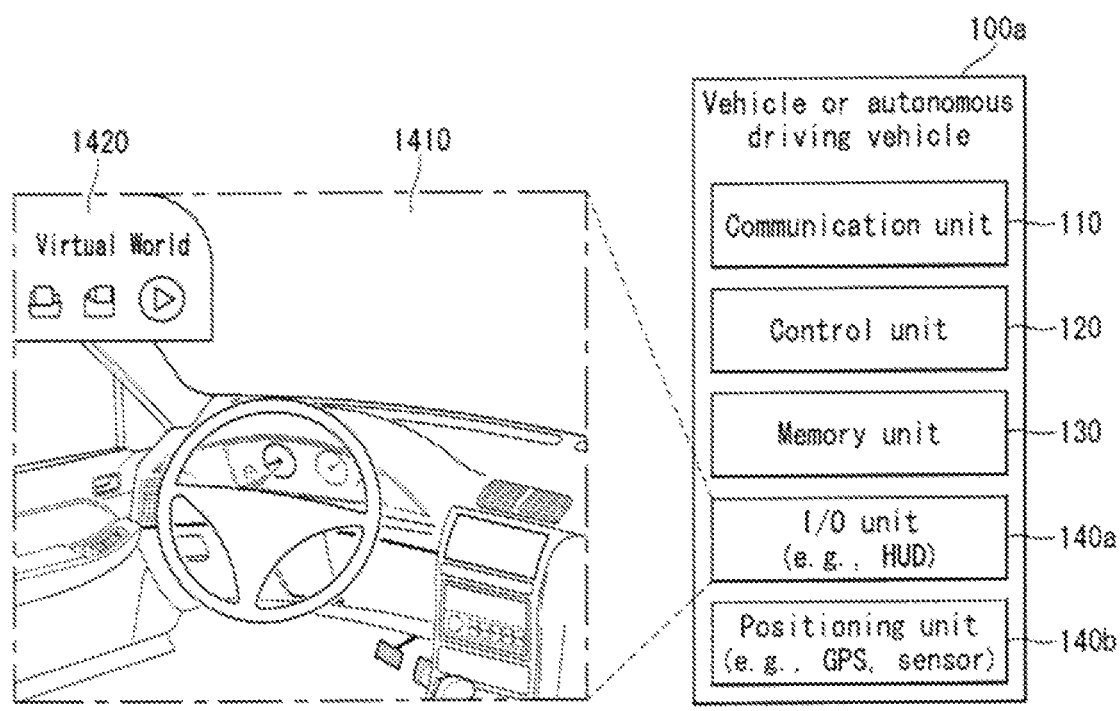
FIG. 36 is a diagram illustrating an example of an autonomous vehicle to which channel estimation methods according to an embodiment of the present disclosure may be applied.

FIG. 36 is an example of an autonomous vehicle to which the methods proposed in the present disclosure may be applied.

Referring to FIG. 36, the vehicle 100 may include a communication unit 110, a control unit 120, a memory unit 130, an input/output unit 140*a*, and a position measurement unit 140*b*. Here, blocks 110 to 130/140*a* to 140*b* correspond to blocks 110 to 130/140 of FIG. X3, respectively.

The communication unit 110 may transmit and receive signals (e.g., data, control signals, etc.) with other vehicles or external devices such as a base station. The controller 120 may perform various operations by controlling components of the vehicle 100. The memory unit 130 may store data/parameters/programs/codes/commands supporting various functions of the vehicle 100. The input/output unit 140*a* may output an AR/VR object based on information in the memory unit 130. The input/output unit 140*a* may include a HUD. The position measurement unit 140*b* may obtain location information of the vehicle 100. The location information may include absolute location information of the vehicle 100, location information within a driving line, acceleration information, and location information with respect to surrounding vehicles. The position measurement unit 140*b* may include GPS and various sensors.

For example, the communication unit 110 of the vehicle 100 may receive map information, traffic information, or the like from an external server and store it in the memory unit 130. The position measurement unit 140*b* may acquire vehicle location information through GPS and various sensors and store the vehicle location information in the memory unit 130. The controller 120 may generate a virtual object based on map information, traffic information, vehicle location information, or the like, and the input/output unit 140*a* may display the generated virtual object on a windshield in the vehicle (1410, 1420). In addition, the controller 120 may determine whether the vehicle 100 is operating normally within the driving line based on the vehicle location information. When the vehicle 100 deviates from the driving line abnormally, the control unit 120 may display a warning on the windshield of the vehicle through the input/output unit 140*a*. In addition, the controller 120 may broadcast a warning message regarding a driving abnormality to nearby vehicles through the communication unit 110. Depending on the situation, the controller 120 may transmit location information of the vehicle and information on driving/vehicle abnormalities to a related organization through the communication unit 110.

Figure 37:
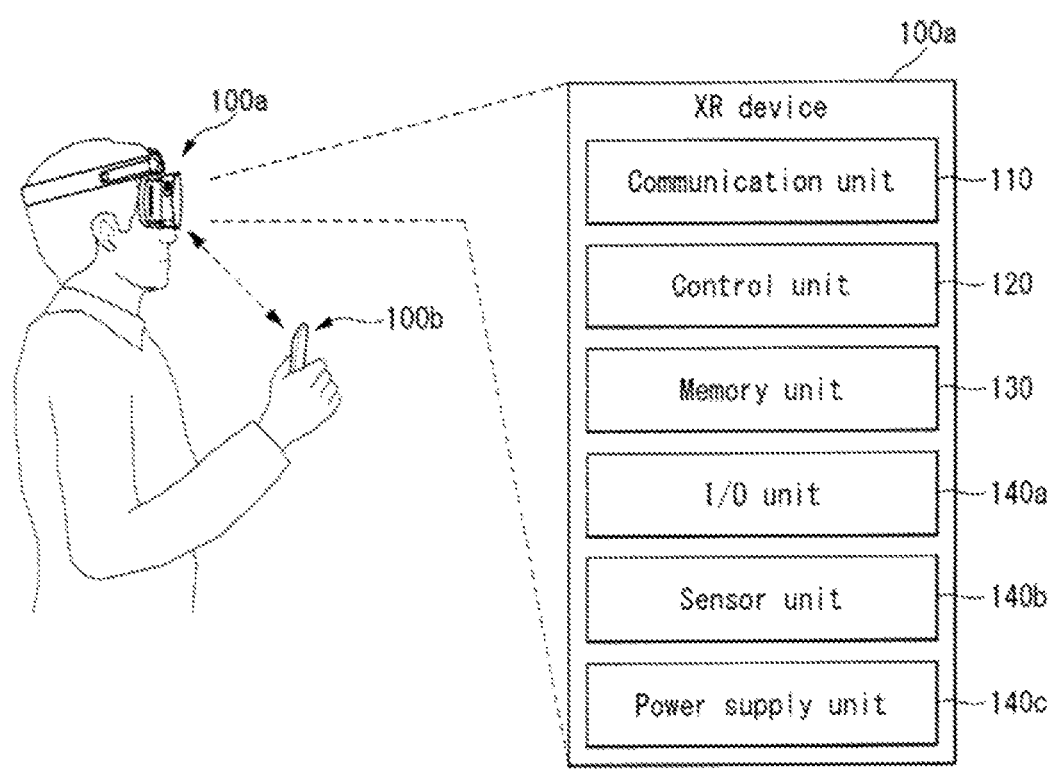
FIG. 37 is a diagram illustrating an example of an XR device to which channel estimation methods according to an embodiment of the present disclosure may be applied.

FIG. 37 illustrates an example of an XR device to which the present disclosure is applied.

The XR device may be implemented as an HMD, a head-up display (HUD) provided in a vehicle, a television, a smartphone, a computer, a wearable device, a home appliance, a digital signage, a vehicle, a robot, and the like.

Referring to FIG. 37, the XR device 100*a* may include a communication unit 110, a control unit 120, a memory unit 130, an input/output unit 140*a*, a sensor unit 140*b*, and a power supply unit 140*c*. Here, blocks 110 to 130/140*a* to 140*c* correspond to blocks 110 to 130/140 of FIG. X3, respectively.

The communication unit 110 may transmit and receive signals (e.g., media data, control signals, etc.) with other wireless devices, portable devices, or external devices such as a media server. Media data may include images, images, and sounds. The control unit 120 may perform various operations by controlling components of the XR device 100*a*. For example, the control unit 120 may be configured to control and/or perform procedures such as video/image acquisition, (video/image) encoding, and metadata generation and processing. The memory unit 130 may store data/parameters/programs/codes/commands required for driving the XR device 100*a*/generating an XR object. The input/output unit 140*a* may obtain control information, data, etc. from the outside, and may output the generated XR object. The input/output unit 140*a* may include a camera, a microphone, a user input unit, a display unit, a speaker, and/or a haptic module. The sensor unit 140*b* may obtain XR device status, surrounding environment information, user information, and the like. The sensor unit 140*b* may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140*c* supplies power to the XR device 100*a*, and may include a wired/wireless charging circuit, a battery, and the like.

For example, the memory unit 130 of the XR device 100*a* may include information (e.g., data, etc.) necessary for generating the XR object (e.g., AR/VR/MR object). The input/output unit 140*a* may obtain a command to manipulate the XR device 100*a* from the user, and the control unit 120 may drive the XR device 100*a* according to the user's driving command. For example, when a user tries to watch a movie, news, etc. through the XR device 100*a*, the control unit 120 transmits the content request information through the communication unit 130 to another device (for example, the mobile device 100*b*) or the media server. The communication unit 130 may download/stream contents such as movies and news from another device (e.g., the mobile device 100*b*) or a media server to the memory unit 130. The control unit 120 may control and/or perform procedures such as video/image acquisition, (video/image) encoding, and metadata generation/processing for the content, and may generate/output an XR object based on information on a surrounding space or a real object acquired through the input/output unit 140*a*/sensor unit 140*b*.

In addition, the XR device 100*a* is wirelessly connected to the mobile device 100*b* through the communication unit 110, and the operation of the XR device 100*a* may be controlled by the mobile device 100*b*. For example, the mobile device 100*b* may operate as a controller for the XR device 100*a*. To this end, the XR device 100*a* may obtain 3D location information of the mobile device 100*b*, and then generate and output an XR object corresponding to the mobile device 100*b*.

In the present disclosure, the wireless device includes a base station, a network node, a transmitting terminal, a receiving terminal, a wireless device, a wireless communication device, a vehicle, a vehicle equipped with an autonomous driving function, a drone (Unmanned Aerial Vehicle, UAV), an AI (Artificial Intelligence) module, a robot, an Augmented Reality (AR) device, a Virtual Reality (VR) device, an MTC device, an IoT device, a medical device, a fintech device (or financial devices), a security device, a climate/environment device, or a device related to the 4th industrial revolution field or 5G service, etc. For example, a drone may be a vehicle that is not a human being and is flying by a radio control signal. For example, the MTC device and the IoT device are devices that do not require direct human intervention or manipulation, and may be a smart meter, a bending machine, a thermometer, a smart light bulb, a door lock, and various sensors. For example, a medical device is a device used for the purpose of diagnosing, treating, alleviating, treating or preventing a disease, examining, replacing, or modifying a structure or function, and may be a medical equipment, a surgical device, a (extracorporeal) diagnostic device, a hearing aid, a surgical device, and the like. For example, a security device is a device installed to prevent a risk that may occur and maintain safety, and may be a camera, a CCTV, or a black box. For example, a fintech device is a device capable of providing financial services such as mobile payment, and may be a payment device or a point of sales (POS). For example, the climate/environment device may mean a device that monitors and predicts the climate/environment.

In the present disclosure, the terminal is a mobile phone, a smart phone, a laptop computer, a digital broadcasting terminal, a personal digital assistants (PDA), a portable multimedia player (PMP), a navigation system, a slate PC, and a tablet PC. (tablet PC), a ultrabook, a wearable device (e.g., a smartwatch, a smart glass, a head mounted display (HMD)), a foldable device, and the like. For example, the HMD is a type of display device worn on the head and may be used to implement VR or AR.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the disclosure.

Therefore, the detailed description is not limited to the embodiments described above, but should be considered as examples. The scope of the present disclosure should be determined by reasonable interpretation of the attached claims, and all modification within the scope of equivalence should be included in the scope of the present disclosure.

INDUSTRIAL APPLICABILITY

The present disclosure has been described mainly with the example applied to 3GPP LTE/LTE-A, 5G system, but may also be applied to various wireless communication systems except the 3GPP LTE/LTE-A, 5G system.

What is claimed is:

1. A method of performed by a terminal in a wireless communication system, the method comprising:
   receiving, from a base station, configuration information for channel estimation,
   wherein the configuration information includes information on a relation between a cell-specific reference signal (CRS) port and a dedicated demodulation-reference signal (DM-RS) port;
   receiving the CRS from the base station;
   receiving the DM-RS and Machine Type Communication (MTC) control information on a specific channel from the base station;
   estimating the specific channel using the CRS and the DM-RS based on the relation; and
   decoding the MTC control information through the estimated specific channel,
   wherein the relation between the CRS port and the DM-RS port is based on a precoder matrix, and
   wherein the configuration information further includes information on a power ratio between the CRS port and the DM-RS port for the specific channel.

2. The method of claim 1, wherein:
   the precoder matrix is one of precoding matrices included in a specific codebook, and
   the precoder matrix is cycled within the precoding matrices based on at least one of a time axis domain unit or a frequency axis domain unit.

3. The method of claim 2, wherein a same precoder matrix among the precoding matrices is applied within at least one of the time axis domain unit or the frequency axis domain unit.

4. The method of claim 3,
   wherein the time axis domain unit is a frequency hopping interval.

5. The method of claim 4,
   wherein the same precoder matrix is applied to at least one contiguous subframe within the frequency hopping interval in a same Physical Resource Blocks (PRB).

6. The method of claim 5,
   wherein the precoder matrix is cycled within the at least one precoding matrix in units of 2 or 4 Physical Resource Blocks (PRBs) within one or more PRB sets in a same subframe.

7. The method of claim 3,
   wherein the precoder matrix is cycled in the time axis domain unit or the frequency axis domain unit in which the specific channel is transmitted.

8. The method of claim 1,
   wherein the information on the relation indicates that the DM-RS is precoded by a same method as the CRS.

9. The method of claim 1,
wherein the information on the relation indicates that the CRS is precoded by a same precoder as a precoder applied to the DM-RS.

10. The method of claim 1, wherein:
the information on the relation indicates that a fixed precoding is applied to the DM-RS, and
the fixed precoding is a precoding known in advance to the terminal.

11. The method of claim 1,
wherein the information on the relation is predefined based on a codebook.

12. The method of claim 11, further comprising:
receiving codebook information applied to the DM-RS from the base station.

13. The method of claim 1,
wherein the estimating the specific channel further includes:
obtaining a first channel estimation result through channel estimation using the CRS;
estimating the specific channel using a time interpolation method based on the DM-RS and the first channel estimation result.

14. The method of claim 13,
wherein the estimating the specific channel further includes estimating the specific channel using a frequency interpolation method,
wherein the frequency interpolation method is applied with 2 RB which is a minimum unit of a set of Physical Resource Block (PRBs) included in the specific channel.

15. The method of claim 1,
wherein the configuration information is included in Radio Resource Control (RRC) signaling.

16. The method of claim 1, further comprising:
receiving, from the base station, the configuration information in an idle mode state in a period of Discontinuous Reception (DRX),
wherein the configuration information is received in a listening period of the idle mode.

17. A method performed by a base station in a wireless communication system, the method comprising:
transmitting configuration information for channel estimation to the terminal,
wherein the configuration information includes information on a relation an association relationship between a cell-specific reference signal (CRS) port and a dedicated demodulation-reference signal (DM-RS) port;
transmitting the CRS to the terminal;
transmitting the DM-RS and Machine Type Communication (MTC) control information on a specific channel to the terminal,
wherein the specific channel is estimated using the CRS and the DM-RS based on the relation, and the MTC control information is decoded through the estimated specific channel,
wherein the relation between the CRS port and the DM-RS port is based on a precoder matrix, and
wherein the configuration information further includes information on a power ratio between the CRS port and the DM-RS port for the specific channel.

18. A terminal in a wireless communication system, the terminal comprising:
a transmitter for transmitting a radio signal;
a receiver for receiving a radio signal; and
a processor functionally connected to the transmitter and the receiver, and the processor is configured to:
receive configuration information for channel estimation from a base station,
wherein the configuration information includes information on a relation between a cell-specific reference signal (CRS) port and a dedicated demodulation-reference signal (DM-RS) port,
receive the CRS from the base station,
receive the DM-RS and Machine Type Communication (MTC) control information on a specific channel from the base station,
estimate the specific channel using the CRS and the DM-RS based on the relation,
decode the MTC control information through the estimated specific channel,
wherein the relation between the CRS port and the DM-RS port is based on a precoder matrix, and
wherein the configuration information further includes information on a power ratio between the CRS port and the DM-RS port for the specific channel.

* * * * *